US011182541B2

(12) United States Patent
Theodore et al.

(10) Patent No.: US 11,182,541 B2
(45) Date of Patent: Nov. 23, 2021

(54) COLLABORATIVE DOCUMENT CREATION BY A PLURALITY OF DISTINCT TEAMS

(71) Applicant: Nexwriter Limited, Tortola (VG)

(72) Inventors: James Chance Theodore, Hong Kong (CN); Rob Portil, Sedona, AZ (US)

(73) Assignee: Nexwriter Limited, Admiralty (HK)

( * ) Notice: Subject to any disclaimer, the term of this patent is extended or adjusted under 35 U.S.C. 154(b) by 0 days.

(21) Appl. No.: 15/975,724

(22) Filed: May 9, 2018

(65) Prior Publication Data

US 2018/0260371 A1 Sep. 13, 2018

Related U.S. Application Data

(63) Continuation of application No. PCT/US2016/061073, filed on Nov. 9, 2016.
(Continued)

(51) Int. Cl.
| | |
|---|---|
| *G06F 16/93* | (2019.01) |
| *G06F 3/048* | (2013.01) |
| *G06F 40/166* | (2020.01) |
| *G06F 40/169* | (2020.01) |
| *G06F 40/197* | (2020.01) |

(Continued)

(52) U.S. Cl.
CPC ............ *G06F 40/169* (2020.01); *G06F 16/93* (2019.01); *G06F 40/166* (2020.01); *G06F 40/197* (2020.01); *G06Q 10/101* (2013.01); *G06Q 50/188* (2013.01); *G06Q 50/18* (2013.01)

(58) Field of Classification Search
CPC .............................. G06F 16/93; G06F 17/241
See application file for complete search history.

(56) References Cited

U.S. PATENT DOCUMENTS

| | | | |
|---|---|---|---|
| 5,557,722 A | * | 9/1996 | DeRose ................. G06F 40/137 715/234 |
| 6,067,531 A | | 5/2000 | Hoyt et al. |

(Continued)

OTHER PUBLICATIONS

Nexwriter Limited, International Search Report and Written Opinion, PCT/US2016/061073, dated Aug. 25, 2017, 16 pgs.
(Continued)

*Primary Examiner* — Scott T Baderman
*Assistant Examiner* — Mario M Velez-Lopez
(74) *Attorney, Agent, or Firm* — Morgan, Lewis & Bockius LLP

(57) ABSTRACT

A collaborative document creation platform stores documents. Each document is associated with two or more distinct teams, and each team has multiple users. The platform enables users of teams associated with each document to modify the document. The platform includes a local comment affordance, which enables a user of a first team associated with a document to insert local comments, distinct from text of the document. The local comments are restricted for review only by users of the first team. The platform includes a global comment affordance, which enables all users associated with the document to insert global comments. The global comments are designated for review by one or more users associated with the document. The platform displays global comments to all of the designated users associated with the document, and displays each local comment only for the team corresponding to the author of the local comment.

19 Claims, 82 Drawing Sheets

Related U.S. Application Data

(60) Provisional application No. 62/253,111, filed on Nov. 9, 2015, provisional application No. 62/253,112, filed on Nov. 9, 2015, provisional application No. 62/253,117, filed on Nov. 9, 2015, provisional application No. 62/253,114, filed on Nov. 9, 2015.

(51) Int. Cl.
  *G06Q 10/10* (2012.01)
  *G06Q 50/18* (2012.01)

(56) References Cited

U.S. PATENT DOCUMENTS

| | | | |
|---|---|---|---|
| 6,502,113 B1 | 12/2002 | Crawford | |
| 7,398,467 B1 | 7/2008 | Bates et al. | |
| 8,484,578 B2* | 7/2013 | Gordner | G06F 3/04845 |
| | | | 715/808 |
| 8,635,295 B2 | 1/2014 | Mulder | |
| 8,839,100 B1 | 9/2014 | Orofino, II | |
| 9,147,275 B1 | 9/2015 | Hyde-Moyer et al. | |
| 9,342,493 B2 | 5/2016 | MacDougall et al. | |
| 9,965,598 B2 | 5/2018 | Tegreene et al. | |
| 10,943,059 B2* | 3/2021 | Yao | G06F 3/0482 |
| 11,080,240 B2* | 8/2021 | Madisetti | G06Q 10/101 |
| 2002/0083079 A1* | 6/2002 | Meier | G06F 16/93 |
| 2004/0085355 A1 | 5/2004 | Harmes et al. | |
| 2004/0088313 A1 | 5/2004 | Torres | |
| 2004/0088647 A1* | 5/2004 | Miller | G06F 40/12 |
| | | | 715/234 |
| 2005/0119980 A1 | 6/2005 | Kohavi et al. | |
| 2005/0132281 A1 | 6/2005 | Pan et al. | |
| 2007/0143663 A1* | 6/2007 | Hansen | G06F 17/241 |
| | | | 715/203 |
| 2007/0150299 A1* | 6/2007 | Flory | G06Q 10/10 |
| | | | 705/51 |
| 2008/0028286 A1 | 1/2008 | Chick | |
| 2008/0086680 A1 | 4/2008 | Beckman | |
| 2010/0265529 A1 | 10/2010 | Katano | |
| 2010/0306115 A1 | 12/2010 | Hardt | |
| 2011/0113320 A1* | 5/2011 | Neff | G06F 17/241 |
| | | | 715/230 |
| 2012/0060082 A1* | 3/2012 | Edala | G06F 16/36 |
| | | | 715/231 |
| 2012/0136951 A1 | 5/2012 | Mulder | |
| 2012/0136952 A1 | 5/2012 | Mulder | |
| 2012/0278251 A1 | 11/2012 | Pinsker et al. | |
| 2012/0284197 A1* | 11/2012 | Sitrick | G06Q 10/0631 |
| | | | 705/301 |
| 2013/0080776 A1* | 3/2013 | Elduff | G06Q 10/101 |
| | | | 713/168 |
| 2013/0139258 A1 | 5/2013 | Tegreene | |
| 2013/0139259 A1 | 5/2013 | Tegreene | |
| 2013/0205197 A1 | 8/2013 | O'Neill | |
| 2013/0205203 A1 | 8/2013 | MacDougall et al. | |
| 2014/0032486 A1* | 1/2014 | Sharma | G06F 16/94 |
| | | | 707/608 |
| 2014/0143680 A1 | 5/2014 | Angarita et al. | |
| 2014/0280377 A1* | 9/2014 | Frew | G06F 16/21 |
| | | | 707/805 |
| 2014/0289645 A1 | 9/2014 | Megiddo et al. | |
| 2015/0106750 A1 | 4/2015 | Konami et al. | |
| 2015/0169531 A1 | 6/2015 | Campbell et al. | |
| 2015/0365298 A1 | 12/2015 | Siegel | |
| 2016/0055196 A1 | 2/2016 | Collins et al. | |
| 2017/0193412 A1 | 7/2017 | Easton et al. | |
| 2018/0300304 A1 | 10/2018 | Mullins et al. | |
| 2019/0251197 A1 | 8/2019 | Li et al. | |

OTHER PUBLICATIONS

Nexwriter Limited, International Preliminary Report on Patentability, PCT/US2016/061073, dated May 15, 2018, 13 pgs.
Theodore. Office Action dated Sep. 28, 2018, U.S. Appl. No. 15/975,739, 8pgs.
Theodore, Office Action dated Jun. 26, 2020, U.S. Appl. No. 15/975,736, 23 pgs.
Theodore, Notice of Allowance dated Oct. 21, 2020, U.S. Appl. No. 15/975,732, 15 pgs.
Theodore, Notice of Allowance dated Oct. 6, 2020, U.S. Appl. No. 15/975,736, 13 pgs.
Nexwriter Limited, 1st Office Action, AU2016354092, dated Mar. 4, 2019, 4 pgs.
Nexwriter Limited, Extended European Search Report, EP16864886.3, dated May 27, 2019, 7 pgs.
Theodore, Notice of Allowance dated Feb. 13, 2019, U.S. Appl. No. 15/975,739, 9 pgs.
Theodore, Office Action dated Jul. 26, 2019, U.S. Appl. No. 15/975,732, 19 pgs.
Nexwriter Limited, Communication Pursuant to Rules 70(2) and 70a(2), EP16864886.3, dated Jun. 14, 2019, 1 pg.
Theodore, Final Office Action dated Nov. 13, 2019, U.S. Appl. No. 15/975,732, 22 pgs.
Theodore, Office Action dated Jan. 14, 2020, U.S. Appl. No. 15/975,736, 14 pgs.

* cited by examiner

800 User table

| user_id | — 801 |
| name | — 802 |
| password | — 803 |

Figure 8A

810 Document table

| document_id | — 811 |
| clauses | — 812 |
| local comments | — 813 |
| global comments | — 814 |

Figure 8B

820 Role table

| user_id | — 821 |
| document_id | — 822 |
| role/privileges | — 823 |

Figure 8C

830 Clause table

| document_id | — 831 |
| clause_id | — 832 |
| header | — 833 |
| content versions | — 834 |
| edit_count | — 835 |
| status | — 836 |
| defines_term | — 837 |

Figure 8D

840 Local Comment table

| comment_id | — 841 |
| clause_id | — 842 |
| user_id | — 843 |
| comment content | — 844 |

Figure 8E

850 Global Comment table

| comment_id | — 851 |
| clause_id | — 852 |
| user_id | — 853 |
| comment content | — 854 |
| transmitted | — 855 |

Figure 8F

Figure 9-02 rolling date 2 of x AUSCO Development Management Agreement

1 Investment Vehicle 1.a The investment vehicle for which all investments made by the Manager of behalf of the Investor is to solely maintained and managed by the Manager. The Manager is not allowed to outsource external services to provide the services outlined within this document.

| issue | RR-MJ |
|---|---|
| simple spelling mistake | |
| comment | |
| suggested change | |
| are to be | |
| approve | |
| reject | |

1.b The manager will ave a finite period of 5 years from the date of execution of this agreement, the Expiry Date, to manage the investment vehicle. The Investor will notify the Manager more than 12 months prior to the Expiry Date if the Investor wishes to extend the terms of this agreement.

1.c All investments under the AUSCO Logistics Development Fund, ALDF are to be made under the approved investment vehicle structure as per the addendum number I, ALDF Investment Vehicle Structure (page 6).

| purpose | RR-MJ |
|---|---|
| It is prudent to have a finite period within these type of agreements. | |
| comment | |
| approve | |
| reject | |

1.c.1 Any proposed new entry set up by the Manager to be added to the investment vehicle must be approved by the Investor prior to the entity set up.

1.1 Joint Venture Partners 1.1.1 In the course of business, the Manager may find suitable joint venture partners for the Investor to coinvest with in Logistics Developments. If the Manager wishes to propose a joint venture strategy to the Investor, the Manager must present the following documents for board approval.

1. Joint Venture Term Sheet, addendum II, page 7

| issue | RR-MJ |
|---|---|
| are you not going to set each holding company up yourselves | |
| comment requested | |

Figure 9-07

2.1.1.1 The DMF will be 5.50% of <u>Total Project Costs excluding Land.</u> (TPCeL).

2.1.1.2 The DMF will be paid monthly per what is in the final Development Feasibility Output Page, addendum III, page 8 submitted prior to board approval.

| issue | RR-MJ |
|---|---|
| lets not get involved with exact payments here, lets do it in another section later down the track. | |
| comment | |
| approve | |
| reject | |

3 Reporting 3.a The Manager must prepare reports for the Investor pertaining to the following issues.
   1. New Development Opportunity, as per <u>Heading 3.1</u>
   2. Monthly Operational Reports, as per <u>Heading 3.2</u>

| purpose | RR-MJ |
|---|---|
| Included as per the venture term sheet that you added in the original specifications document. | |
| comment | |
| approve | |
| reject | |

3.1 New Development Opportunity 3.1.1 A New Development Opportunity paper must be presented each time a new development arises, it must address the investment from the following items:

3.1.1.1 Location, including but not limited to planning zones, distance and travel times from relevant ports and airports, other institutional investors holdings, tenants and site access.

3.1.1.2 Tenant, including but not limited to their credit history, regional presence, other properties, financial statements.

DOCUMENTS new template
- feature 1
- feature 2
- feature 3 no charge if you have created 20 documents in the 8 months create

LIVE hide details

AUSCO Development Management Agreement     contract for negotiation
your legal counsel is Mallesons Jacques     opposing counsel is Jones Day on behalf of GRE Property
▼ notifications
your legal counsel has submitted version 2 of the document to your opposing counsel     time/date
your legal counsel has submitted a version 2 of the document for your approval/comments     time/date
your opposing counsel has submitted a tuen, your legal counsel will mark it up and send it to you shortly     time/date
you have received a message from Rachael Ross of Mallesons Jacques with subject 'Clarification of     time/date
extent of services'
▲ messages
▲ original document specifications
▲ deal team
▼ expenses
   ▶ Your Firm's Expenses - Tishman Speyer     $7,178.12 USD
   ▶ Your Legal Counsel Expenses - Mallesons Jacques     $4,178.12 USD
       $3,000.00 USD view document last movement time and date, x days, y hours and z minutes ago

ARCHIVED

SETTINGS

Figure 9-10

| AUSCO Development Management Agreement | contract for negotiation |
|---|---|
| your legal counsel is Mallesons Jacques | opposing counsel is Jones Day on behalf of GRE Property |

▶ notifications your legal counsel has submitted version 2 of the document to your opposing counsel — time/date
your legal counsel has submitted a version 2 of the document for your approval/comments — time/date
your opposing counsel has submitted a tuen, your legal counsel will mark it up and send it to you shortly — time/date
you have received a message from Rachael Ross of Mallesons Jacques with subject 'Clarification of extent of services' — time/date ▲ messages
▲ original document specifications
▲ deal team
▼ expenses

[ by type ] [ by date ]

▼ Your Firm's Expenses - Tishman Speyer
  ▼ 27th May 2016          $7,178.12 USD
    items                  $4,178.12 USD
                           $3,178.12 USD
    Printing    26 pages to Sydney. Level 9 Developments at 02:36    🔍 added by Jacqueline Sharp   $13.00 USD
    Cab         cab to see Mallesons Jacques                          🔍 added by Jacqueline Sharp   $15.51 AUD
    document fee 50% Contact for Negotiation                          🔍 added by Tim Short          $250.00 AUD
                                                                                                    $214.78 USD
    labour                                                                                          $2,803.88 USD
      onsite                                                                                        $763.33 USD
      Jacqueline Sharp   6 hours and 94 minutes at $200.00 USD per hour  🔍                         $1,713.33 USD
      Tim Short          2 hours and 6 mintes at $500.00 USD per hour   🔍                          $1,050.00 USD
      offsite                                                                                       $200.00 USD
      Jacqueline Sharp   1 hour at $200.00 USD per hour           added by Tim Short                $200.00 USD
  ▲ 28th May 2015                                                                                   $1,000.00 USD add expense to your firm ▲ Your Legal Counsels's Expenses - Mallesons Jacques                                                $3,000.00 USD view document last movement time and date, x days, y hours and z minutes ago

[ ARCHIVED ]

[ SETTINGS ]

Figure 9-11

| | |
|---|---|
| | jG - jDi has recommended approval |
| | i think this is pretty fair, but it is up to you.... |
| | approve |
| | reject |

1 Investment Vehicle

⊕    re-insert removed subheading 1.a  The investment vehicle for which all investments made by the Manager of behalf of the Investor are to be solely maintained and managed by the Manager. The Manager is not allowed to outsource external services to provide the services outlined within this document.

⊕ ⊕

1.b  All investments under the AUSCO Logistics Development Fund, ALDF are to be made under the approved investment vehicle structure as per the addendum number I. ALDF Investment Vehicle Structure (page 6).

⊕

1.b.1  Any proposed new entry set up by the Manager to be added to the investment vehicle must be approved by the Investor prior to the entity set up.

⊕ ⊕ ⊕

1.1 Joint Venture Partners

1.1.1  In the course of business, the Manager may find suitable joint venture partners for the Investor to coinvest with in Logistics Developments. If the Manager wishes to propose a joint venture strategy to the Investor, the Manager must present the following documents for board approval at least two months prior to the proposed first injection date. Unless the unlevered IRR is greater than 35.00%, where the Manager is allowed to present the investment just 8 weeks is from the proposed first injection date.

1. Joint Venture Term Sheet, addendum I, page 7
   2. Development Feasibility Output Page, addendum III, page 6
   3. Fund Model Output Page for standalone development, addendum IV, page 9
   4. Global Fund Model Outputs pre and post standalone development, addendum V, page 10
   5. Business Profile of Joint Venture partner, addendum VI, page 11
   6. AUSCO Development Funding Proposal, addendum VII, page 16

1 Investment Vehicle

⊕ re-insert removed subheading 1.a The investment vehicle for which all investments made by the Manager on behalf of the Investor are to be solely maintained and managed by the Manager. The Manager is not allowed to outsource external services to provide the services outlined within this document.

⊕ ⊕

1.b All investments under the AUSCO Logistics Development Fund, ALDF are to be made under the approved investment vehicle structure as per the addendum number I, ALDF Investment Vehicle Structure (page 6).

⊕

1.b.1 Any proposed new entry set up by the Manager to be added to the investment vehicle must be approved by the Investor prior to the entity set up.

⊕ ⊕ ⊕

1.1 Joint Venture Partners

1.1.1 In the course of business, the Manager may find suitable joint venture partners for the Investor to coinvest with in Logistics Developments. If the Manager wishes to propose a joint venture strategy to the Investor, the Manager must present the following documents for board approval at least two months prior to the proposed first injection date. Unless the unlevered IRR is greater than 35.00%, where the Manager is allowed to present the investment just 8 weeks is from the proposed first injection date.

1. Joint Venture Term Sheet, addendum I, page 7
2. Development Feasibility Output Page, addendum III, page 6
3. Fund Model Output Page for standalone development, addendum IV, page 9
4. Global Fund Model Outputs pre and post standalone development, addendum V, page 10
5. Business Profile of Joint Venture partner, addendum VI, page 11
6. AUSCO Development Funding Proposal, addendum VII, page 16

⊕ ⊕ ⊕

---

JG - JDI has recommended approval i think his is pretty fair, but it is up to you...

approved by TS - TS ✕

| edit | thumbs | final | | | |
|---|---|---|---|---|---|
| sections | | | | | |
| 🔍 Search ⊗ | entry | core | closing | addendum | ALDF Investment Vehicle Structure 🔍 |
| entry | | | | | |
| pages | | | | | |
| title | | | | | |
| purpose | | | | | |
| core | | | | | |
| pages | | | | | |
| table of contents | | | | | |
| 1.0 name of clause | | | | | |
| closing | | | | | |
| pages | 1 | | | | |
| execution | 5 | | | | |
| addendum | | | | | |
| pages | 1 | | | | |
| ALDF Investment Vehicle Structure | 6 | | | | |

ALDF Investment Vehicle Structure - Addendum I - Page x

Below is a list of all places where the above mentioned addendum is mentioned/referenced within the document To edit a particular clause below, double click on it and you will be taken to the edit page If you choose to delete this addendum of kill references to it the addendum by the button below new pop up will appear with all the clauses that the addendum is mentioned below and you will have to ensure that each clause is correct based on the removal of the reference.

1.b All investments under the AUSCO Logistics Development Fund. ALDF are to be made under the approved investment vehicle structure as per the addendum number I, ALDF Investment Vehicle Structure (page 6).

[ escape ] [ kill references and leave addendum in place ] [ delete addendum & references ]

Development Management Agreement between GFE Property and Tishman Speyer

2. Qshdiw djsk kdsdk kjssd

| edit | thumbs | final | | | | |
|---|---|---|---|---|---|---|
| 🔍 Search | | | | | | |
| sections | | entry | core | closing | addendum | |

References for ALDF Investment Vehicle Structure

Below is a list of all places where the above addendum has its references killed. Please confirm that each clause is now correct or edit the wording to your liking.

| | 1.b All investments under the AUSCO Logistics Development Fund, ALDF are to be made under the approved investment vehicle structure. |
|---|---|

| cancel | | save |
|---|---|---|

| entry pages | | | | | |
|---|---|---|---|---|---|
| title | | | | | |
| purpose | | | | | |
| core pages | | | | | |
| table of contents | | | | | |
| 1.0 name of clause | | | | | |
| closing pages | | the terms and procedures for a Development Management Agreement between GFE Property and Tishman Speyer | 1 | svkfiv roiev 2. Qshdw djsk kdsdk kjssd | |
| execution | | | 5 | | |
| addendum pages | | | 1 | | |
| ALDF Investment Vehicle Structure | | | 6 | | |

| edit | thumbs | final | you are in delegation mode - you have this turn and one more turn remaining |

| no filter | 1st change (8) | 2nd change (0) | three or more changes (0) | amended then agreed (0) | unchanged (5) |

| items that need to be attended to: | 1st changes (8) | 2nd changes (0) | three or more changes (0) |

1st changes 1.a  The investment vehicle for which all investments made by the Manager of behalf of the Investor are to be solely maintained and managed by the Manager. The Manager is not allowed to outsource external services to provide the services outlined within this document.

show previous versions of clause

- approve
- amend
- request clarification 1.1.1  In the course of business, the Manager may find suitable joint venture partners for the Investor to coinvest with in Logistics Developments. If the Manager wishes to propose a joint venture strategy to the Investor, the Manager must present the following documents for board approval at least two months prior to the proposed first injection date. Unless the unlevered IRR is greater than 35.00%, where the Manager is allowed to present the investment just 8 weeks is from the proposed first injection date.

1. Joint Venture Term Sheet, addendum I, page 7
2. Development Feasibility Output Page, addendum III, page 6
3. Fund Model Output Page for standalone development, addendum IV, page 9
4. Global Fund Model Outputs pre and post standalone development, addendum V, page 10
5. Business Profile of Jont Venture partner, addendum VI, page 11
6. AUSCO Development Funding Proposal, addendum VII, page 16 show previous versions of clause

- approve
- amend
- request clarification

| edit | thumbs | final | you are in delegation mode ~ you have this turn and one more turn remaining |

| no filter | 1st change (8) | 2nd change (1) | three or more changes (0) | amended then agreed (1) | unchanged (5) |

| items that need to be attended to: | 1st changes (8) | 2nd changes (0) | three or more changes (0) |

1st changes

3 Reporting

3.a  The Manager must prepare reports for the investor to the following issues.

1. New Development Opportunity, as per Heading 3.1
2. Monthly Operational Report, as per Heading 3.2

⊕
⊕

[approve] [amend] [request clarification]

there is no previous version of this clause

3.1 New Development Opportunity

3.1.1  A New Development Opportunity paper must be presented each time a new development arises, it must address the investment from the following items:

3.1.1.1  Location, including but not limited to planning zones, distance and travel times from relevant ports and airports, other institutional investors holdings, tenants and site access
⊕

3.1.1.2  Tenant, including but not limited to their credit history, regional presence, other properties, financial statements
⊕
⊕

[approve] [amend] [request clarification]

Figure 9-29

Figure 9-30 there are no previous versions of these clauses

2nd changes amended by JG - JD × request clarification amend text two 1.1.1 In the course of business, the Manager may find suitable joint venture partners for the Investor to coinvest with in Logistics Developments. If the Manager wishes to propose a joint venture strategy to the Investor, the Manager must present the following documents for board approval at least two months prior to the proposed first injection date. Unless the unlevered IRR is greater than 35.00%, where the Manager is allowed to present the investment just 8 weeks is from the proposed first injection date.

1. Joint Venture Term Sheet, addendum I, page 7
2. Development Feasibility Output Page, addendum III, page 6
3. Fund Model Output Page for standalone development, addendum IV, page 9
4. Global Fund Model Outputs pre and post standalone development, addendum V, page 10
5. Business Profile of Joint Venture partner, addendum VI, page 11
6. AUSCO Development Funding Proposal, addendum VII, page 16 show previous versions of clause

Amended then Approved time/date created by Mallesons Jacques approved by JG - JD ×

1.a The investment vehicle for which all investments made by the Manager of behalf of the Investor are to be solely maintained and managed by the Manager. The Manager is not allowed to outsource external services to provide the services outlined within this document.

time/date created by Jones Day 1.a The investment vehicle for which all investments made by the Manager of behalf of the Investor are to be solely maintained and managed by the Manager. The Manager is not allowed to outsource external services to provide the services outlined within this document.

Figure 9-31

| | approved by JG - JD X |
|---|---|

1.a The investment vehicle for which all investments made by the Manager of behalf of the Investor are to be solely maintained and managed by the Manager. The Manager is not allowed to outsource external services to provide the services outlined within this document.
⊕ ⊕
time/date created by Jones Day 1.a The investment vehicle for which all investments made by the Manager of behalf of the Investor are to be solely maintained and managed by the Manager. The Manager is not allowed to outsource external services to provide the services outlined within this document.

hide previous versions of clause unchanged 1.b All investments under the AUSCO Logistics Development Fund, ADLF are to be made under the approved investment vehicle structure as per the addendum number I, ALDF investment Structure (page 6).
⊕
1.b.1 Any proposed new entity set up by the Manager to be added to the investment vehicle must be approved by the Investor prior to the entity set up.
⊕ ⊕

2.1.1 The Manager will be entitled to a Development Management Fee, (DMF)
⊕
2.1.1.1 The DMF will be 5.50% of Total Project Costs excluding Land, (TPCeL).
⊕ ⊕
2.1.1.2 The DMF will be paid monthly per what is in the final Development Feasibility Output Page, addendum III, page 8 submitted prior to board approval.
⊕ ⊕

Figure 9-32

| | | time and date sent |
|---|---|---|
| | | what are your thoughts on this? Do you want to include more in here or leave ambiguous? |

3.1.1.1 Location, including but not limited to planning zones, distance and travel times from relevant ports and airports, other institutional investors holdings, tenants and site access ⊕

3.1.1.2 Tenant, including but not limited to their credit history, regional presence, other properties, financial statements ⊕ there are no previous versions of these clauses

2nd changes

| | amended by JG - JD × |
|---|---|
| | request clarification |
| | amend text |
| | two |

1.1.1 In the course of business, the Manager may find suitable joint venture partners for the Investor to coinvest with in Logistics Developments. If the Manager wishes to propose a joint venture strategy to the Investor, the Manager must present the following documents for board approval at least two months prior to the proposed first injection date. Unless the unlevered IRR is greater than 35.00%, where the Manager is allowed to present the investment just 8 weeks is from the proposed first injection date.
1. Joint Venture Term Sheet, addendum I, page 7
2. Development Feasibility Output Page, addendum III, page 6
3. Fund Model Output Page for standalone development, addendum IV, page 9
4. Global Fund Model Outputs pre and post standalone development, addendum V, page 10
5. Business Profile of Joint Venture partner, addendum VI, page 11
6. AUSCO Development Funding Proposal, addendum VII, page 16
⊕ show previous versions of clause 3.2 New Development Opportunity

| | amended by JG - JD × |
|---|---|
| | request clarification |
| | amend text |
| | 15th |

3.2.1 A Monthly Operational Report must be delivered to the Investor by the 15th of each month relating to the prior months operations. It must address the following items:
⊕ show previous versions of clause 3.1.1 A New Development Opportunity paper must be presented each time a new development arises. It must address the investment from the following items.

3.1.1.1 Location, including but not limited to planning zones, distance and travel times from relevant ports and airports, other institutional investors holdings, tenants and site access 3.1.1.2 Tenant, including but not limited to their credit history, regional presence, other properties, financial statements GRE Properties — Tishman Speyer from: John E. Daley
time and date sent more ambiguous the better for us.

to: John E. Daley, individual two
time and date sent what are your thoughts on this? Do you want to include more in here or leave ambiguous?

amend
request clarification
15th approved by JG - JD  X rolling date    4 of x    AUSCO Development Management Agreement 3.2 New Development Opportunity 3.2.1 A Monthly Operational Report must be delivered to the Investor by the 15th of each month relating to the prior months operations. It must address the following items:

3.2.1.1 Cashflow, Profit and Loss, Upcoming Lease Expires, Current Vacancies, Improvements and Valuations

Figure 9-33

| edit | thumbs | final |

Under delegation mode - you have only this turn remaining

| no filter | 1st change (0) | 2nd change (0) | three or more changes (1) | amended then agreed (7) | unchanged (5) |

| items that need to be attended to: | 1st changes (0) | 2nd changes (0) | three or more changes (1) | three or more changes

| approve |
| amend |
| request clarification |

3.2 New Development Opportunity 3.2.1 A Monthly Operational Report must be delivered to the Investor by the 5th of each month relating to the prior months opertions. It must address the following items:

show previous versions of clause

Amended then Approved time/date created by Mallesons Jacques 1.a  The investment vehicle for which all investments made by the Manager of behalf of the Investorare to be solely maintained and managed by the Manager. The Manager is not allowed to outsource external services to provide the services outlined within this document.

show previous versions of clause

3 Reporting

DOCUMENTS

- feature 1
- feature 2
- feature 3 create new template

- feature 1
- feature 2
- feature 3 no charge if you have created 20 documents in the 8 months no charge for this one but allows them to be set up create

LIVE hide details

AUSCO Development Management Agreement     contract for negotiation
your party is GRE Property     opposing counsel is Mallesons Jacques on behalf of Tishman Speyer
▶ notifications
your opposing party has approved the document as the final version     time/date
you have received version 4 of the document from your opposing counsel     time/date
you have received version 2 of the document from your opposing counsel     time/date
▲ messages
▲ original document specifications
▲ deal team
▲ expenses open document last movement time and date, x days, y hours and z minutes ago

ARCHIVED

SETTINGS

| edit | | |
|---|---|---|
| rolling date | 2 of x  AUSCO Development Management Agreement | |
| 1 Investment Vehicle | | issue |
| | re-insert removed subheading | simple spelling mistake |
| | ⊕ | |
| | 1.a The investment vehicle for which all investments made by the Investor is to solely maintained and managed by the Manager. The Manager is not allowed to outsource external services to provide the services outlined within this document. | suggested change |
| | | are to be |
| | ⊕ | |
| | 1.b insert text here ... | request comment |
| | ⊕ | |
| | | purpose |
| | 1.c All investments under the AUSCO Logistics Development Fund, ALDF are to be made under the approved investment vehicle structure as per the addendum number I, ALDF Investment Vehicle Structure (page 6). | insert text here |
| | ⊕ | |
| | 1.c.1 Any proposed new entry set up by the Manager to be added to the investment vehicle must be approved by the Investor prior to the entity set up. | |
| | ⊕ | |
| | ⊕ | |
| | 1.1 Joint Venture Partners | |
| | 1.1.1 In the course of business, the Manager may find suitable joint venture partners for the Investor to coinvest with in Logistics Developments. If the Manager wishes to propose a joint venture strategy to the Investor, the Manager must present the following documents for board approval. | | core sidebar

Figure 9-37 print a clause add previous main clauses 1.a ✗ The investment vehicle for which all investments made by the Manager of behalf of the Investor is to solely maintained and managed by the Manager. The Manager is not allowed to outsource external services to provide the services outlined within this document.

issue
simple spelling mistake
suggested change
are to be
request comment 1.b ✗ The Manager will have a finite period of 5 years from the date of execution of this agreement, the Expiry Date, to manage the investment vehicle., The Investor will notify the Manager more than 12 months prior to the Expiry Date if the Investor wishes to extend the terms of this agreement.

1.c ✗ All investments under the AUSCO Logistics Development Fund, ALDF are to be made under the approved investment vehicle structure as per the addendum number I, ALDF Investment Vehicle Structure (page 6).

1.c.1 ✗ Any proposed new entry set up by the Manager to be added to the investment vehicle must be approved by the Investor prior to the entity set up.

escape add next main clause include previous versions of clauses separate page per clause
continuous

A4 exclude mark ups print to: Sydney - Level 9 print must present the following documents for board approval

| | core | |
|---|---|---|
| choice. | | investment vehicle structure as per addendum number I, ALDF Investment Vehicle Structure (page 6). |
| rejected by TS - TS | | |
| | | 1.b.1 Any proposed new entity set up by the Manager to be added to the investment vehicle must be approved by the Investor prior to the entity set up. |
| issue | RR-MJ | |
| are you not going to set each holding company up yourselves | | |
| comment returned by TS-TS | | |
| going to set them up... | | |
| left as is by RR-MJ | X | |
| | | 1.1 Joint Venture Partners |
| issue | RR-MJ | 1.1.1 In the course of business, the Manager may find suitable joint venture partners for the Investor to coinvest with in Logistics Developments. If the Manager wishes to propose a joint venture strategy to the Investor, the Manager must present the following documents for board approval at least two months prior to the proposed first injection date. Unless the unlevered IRR is greater than 35.00%, where the Manager is allowed to present the investment just 8 weeks from the proposed first injection date. |
| need to set out minimum time periods prior to the investment being made | | 1. Joint Venture Term Sheet, addendum I, page 7 |
| comment returned by TS-TS | | 2. Development Feasibility Output Page, addendum III, page 6 |
| make it a 3 month period, but if the IRR on the deal is greater than 35% unlevered then they can bring it to us with 8 weeks out | | 3. Fund Model Output Page for standalone development, addendum IV, page 9 |
| | | 4. Global Fund Model Outputs pre and post standalone development, addendum V, page 10 |
| suggested change | | 5. Business Profile of Joint Venture partner, addendum VI, page 11 |
| at least three months prior to the proposed first injection date | | |
| | | GRE Property |
| rejected by TS - TS | | rolling date |
| amend to reflect comment | | 2 Fees |
| at least three months prior to the proposed first injection date, unless the unlevered IRR is greater than 35.00%, where the Manager is allowed to present the investment just 8 weeks | | 2.1 Development Management |
| | | 2.1.1 The Manager will be entitled to a Development Management Fee, (DMF). |
| | | 3 of x   AUSCO Development Management Agreement |
| | | Tishman Speyer |
| | | 2.1.1.1 The DMF will be 5.50% of Total Project Costs excluding Land, (TPCeL). |
| | | 2.1.1.2 The DMF will be paid monthly per what is in the final Development Feasibility Output Page, addendum III, page 8 submitted prior to board approval. | rolling date     4 of x     AUSCO Development Management Agreement

3.2 New Development Opportunity

3.2.1 A Monthly Operational Report must be delivered to the Investor by the 15th of each month relating to the prior months operations. It must address the following items:

3.2.11 Cashflow, Profit and Loss, Upcoming Lease Expires, Current Vacancies, Improvements and Valuations

[recommend approval]

[recommend issue]

1 Investment Vehicle

⊕ re-insert removed subheading 1.a The investment vehicle for which all investments made by the Manager of behalf of the Investor are to be solely maintained and managed by the Manager. The Manager is not allowed to outsource external services to provide the services outlined within this document.

⊕

1.b All investments under the AUSCO Logistics Development Fund, ALDF are to be made under the approved investment vehicle structure as per the addendum number I, ALDF Investment Vehicle Structure (page 6).

⊕

1.b.1 Any proposed new entry set up by the Manager to be added to the investment vehicle must be approved by the Investor prior to the entity set up.

⊕
⊕

1.1 Joint Venture Partners

1.1.1 In the course of business, the Manager may find suitable joint venture partners for the Investor to coinvest with in Logistics Developments. If the Manager wishes to propose a joint venture strategy to the Investor, the Manager must present the following documents for board approval at least two months prior to the proposed first injection date. Unless the unlevered IRR is greater than 35.00%, where the Manager is allowed to present the investment just 8 weeks is from the proposed first injection date.

1. Joint Venture Term Sheet, addendum I, page 7
2. Development Feasibility Output Page, addendum III, page 6
3. Fund Model Output Page for standalone development, addendum IV, page 9
4. Global Fund Model Outputs pre and post standalone development, addendum V, page 10
5. Business Profile of Joint Venture partner, addendum VI, page 11
6. AUSCO Development Funding Proposal, addendum VII, page 16

⊕
⊕

☒ approval recommended
☒ your comment i think his is pretty fair, but it is up to you...

1.1 Lorem ipsum dolor sit amet, consectetur adipiscing elit. Integer risus mauris, vehicula blandit eleifend vel, egestas sagittis massa. Integer quis sem non nibh congue vestibulum et et neque. Praesent nec molestie odio. Nam sollicitudin ante non nunc bibendum at laoreet erat porttitor. Aenean this is the suggested amendment habitant morbi tristique senectus et netus et malesuada fames ac turpis egestas. Nullam in arcu nunc. Donec vel nisi sapien, sit amet aliquam nulla. Cras posuere, nisi non pulvinar tempor, eros lacus tempus orci, consequat pulvinar lacus dolor at lorem. Nunc tortor erat,

| issue | this is the issue with the highlighted text | original suggested change | this is the suggested change | amended suggested change by xx - CO | 'this is the suggested amendment' has replaced 'velit' | edit approved by xx - CO ✕ | comment ignored ✕ | go back to lawyer
go to opposing counsel if there are no rejections

Figure 9-50

1.1 Lorem ipsum dolor sit amet, consectetur adipiscing elit. Integer risus mauris, vehicula blandit eleifend vel, egestas sagittis massa. Integer quis sem non nibh congue vestibulum et et neque. Praesent nec molestie odio. Nam sollicitudin ante non nunc bibendum at laoreet erat porttitor. Aenean velit habitant morbi tristique senectus et netus et malesuada fames ac turpis egestas. Nullam in arcu nunc. Donec vel nisi sapien, sit amet aliquam nulla. Cras posuere, nisi non pulvinar tempor, eros lacus tempus orci, consequat pulvinar lacus dolor at lorem. Nunc tortor erat, dictum a dignissim non, iaculis eu magna.

issue this is the issue with the highlighted text suggested change

'this is the suggested change' has not replaced 'velit' rejected by xx - CO requested comment this is the comment amend to reflect comment leave as is

Figure 9-51

1.1 Lorem ipsum dolor sit amet, consectetur adipiscing elit. Integer risus mauris, vehicula blandit eleifend vel, egestas sagittis massa. Integer quis sem non nibh congue vestibulum et et neque. Praesent nec molestie odio. Nam sollicitudin ante non nunc bibendum at laoreet erat porttitor. Aenean velit habitant morbi tristique senectus et netus et malesuada fames ac turpis egestas. Nullam in arcu nunc. Donec vel nisi sapien, sit amet aliquam nulla. Cras posuere, nisi non pulvinar tempor, eros lacus tempus orci, consequat pulvinar lacus dolor at lorem. Nunc tortor erat, dictum a dignissim non, iaculis eu magna.

throughout this process they are able to change the highlighted section to make it smaller or larger issue this is the issue with the highlighted text suggested change 'this is the suggested change' has not replaced 'velit' rejected by xx - CO requested comment this is the comment amended by xx - CO ✕ to reflect comment above please insert new suggested change to replace highlighted area here approve edit

Figure 9-52

1.1 Lorem ipsum dolor sit amet, consectetur adipiscing elit. Integer risus mauris, vehicula blandit eleifend vel, egestas sagittis massa. Integer quis sem non nibh congue vestibulum et et neque. Praesent nec molestie odio. Nam sollicitudin ante non nunc bibendum at laoreet erat porttitor. Aenean word habitant morbi tristique senectus et netus et malesuada fames ac turpis egestas. Nullam in arcu nunc. Donec vel nisi sapien, sit amet aliquam nulla. Cras posuere, nisi non pulvinar tempor, eros lacus tempus orci, consequat pulvinar lacus dolor at lorem. Nunc tortor erat, dictum a dignissim non, iaculis eu magna.

issue this is the issue with the highlighted text suggested change

'this is the suggested change' has not replaced 'velit' rejected by xx - CO requested comment this is the comment amended by xx - CO ✕ to reflect comment above 'word' has replaced 'velit' approved edit by xx - CO ✕ go forward to opposing counsel

Figure 9-53

Figure 9-54 opposing counsel party 1.1 Lorem ipsum dolor sit amet, consectetur adipiscing elit. Integer risus mauris, vehicula blandit eleifend vel, egestas sagittis massa. Integer quis sem non nibh congue vestibulum et et neque. Praesent nec molestie odio. Nam sollicitudin ante non nunc bibendum at laoreet erat porttitor. Aenean this is the suggested change habitant morbi tristique senectus et netus et malesuada fames ac turpis egestas. Nullam in arcu nunc. Donec vel nisi sapien, sit amet aliquam nulla. Cras posuere, nisi non pulvinar que habitant morbi tristique senectus et netus et malesuada fames ac turpis egestas. Nullam in ar xx - CO has recommended approval of this change approve reject comment ✕ this is the comment

Figure 9-57 opposing counsel xx - CO has recommended approval of this change approved by xx - CO this is the comment 1.1 Lorem ipsum dolor sit amet, consectetur adipiscing elit. Integer risus mauris, vehicula blandit eleifend vel, egestas sagittis massa. Integer quis sem non nibh congue vestibulum et et neque. Praesent nec molestie odio. Nam sollicitudin ante non nunc bibendum at laoreet erat porttitor. Aenean this is the suggested change habitant morbi tristique senectus et netus et malesuada fames ac turpis egestas. Nullam in arcu nunc. Donec vel nisi sapien, sit amet aliquam nulla. Cras posuere, nisi non pulvinar que habitant morbi tristique senectus et netus et malesuada fames ac turpis egestas. Nullam in ar

Figure 9-58

1.1 Lorem ipsum dolor sit amet, consectetur adipiscing elit. Integer risus mauris, vehicula blandit eleifend vel, egestas sagittis massa. Integer quis sem non nibh congue vestibulum et et neque. Praesent nec molestie odio. Nam sollicitudin ante non nunc bibendum at laoreet erat porttitor. Aenean this is the suggested change habitant morbi tristique senectus et netus et malesuada fames ac turpis egestas. Nullam in arcu nunc. Donec vel nisi sapien, sit amet aliquam nulla. Cras posuere, nisi non pulvinar que habitant morbi tristique senectus et netus et malesuada fames ac turpis egestas. Nullam in ar opposing counsel xx - CO has recommended approval of this change rejected by xx - CO comment this is the comment amended by xx - CO ×
to reflect party comment please insert new suggested change to replace highlighted area here approve edit

Figure 9-59 lawyer after party approves/rejects/comments on purpose 1.8 this is the new clause Purpose this is the purpose rejected by xx - CO comment this is the comment amended by xx - CO ✕
to reflect party
comment changed from 'this is
the new clause' approve edit

Figure 9-67

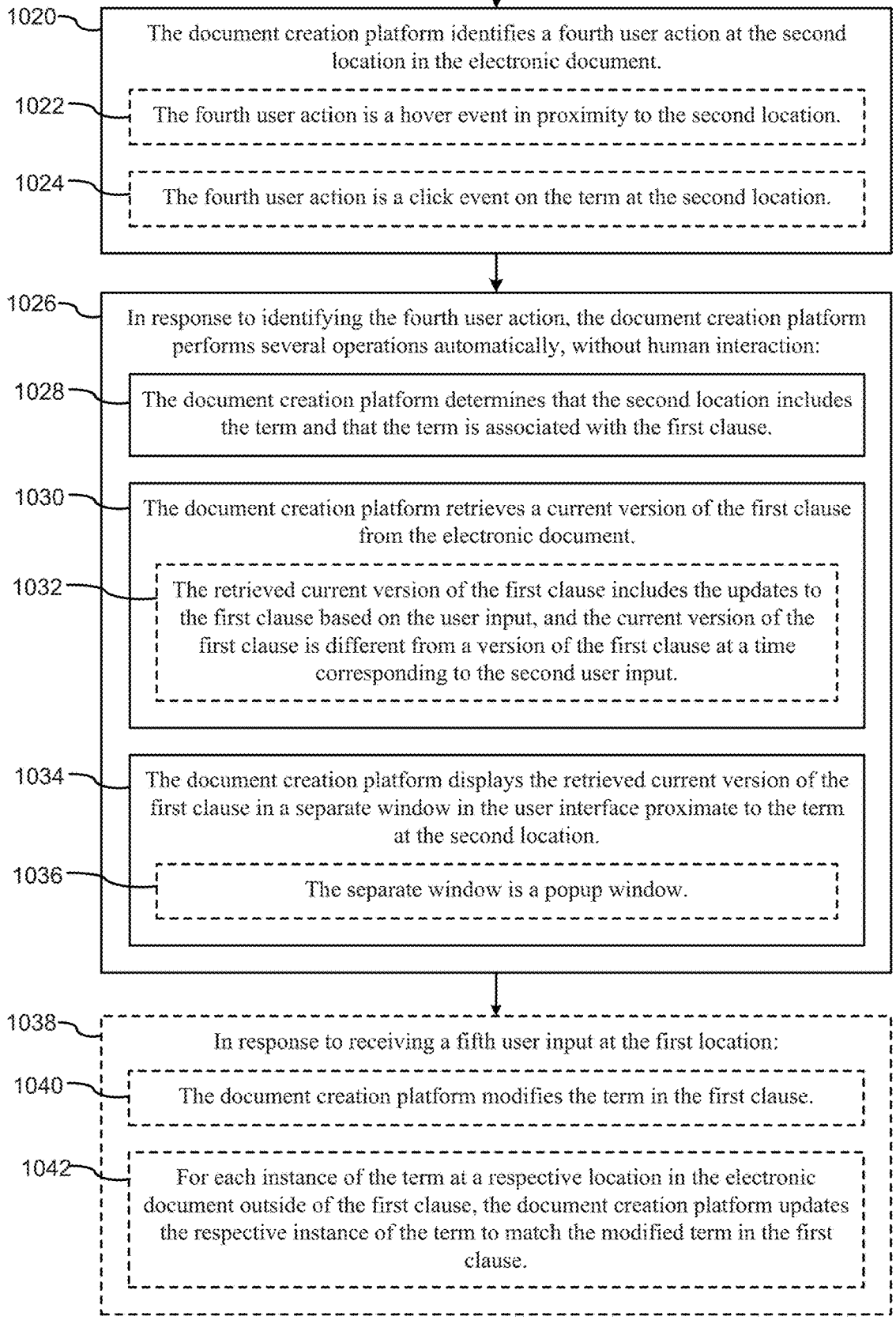

ated in the iterative process. The platform tracks who has made which changes, what changes have been proposed and accepted, and provides notification to users (e.g., emails) to keep them updated regarding what steps they need to take, which is another feature that is unavailable in typical track changes features found in common word processing applications.

COLLABORATIVE DOCUMENT CREATION BY A PLURALITY OF DISTINCT TEAMS

CROSS REFERENCE TO RELATED APPLICATIONS

This application is a continuation of PCT Application No. PCT/US16/61073, filed Nov. 9, 2016, entitled "Collaborative Document Creation by a Plurality of Distinct Teams," which is incorporated herein by reference in its entirety. PCT Application No. PCT/US16/61073 claims priority to U.S. Provisional Application No. 62/253,111, filed Nov. 9, 2015, entitled "Collaborative Document Creation by a Plurality of Distinct Teams," U.S. Provisional Application No. 62/253,112, filed Nov. 9, 2015, entitled "Dynamic Referencing of Term Definitions within a Document," U.S. Provisional Application No. 62/253,114, filed Nov. 9, 2015, entitled "Color Coding of Phrases within a Document to Indicate Change History," and U.S. Provisional Application No. 62/253,117, filed Nov. 9, 2015, entitled "Portion-Based Document Printing Options," each of which is incorporated by reference herein in its entirety.

TECHNICAL FIELD

The disclosure relates generally to a collaborative document creation platform, typically with two or more independent teams working in an iterative process.

BACKGROUND

Some applications enable two or more users to create a document. In some cases, each person has to reread the entire document each time the person reviews or revises it in order to determine what aspects have changed. Some applications make it easier to see changes using a "track changes" feature. Unfortunately, such track changes features are typically difficult to read due to the amount of strikethrough and poor formatting in review mode, especially where the same text has been edited multiple times. In many cases, a person must accept all of the changes to overcome the formatting issues, thus losing the value of the track changes feature.

SUMMARY

Disclosed implementations address the above deficiencies and other problems associated with collaborative document creation. Some implementations provide a platform for creation of documents, such as contracts or agreements. In these implementations, there are commonly two teams, and each team includes a party (e.g., at least one individual representing a company) and an attorney. In some implementations the platform provides a visual interface for the parties to: approve, amend, or reject lawyer changes/recommendations; view comments in real time with the ability to clearly see the potential changes; review the reasons why users have made specific changes; and send the next version back to the relevant person in the document creation process immediately without undue back-and-forth between the parties.

Once the document is sent to an opposing team (e.g., to opposing counsel), the document clearly shows what has been changed and what it was changed from. Members of the team can provide thoughts on the change with comments for their associates.

Some implementations provide visual version control, which tracks every change in a single cloud based document, and the parties can access the versions from anywhere.

The implementations disclosed herein are fundamentally different from a typical "track changes" feature found in common word processing applications. One of the differences that is visually apparent is that there is no strikethrough. In addition, the interface illustrates the changes in a simple way so there is no need to flip between a "final view" and a "review changes view" to see what has been changed.

Whereas a typical track-changes feature uses colors randomly assigned to users who edit the document, the disclosed implementations use color (e.g., highlighting) to identify how many times a certain portion of the document has been changed. For example, lack of color can designate a portion that is unchanged from the original first draft, blue can designate portions that have changed one time, orange can designate items that have changed two times, and red can indicate portions that have changed three or more times. In some implementations, green is used to designate portions that have been agreed to by the parties, regardless of how many times the content was changed before the agreement for that portion. In this way, the contentious portions are emphasized.

Some implementations provide specific annotation boxes to perform certain actions. In some implementations, an "issue box" can be created on the side of the document to point out a potential issue. In some implementations, a "purpose box" is displayed in the margin when a new clause is added, to explain why the new clause or phrase has been added (i.e., identify the purpose). In these ways, the reader can easily grasp the context of the change. In some implementations, the issue and purpose boxes move between the right-hand-side and the left-hand-side automatically depending on who has responded and where the document is in the editing process. In some implementations, when a lawyer first views the document and starts to mark it up, comments are added on right hand side. When sent to the lawyer's client, the comments remain on the right hand side. However, when the client sends the document back to the lawyer, the comments are displayed on the left hand side. In some implementations, if the lawyer adds additional comments and sends it back to the client, the "new" comments are displayed on the right hand side while the "old" comments are displayed on the left hand side.

Disclosed implementations provide a single cloud based document, which stores every version. Typically, versions are saved for each clause as well as the entire document. In contrast, when using a track-changes feature, each iteration (or "turn") commonly creates a new document. If you want to go back and review the history of a certain clause over time, you would need to manually open each file, print each clause of interest one by one with, and without, track changes, and then compare them side by side. Even this is not always possible because the document is sometimes edited without the tracking feature turned on, and hence the document loses one or more of the changes specific to that version.

In some implementations, the collaborative document creation platform is used for contract negotiation. In a normal contract negotiation process, a standard templated document is added to or modified by a vendor or a sell-side lawyer. Disclosed implementations provide various useful features, such as saved clauses that can be dragged and dropped inside a document when appropriate. In addition, all of the team members are automatically included within the document. As a practical matter, non-lawyer parties especially are not involved during the initial negotiations of a contract because the documents are difficult to read with strikethrough and formatting issues in a review mode. In disclosed implementations, in contrast, document versions are sent to the party for approval/rejection, and they (the parties) can view the reasons for the changes. A party can determine if the reasons are appropriate, and then pass the document back to a lawyer for further refinement. This further refinement enhances the contract negotiation process to facilitate quicker and less expensive contract negotiation.

In a typical contract negotiating process, the non-lawyer parties begin to address the more contentious issues only after several iterations between the lawyers. In contrast, the parties are involved from the beginning using the disclosed implementations, and are presented with all aspects of the negotiation. In some implementations, a client can delegate a number of turns to his legal counsel, thereby postponing client review until later. The parties can visually see problems and issues in the contract based on the colors of the clauses.

Some implementations also provide for secure contract execution online using a strong authentication process.

Some implementations make contract negotiation faster, more efficient, and generally better in various ways. For example, some implementations provide for live approval of suggested changes by lawyers. This can reduce the need for conference calls and additional time spent explaining the reasons for each change because the reasons are presented as part of the contract. Note that this is different from adding a simple comment in a typical word processing application because the issue, purpose, and comment boxes are separated from the text and it is easier to see who made which changes, where the changes were made, and why the changes were made.

Implementations clearly display the contentious issues or contentious areas of the document, where both sides are being held up. Resolving these issues or areas can reduce both time and cost.

Some implementations provide an "approve as final" button, which allows a user to transition the document into a signing mode, which both parties can execute in real time.

Some additional features provided by disclosed implementations include: the referencing abilities of an online database; the ability to show previous versions on top of areas of the document as an overlay (which can continuously update and reference previous versions and their mark ups).

In disclosed implementations, the basic unit is a single document. The single document has multiple stored versions. In addition, the single document stores local comments for each of the teams, and only other users associated with the same team can see the comments. For example, in a contract negotiating process, a party and a lawyer representing the party can have confidential communications right within the document, while that confidential communication is not visible to the opposing team. The opposing party and opposing lawyer never see their counterpart's comments or reasons why something has been changed. Nevertheless, in some implementations, all of the information is stored within a single file, which has multiple partitioned sections and versions visible only to the relevant people.

In contrast, most other conventional systems cannot manage too many changes and comments within one document, and therefore users end up manually creating new documents and accepting all the changes in earlier versions.

As noted above, in some implementations a party can view individual changes: a group of phrases or clauses that have a 1st change; phrases or clauses that have 2nd changes; phrases or clauses that have 3 or more changes; and phrases or clauses that have been amended then approved; and phrases or clauses that remain unchanged. Once all clauses have been approved or remained unchanged, the parties can approve the document as final and sign it, all of which is performed electronically.

In accordance with some implementations, a document creation platform includes one or more processors, memory, and one or more programs stored in the memory configured for execution by the one or more processors. The document creation platform provides a user interface for creating electronic documents. In some implementations, the electronic document is a contract being negotiated between two parties. In response to a first user input, the document creation platform creates an electronic document with a plurality of clauses. In response to a second user input in a first clause of the plurality of clauses, the platform designates a user-specified sequence of words in the first clause as a defined term and opens an addendum section of the electronic document to receive a user-specified definition of the term. The platform also creates a link from the term in the first clause to the definition of the term in the addendum. In response to a third user input, the platform inserts the term into the electronic document in a second clause distinct from the first clause. The platform later identifies a fourth user action at a location of the term in the electronic document. In some implementations, the fourth user action is a hover event. In some implementations, the fourth user action is a click event on the term. In response to identifying the fourth user action, automatically, without human interaction, the platform: determines that the term has an associated definition; retrieves a current version of the definition from the addendum section of the electronic document; and displays the retrieved current version of the definition in a separate window in the user interface proximate to the location of the fourth user action. In some implementations, the separate window is a pop-up window.

In some instances, the platform updates the definition based on user input in the provided user interface prior to identifying the fourth user action. In some instances, the retrieved current version of the definition includes the updates to the definition based on the user input, and the current version of the definition is different from a version of the definition at a time corresponding to the second user input.

In some implementations, the platform receives a later user input at the term in the first clause of the electronic document. In response, the platform modifies the term in the first clause and for each instance of the term at a respective location in the electronic document outside of the first clause, the platform updating the respective instance of the term to match the modified term in the first clause.

In accordance with some implementations, a document creation platform includes one or more processors, memory, and one or more programs stored in the memory configured for execution by the one or more processors. The document creation platform provides a user interface for creating electronic documents. In response to first user input, the document creation platform creates an electronic document with a plurality of clauses. In response to a second user input at a first clause in the electronic document, the document creation platform designates the first clause as a definition of a term specified by the user. The term is included in the first clause and the first clause is at a first location in the electronic document. In response to a third user input, the document creation platform inserts the term into the electronic document at a second location distinct from the first location. The document creation platform identifies a fourth user action at the second location in the electronic document. In response to identifying the fourth user action, the document creation platform automatically, without human interaction: determines that the second location includes the term and that the term is associated with the first clause; retrieves a current version of the first clause from the electronic document, and displays the retrieved current version of the first clause in a separate window in the user interface proximate to the term at the second location.

In accordance with some implementations, a contract negotiation platform includes one or more processors, memory, and a database. The database stores a plurality of contract documents and stores metadata for the contract documents. Each contract document comprises a plurality of phrases. Metadata for each contract document includes an identification of whether each respective phrase in the respective contract document has been agreed upon by the parties to the respective contract document. When a respective phrase has not been agreed upon by the parties, the metadata includes a count of the number of times that the respective phrase has been modified. The platform includes an edit tracking module, which updates the respective metadata for each phrase based on edits by the teams. The platform also includes a display module, which displays each contract document in accordance with the stored metadata for the phrases in the respective contract document. The phrases that have been agreed upon by the parties to the respective contract document are indicated by a first color. Phrases that have not been agreed upon by the parties to the respective contract document are indicated by a plurality of second colors according to the respective count of times the respective phrase has been modified.

In accordance with some implementations, a collaborative document creation platform includes one or more processors, memory, and a database. The database stores a plurality of documents. Each document is associated with two or more distinct teams, and each team has a plurality of users. The platform includes a graphical user interface. The graphical user interface includes a document edit window, enabling users of teams associated with each respective document to modify the respective document. The graphical user interface also includes a local comment affordance, which enables a user of a first team associated with a document to insert local comments, distinct from text of the document. The inserted local comments are restricted for review only by users of the first team associated with the document. In some implementations, the graphical user interface includes a global comment affordance, which enables a user of the first team associated with a document to insert global comments, distinct from text of the document. In some implementations, the inserted global comments are designated for review by all users of teams associated with the document. In some implementations, the user creating the global comment can designate which specific individuals or teams can review the global comment. The graphical user interface includes one or more comment display affordances, which display global comments for the document to all designated users and display a respective local comment for the document only to users of teams associated with the document who belong to the same team as an author of the respective local comment.

Thus methods and systems are provided that enable users to create documents in a collaborative environment, facilitating a faster and more efficient process.

BRIEF DESCRIPTION OF THE DRAWINGS

For a better understanding of the aforementioned implementations of the invention as well as additional implementations thereof, reference should be made to the Description of Implementations below, in conjunction with the following drawings in which like reference numerals refer to corresponding parts throughout the figures.

FIGS. 8A-8I are skeletal data structures that are used in some implementations of a document creation platform.

FIGS. 9-01-9-06 illustrate some of the steps in creating a new document in accordance with some implementations.

FIGS. 9-07 and 9-08 illustrate the use of issue and purpose boxes in accordance with some implementations.

FIGS. 9-09 and 9-10 illustrate tracking expenses in accordance with some implementations.

FIGS. 9-11 and 9-12 illustrate a clause that has been changed multiple times (outlined in orange in FIG. 9-11), and subsequently agreed upon (outlined in green in FIG. 9-12).

FIG. 9-13 illustrates a message box that may be displayed before submitting to an opposing team in accordance with some implementations.

FIG. 9-14 illustrates selection of a previous saved template clause in accordance with some implementations.

FIGS. 9-15 and 9-16 illustrate initial creation of document content in accordance with some implementations.

FIGS. 9-17-9-21 illustrate creating and using dynamic term definitions within a document in accordance with some implementations.

FIGS. 9-22 and 9-23 illustrate saving a template clause for later use in other documents in accordance with some implementations.

FIGS. 9-24 and 9-25 illustrate automatic recognition of keystrokes to build a list in accordance with some implementations.

FIGS. 9-26 and 9-27 illustrate creating a dynamic term definition within a document in accordance with some implementations.

FIGS. 9-28-9-34 illustrate an edit mode in which clauses are sorted based on the number of changes and the user interface enables review of previous clause versions, in accordance with some implementations.

FIG. 9-35 illustrates a user interface for one team member to provide clarification about a proposed change to the document in accordance with some implementations.

FIG. 9-36 illustrates a user interface for review of notifications in accordance with some implementations.

FIG. 9-37 illustrates a user highlighting a portion of the text and identifying an issue with that portion in accordance with some implementations.

FIGS. 9-38-9-40 illustrate some print options that are provided in accordance with some implementations.

FIG. 9-41 illustrates issue boxes displayed in the left margin when a document is viewed by the lawyer after the party has approved/rejected or amended and/or commented, in accordance with some implementations.

FIG. 9-42 illustrates recommendation options that are selected before forwarding a document to another team member in accordance with some implementations.

FIG. 9-43 illustrates one team member receiving comments from another team member regarding proposed document edits in accordance with some implementations.

FIGS. 9-44-9-53 illustrate a user identifying an issue in a paragraph and the subsequent options to provide comments or replacement text, followed by approval or rejection by another user of the same team, in accordance with some implementations.

FIG. 9-54 illustrates reviewing multiple versions of a clause in accordance with some implementations.

FIGS. 9-55-9-59 illustrate responding to an issue raised by an opposing party in accordance with some implementations.

FIGS. 9-60-9-67 illustrate adding a new clause to a document and the subsequent review in accordance with some implementations.

FIGS. 10A and 10B provide a flowchart of a process for dynamically referencing term definitions within a document according to some implementations.

Reference will now be made in detail to implementations, examples of which are illustrated in the accompanying drawings. In the following detailed description, numerous specific details are set forth in order to provide a thorough understanding of the present invention. However, it will be apparent to one of ordinary skill in the art that the present invention may be practiced without these specific details.

DESCRIPTION OF IMPLEMENTATIONS

Figure 1:
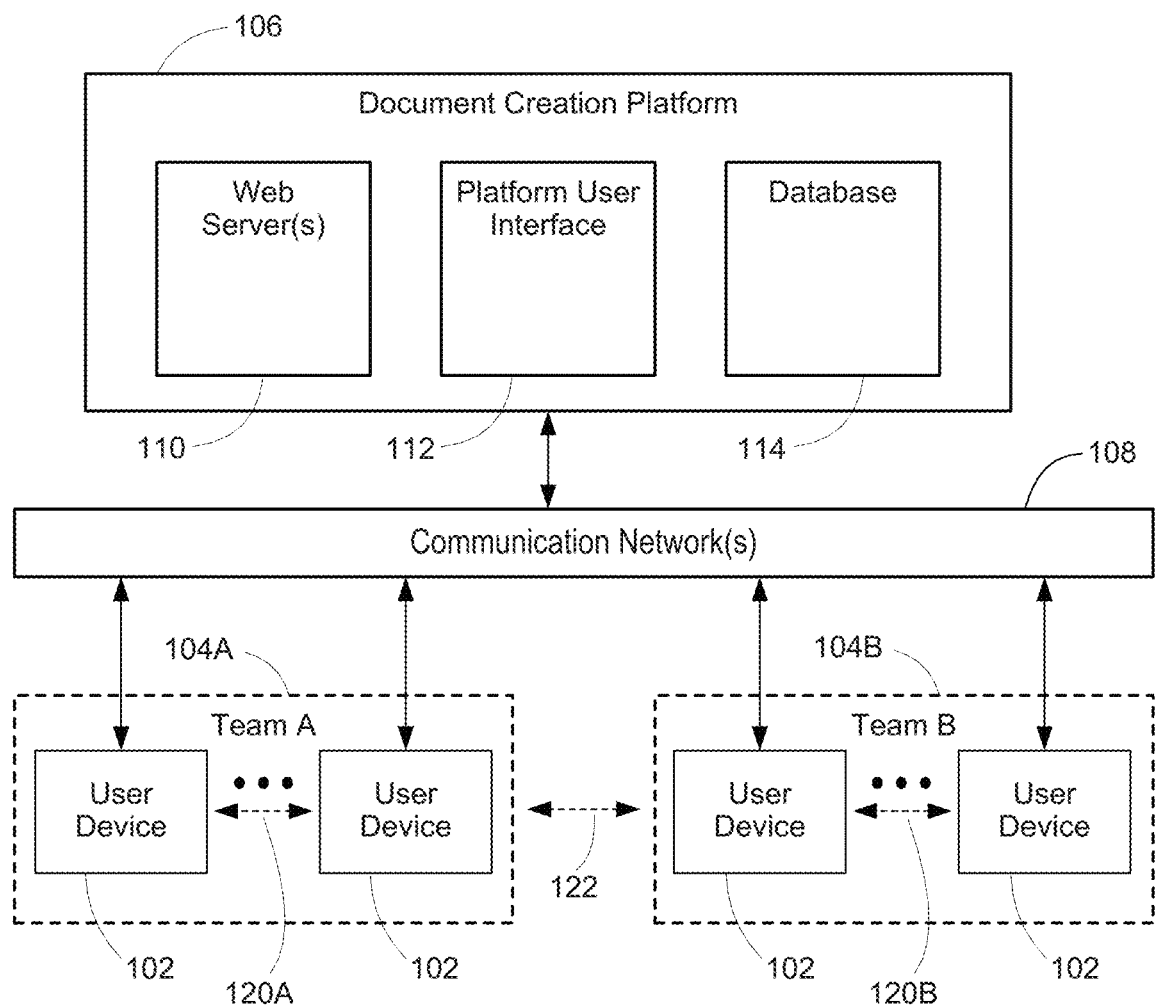
FIG. 1 illustrates a system architecture in which some implementations operate.
Figure 2:
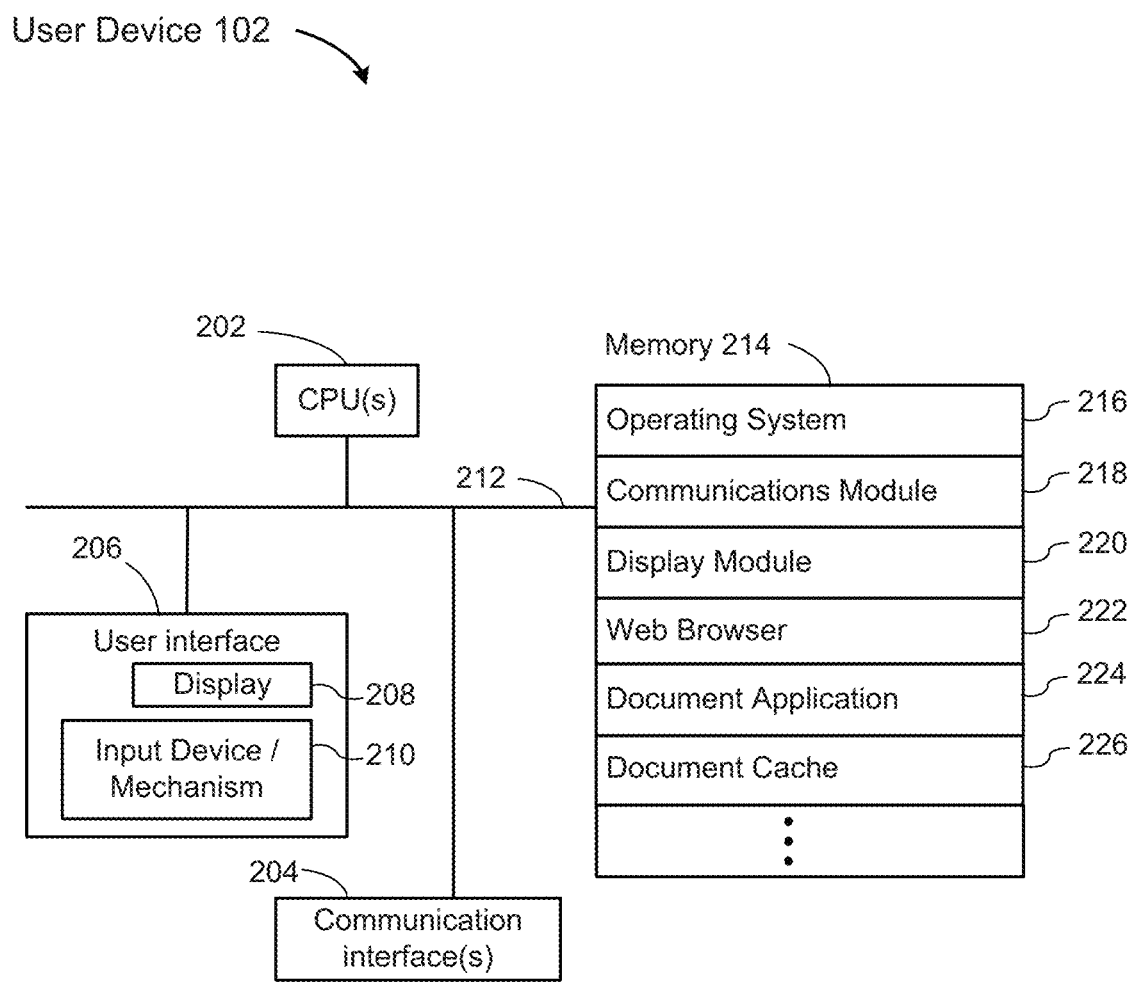
FIG. 2 is a block diagram of a client computing device according to some implementations.

FIG. 1 is a block diagram that illustrates the major components of some implementations. The various user devices 102 (also identified herein as client devices, computing devices, or devices) and servers 300 in a document creation platform 106 communicate over one or more networks 108 (such as the Internet). A user device 102 may be a smart phone, a tablet computer, a laptop computer, a desktop computer, or other computing device that has access to a communication network 108 and can run a web browser 222 (FIG. 2) or document application 224 (FIG. 2). In some implementations, the document application 224 (FIG. 2) runs within a web browser 222 (FIG. 2).

Figure 3:
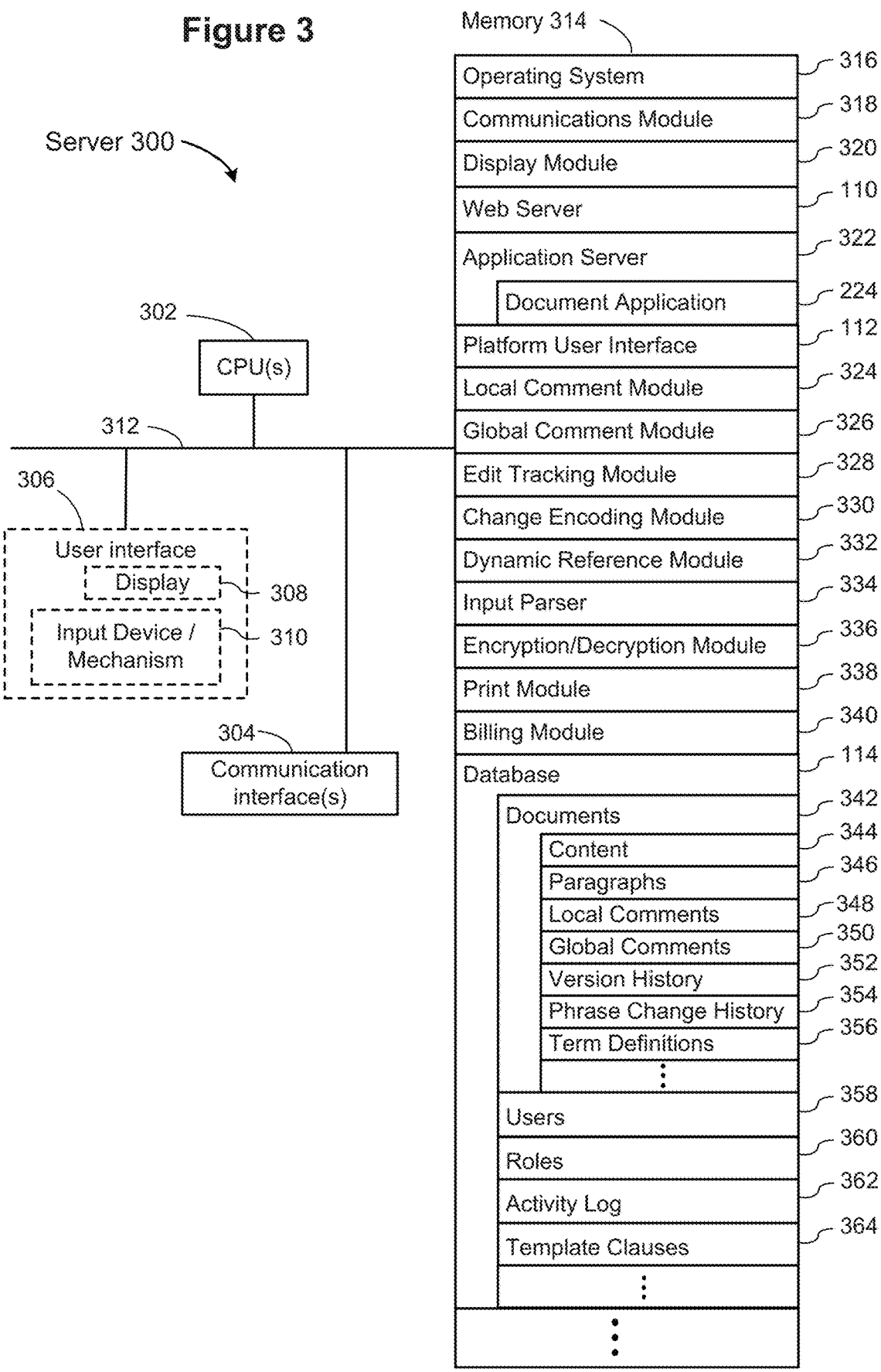
FIG. 3 is a block diagram of a server that may be used for a document creation platform according to some implementations.

In some implementations, the document creation platform 106 consists of a single server 300 (FIG. 3). More commonly, document creation platform 106 includes a plurality of servers 300 (FIG. 3). In some implementations, the document creation platform 106 includes one or more web servers 110, which receive requests from users (e.g., from user devices 102) and return appropriate information, resources, links, and so on. In some implementations, the document creation platform 106 includes one or more application servers 322 (FIG. 3), which provide various applications, such as a document application 224 (FIG. 2). The document creation platform 106 includes a user interface module 112, which provides the web pages for a web based document creation platform 106. The document creation platform 106 typically includes one or more databases 114, which store information such as web pages and documents 342 (FIG. 3).

The user devices 102 are typically grouped into two or more teams 104, such as Team A 104A and Team B 104B in FIG. 1. In most cases, each team 104 includes two or more users. Because the documents 342 (FIG. 3) are stored at the document creation platform 106, communication 120 between users within one team uses the network (e.g., by attaching comments or recommendations to the document). As indicated here the communication within each team (e.g., communication 120A and 120B) is only visible to other members of the same team. On the other hand, other implementations provide a second means 122 for communicating comments between all members of both teams 104A and 104B.

FIG. 2 is a block diagram illustrating a user device 102 that a user uses to access a document creation platform 106 (FIG. 1). A user device is also referred to as a computing device, a client device, or a device. A user device may be a tablet computer, a laptop computer, a smart phone, a desktop computer, a PDA, or other computing device that can run a document application 224 or web browser and has access to a communication network 108. A user device 102 typically includes one or more processing units (CPUs) 202 for executing modules, programs, or instructions stored in memory 214 and thereby performing processing operations; one or more network or other communications interfaces 204; memory 214; and one or more communication buses 212 for interconnecting these components. The communication buses 212 may include circuitry (sometimes called a chipset) that interconnects and controls communications between system components. A user device 102 includes a user interface 206 comprising a display device 208 and one or more input devices or mechanisms 210. In some implementations, the input device/mechanism includes a keyboard and a mouse; in some implementations, the input device/mechanism includes a "soft" keyboard, which is displayed as needed on the display device 208, enabling a user to "press keys" that appear on the display 208.

In some implementations, the memory 214 includes high-speed random access memory, such as DRAM, SRAM, DDR RAM or other random access solid state memory devices. In some implementations, the memory 214 includes non-volatile memory, such as one or more magnetic disk storage devices, optical disk storage devices, flash memory devices, or other non-volatile solid state storage devices. In some implementations, the memory 214 includes one or more storage devices remotely located from the CPU(s) 202. The memory 214, or alternately the non-volatile memory device(s) within the memory 214, comprises a non-transitory computer readable storage medium. In some implementations, the memory 214, or the computer readable storage medium of the memory 214, stores the following programs, modules, and data structures, or a subset thereof:

- an operating system 216, which includes procedures for handling various basic system services and for performing hardware dependent tasks;
- a communications module 218, which is used for connecting the user device 102 to other computers and devices via the one or more communication network interfaces 204 (wired or wireless) and one or more communication networks 108, such as the Internet, other wide area networks, local area networks, metropolitan area networks, and so on;
- a display module 220, which receives input from the one or more input devices 210, and generates user interface elements for display on the display device 208;
- a web browser 222, which enables a user to communicate over a network 108 (such as the Internet) with remote computers or devices;
- a document application 224, which enables the user to collaboratively create documents using a document creation platform 106. In some implementations, the document application 224 runs within the web browser 222, but in other implementations the document application 224 runs as a standalone application; and
- a document cache 226, which stores local copies of certain document data while the user is editing the document. In some implementations, the document cache 226 is provided by the web browser 222.

Each of the above identified executable modules, applications, or sets of procedures may be stored in one or more of the previously mentioned memory devices and corresponds to a set of instructions for performing a function described above. The above identified modules or programs (i.e., sets of instructions) need not be implemented as separate software programs, procedures, or modules, and thus various subsets of these modules may be combined or otherwise re-arranged in various implementations. In some implementations, the memory 214 stores a subset of the modules and data structures identified above. Furthermore, the memory 214 may store additional modules or data structures not described above.

Although FIG. 2 shows a user device 102, FIG. 2 is intended more as a functional description of the various features that may be present rather than as a structural schematic of the implementations described herein. In practice, and as recognized by those of ordinary skill in the art, items shown separately could be combined and some items could be separated.

FIG. 3 is a block diagram illustrating a server 300 that may be used in a document creation platform 106. A typical document creation platform 106 includes many individual servers 300, which may be hundreds or thousands. A server 300 typically includes one or more processing units (CPUs) 302 for executing modules, programs, or instructions stored in the memory 314 and thereby performing processing operations; one or more network or other communications interfaces 304; memory 314; and one or more communication buses 312 for interconnecting these components. The communication buses 312 may include circuitry (sometimes called a chipset) that interconnects and controls communications between system components. In some implementations, a server 300 includes a user interface 306, which may include a display device 308 and one or more input devices 310, such as a keyboard and a mouse.

Figure 6:
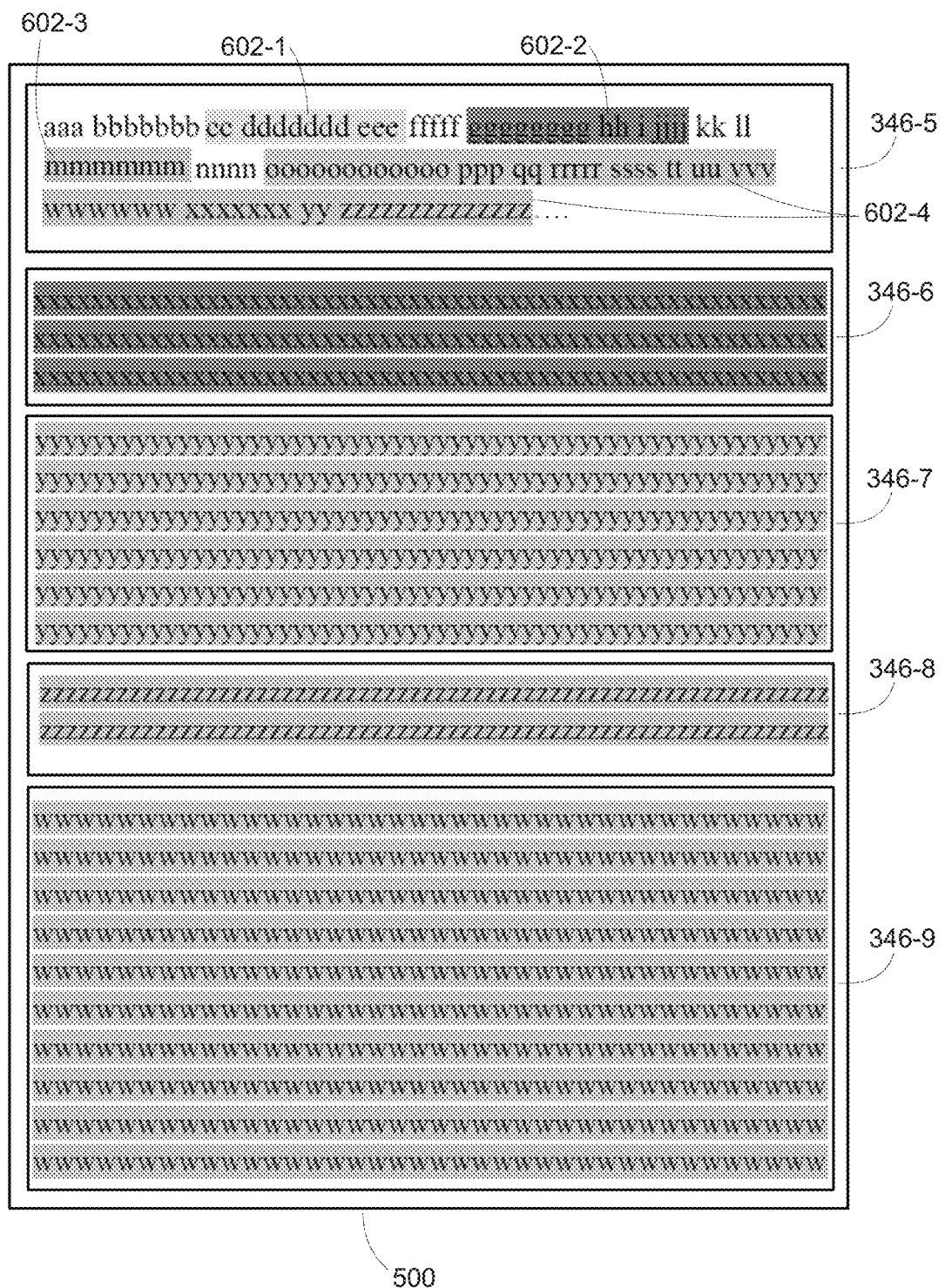
FIG. 6 illustrates color encoding of phrases in a document to indicate change history in accordance with some implementations.
Figure 7:
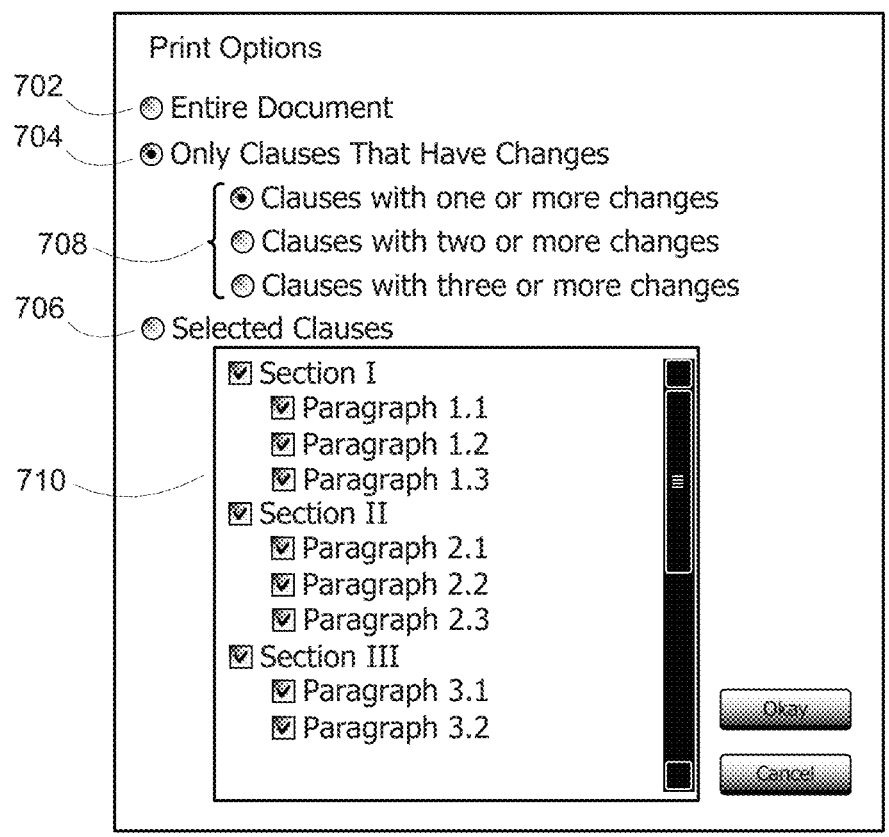
FIG. 7 illustrates a process of printing specific clauses within a document in accordance with some implementations.
Figure 8G:
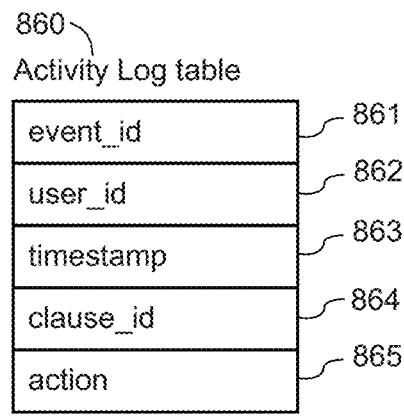
Figure 8H:
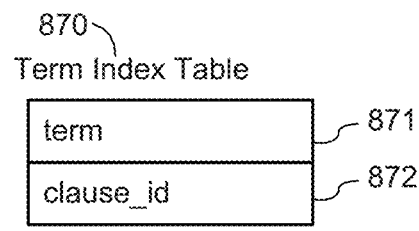
Figure 8I:
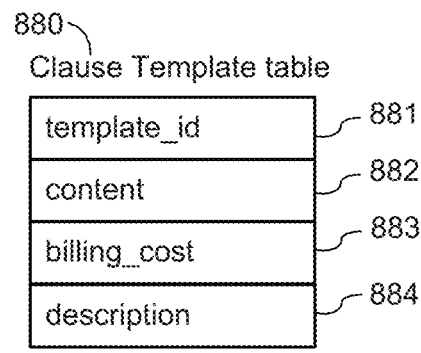

In some implementations, the memory 314 includes high-speed random access memory, such as DRAM, SRAM, DDR RAM or other random access solid state memory devices. In some implementations, the memory 314 includes non-volatile memory, such as one or more magnetic disk storage devices, optical disk storage devices, flash memory devices, or other non-volatile solid state storage devices. In some implementations, the memory 314 includes one or more storage devices remotely located from the CPU(s) 302. The memory 314, or alternately the non-volatile memory device(s) within the memory 314, comprises a non-transitory computer readable storage medium. In some implementations, the memory 314, or the computer readable storage medium of the memory 314, stores the following programs, modules, and data structures, or a subset thereof:

- an operating system 316, which includes procedures for handling various basic system services and for performing hardware dependent tasks;
- a communications module 318, which is used for connecting the server 300 to other computers via the one or more communication network interfaces 304 (wired or wireless), an internal network or bus between servers 300, or communication networks 108, such as the Internet, other wide area networks, local area networks, metropolitan area networks, and so on;
- a display module 320, which receives input from one or more input devices 310, and generates user interface elements for display on a display device 308;
- one or more web servers 110, which receive requests from the user device 102, and return responsive web pages, resources, or links. In some implementations, each request is logged in the database 114 (e.g., in the activity log 362);
- one or more application servers 332, which provide various applications (such a document application 224) to the user devices 102. In some instances, applications are provided as a set of web pages, which are delivered to the user devices 102 and displayed in a web browser 222. The web pages are delivered as needed or requested. In some instances, an application is delivered to a user device 102 as a download, which is installed and run from the user device 102 outside of a web browser 222;
- a platform user interface 112, which may be provided to user devices 102 as a standalone document application 224 or a set of web pages that are delivered by the web server 110 as needed;
- a local comment module 324, which provides user interface affordances for creating and displaying local comments 348, and uses the roles 360 to limit access to each comment to members of the same team as the comment author. Local comments 348 are stored as part of the document 342 for which they were created. Each local comment 348 is generally associated with a specific clause, paragraph, or phrase 346. In some implementations, local comments can be associated with specific issue or purpose boxes;
- some implementations include a global comment module 326, which provides user interface affordances for creating and displaying global comments 350, which are distinct from local comments 348. In some implementations, local comments 348 and global comments share the same user interface affordances, with a user interface control to specify which type of comment is being created or displayed. In some implementations, the global comment module 326 provides a messaging interface for sending global comments 350 to all users associated with a document. In some implementations, the global comment module 326 can associate a global comment with a specific paragraph, clause, or phrase in the document 342. In some implementations, global comments are not associated with a specific portion of the document, and apply to the document as a whole;

an edit tracking module 328, which updates the phrase change history 354 for each phrase based on edits by the parties. In particular, the edit tracking module tracks the number of changes to each phrase or paragraph 346 and whether the wording of the phrase or paragraph has been agreed to by the parties. In some implementations, the changes are tracked by paragraph or clause 346. In some implementations, the changes are tracked at a more granular phrase level. In some implementations, the tracked number of changes has an upper limit (such as three). Typically, the count of changes is incremented only when one team changes the wording of a clause received from the opposing team, and the count is incremented by one regardless of the number of changes to the clause by the team during a single document iteration. In some implementations, the phrase change history 354 captures all of the individual changes sequentially, even if counted as a "single" change for purposes of the change count. Note that the opposing team sees only the "final" changes, and not the interim changes. In some implementations, the phrase change history 354 includes only final changes;

a change encoding module 330, which displays phrases or paragraphs 346 differently based on the number of changes and whether the wording has been agreed to by the parties. In some implementations, agreed portions are displayed in green, and portions with changes are displayed with blue, orange, or red depending on the number of changes. In some implementations, color coding is applied as an outline for a paragraph, typically using rectangles, as illustrated in some of the screen shots in FIGS. 9-01-9-67. In some implementations, highlight patterns, font characteristics, or other techniques are used in addition to, or instead of color to visually encode the changes. Color encoding is illustrated in FIG. 6 and some of the screen shots in FIGS. 9-01-9-67 (with color rendered in grayscale in the figures);

a dynamic reference module 332, which enables a user to create term definitions 356 in a document 342 and dynamically reference those definitions 356 by using the term at other locations within the document 342. In some implementations, a user can initiate creation of a definition 356 using a simple keystroke combination, such as a bracket "[" and a capital letter, a capitalized word within brackets, a colon ":" and a capital, or other designated alternatives. When a document contains a dynamic reference to a term definition 356 within a document 342, user action in the vicinity of the term (e.g., hovering) brings up the current definition from the document. This is illustrated below in FIG. 5;

an input parser 334, which can identify a user action based on keystrokes. For example, the input parser 334 can identify when a user is creating a term definition 356 or a reference to a term definition based on keystrokes, such as a bracket and a capital letter, as indicated above with respect to the dynamic reference module;

an encryption/decryption module 336, which is used to secure each document 342, including the document content 344, as well as metadata, including local comments 348 and global comments 350. Typically, the encryption and decryption are performed at the document creation platform 106, and is thus transparent to users;

a print module 338, which provides printing features that are not available in typical word processing applications. As illustrated in FIG. 7, some implementations facilitate printing based on clauses or paragraphs within a document rather than by pages. Some implementations enable printing of clauses based on the number of changes, or user selection of specific clauses. Some implementations enable a user to print clauses based on a previous selection (e.g., reprint the same clauses that were printed an hour ago). Clause-based printing provides users a simple way to print exactly what is needed, and corresponds to the way the user interacts with the document. For example, a user focused on an indemnity clause wants to print that clause, regardless of the position in the document, regardless of what pages it spans, and regardless of whether it is at a different location based on document edits by other users;

a billing module 340, which tracks activity with respect to the document in order to correctly bill the appropriate parties. In some implementations, the billing module handles charges for the document creation platform 106, as well as charges for some of the users based on their time. For example, when a client is represented by an attorney, the attorney's time can be tracked and billed. In some implementations, created for one document 342 can be saved as template clauses 364 in the database 114 for future use in other documents. A template clause 364 can be saved with a billing cost, which represents a value assigned to the clause when it can be re-used in lieu of creating a new clause from scratch. When later used, the billing cost is tracked by the billing module;

one or more databases 114, which store various data used by the modules or programs identified above. The database 114 stores documents 342, including content 344 and metadata. For each document 342, the database 114 stores version history 352, both for the document as a whole as well as individual paragraphs 346 or clauses within the document 342;

the database 114 stores a list of users 358 and a set of roles 360 that correlate the users 358 to documents and which teams they belong to for each document;

the database 114 stores an activity log 362, which stores all activities with respect to each document, including content editing, identification of issues, creation of new clauses, creation of local comments, creation of global comments, and so on; and the database stores template clauses 364, which can be reused in later documents.

Each of the above identified elements in FIG. 3 may be stored in one or more of the previously mentioned memory devices. Each executable program, module, or procedure corresponds to a set of instructions for performing a function described above. The above identified modules or programs (i.e., sets of instructions) need not be implemented as separate software programs, procedures or modules, and thus various subsets of these modules may be combined or otherwise re-arranged in various implementations. In some implementations, the memory 314 stores a subset of the modules and data structures identified above. Furthermore, the memory 314 may store additional modules or data structures not described above.

Although FIG. 3 illustrates a server 300. FIG. 3 is intended more as a functional illustration of the various features that may be present in a set of one or more servers rather than as a structural schematic of the implementations described herein. In practice, and as recognized by those of ordinary skill in the art, items shown separately could be combined and some items could be separated. The actual number of servers used to implement these features, and how features are allocated among them, will vary from one implementation to another, and may depend in part on the amount of data traffic that the system must handle during peak usage periods as well as during average usage periods.

Figure 4:
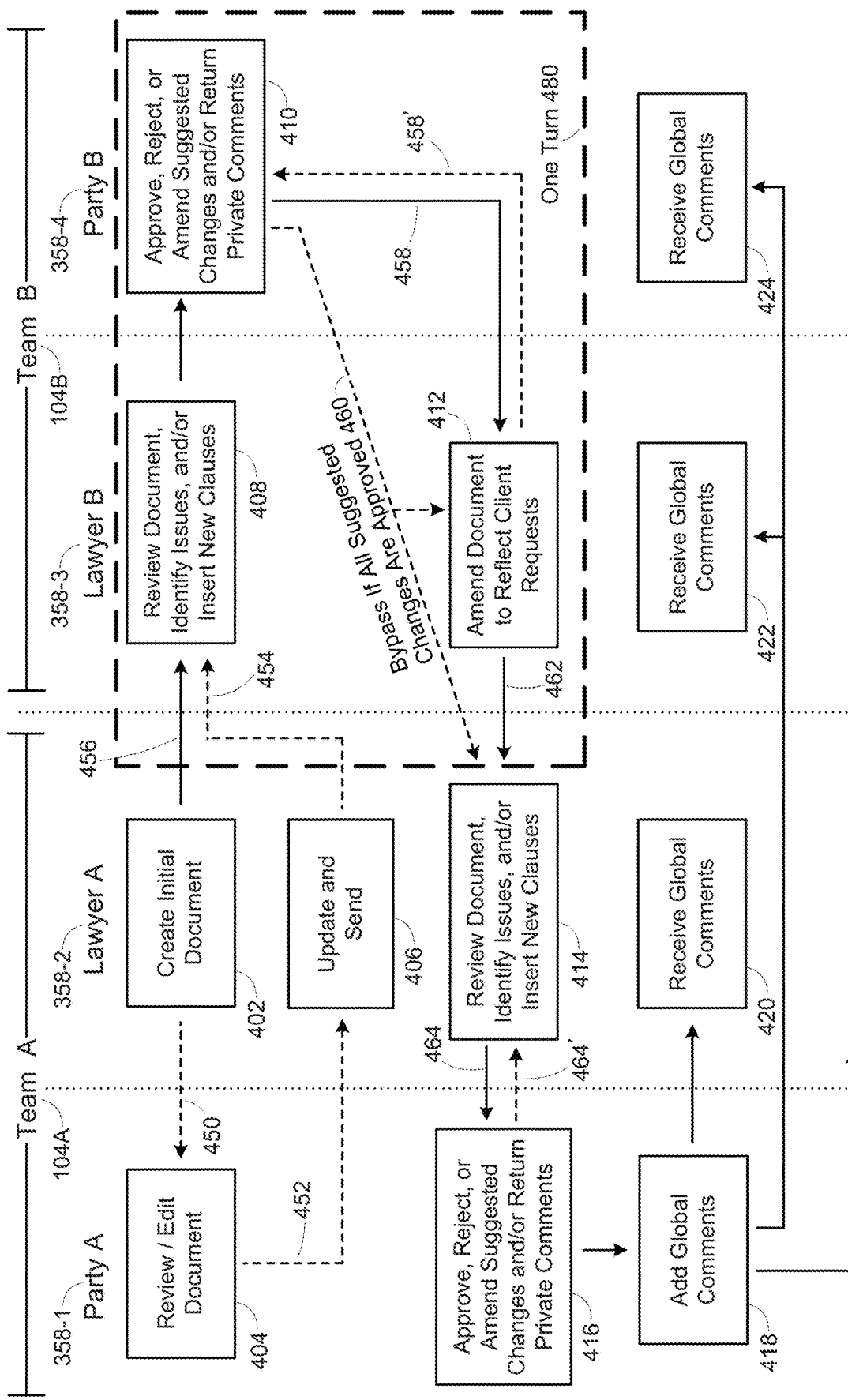
FIG. 4 illustrates a sample process flow for creating a document using a document creation platform in accordance with some implementations.

FIG. 4 illustrates a sample process flow for creating a document using a document creation platform 106 in accordance with some implementations. In this example, Team A 104A includes a party 358-1 and a corresponding attorney 358-2, and Team B includes a party 358-4 and a corresponding attorney 358-3. In some instances, a team does not include an attorney. For example, a team can have multiple users with different roles in a document creation process. Here, Lawyer A 358-2 creates (402) an initial draft of a document 342, such as a contract. Typically the document is then sent (456) to Lawyer B 358-3. In some implementations, Lawyer A can send (450) the draft to Party A 358-1, who reviews (404) the initial draft and sends (452) it back to Lawyer A 358-2. Lawyer A updates (406) the draft based on the edits and/or comments from Party A 358-1, and sends (454) the draft to Lawyer B 358-3.

Lawyer B 358-3 reviews (408) the document, identifies (408) issues, and/or inserts (408) new clauses into the document. In some instances, Lawyer B 358-3 inserts local comments and/or recommendations for Party B 358-4. Because of the comments and recommendations 348 by Lawyer B, Party B 358-4 is directed to relevant portions of the document 342. For each identified item. Party B 358-4 can approve (410), reject (410), or amend (410) the changes, and/or return (410) private (local) comment to Lawyer B 358-3. For example, Lawyer B 358-3 may have identified some issues or paragraphs that should be added ("purposes"). Lawyer B 358-3 provides comments 348 for each of these proposed changes or issues. While reviewing the document 342, Party B 358-4 may request clarification on some of the issues.

Typically, the document is sent (458) back to Lawyer B to amend (412) the document according to the client requests. In some cases, the document is sent (458') back to Party B 358-4. The communication 458/458' between Lawyer B and Party B may go back and forth multiple times while Lawyer B clarifies the issues, inserts new clauses, and identifies additional issues. Note that all of the local comments and recommendations 348 between Lawyer B and Party B are private to Team B 104B, and are not visible to Team A 104A.

If Party B approves all of the suggested changes by Lawyer B, the document can be sent (460) directly to Lawyer A 358-2, bypassing further amendment by Lawyer B. Of course Lawyer B also receives the document, which is displayed with one or more green boxes indicating the approvals. On the other hand, Lawyer A and Party A just see the new changes, which are color coded based on the number of times the terms, phrases, or paragraphs have been changed.

The outlined box 480 indicates one turn of the document creation process. The turn begins when the document is received from the opposing lawyer (454 or 456 here) and the turn is completed when the document goes back to the opposing lawyer (460 or 462 here). A turn is also referred to herein as an iteration. Based on the complexity of the document, the skill of the users, the length of the document, and so on, there can be any number of turns before the process is complete. However, because the parties 358-1 and 358-4 are actively involved from the outset, the process is streamlined.

In the next turn, in this example, Lawyer A reviews (414) the document, identifies (414) issues, and/or inserts (414) new clauses. Lawyer A then forwards (464) the document to Party A, typically with comments 348 and recommendations. Party A then approves (416) the changes, rejects (416) the changes, or amends (416) the changes, and/or returns (416) private (local) comments 348 to seek clarification or provide Lawyer A with instructions. As noted above with respect to Team B 104B, the communication process (464 and 464') between Party A and Lawyer A may be repeated as many times as necessary.

In the example illustrated in FIG. 4, Party A then creates (418) global comments 350, which are transmitted to all of the users associated with the document. In some implementations, global comments are implemented using a messaging interface that is part of the graphical user interface of the document creation platform 106. Whereas local comments 348 are private within a team, a global comment 350 is seen by a set of users selected by the author of the global comment (typically everyone). In some implementations, global comments are transmitted using a messaging or communication protocol. In this example, the global comments 350 are designated for everyone, so the global comments are received (420) by Lawyer A 358-2, received (422) by Lawyer B 358-3, and received (424) by Party B 358-4.

As illustrated in FIG. 4, the negotiation process continues (466) with an iterative process until the parties reach final agreement.

Figure 5:
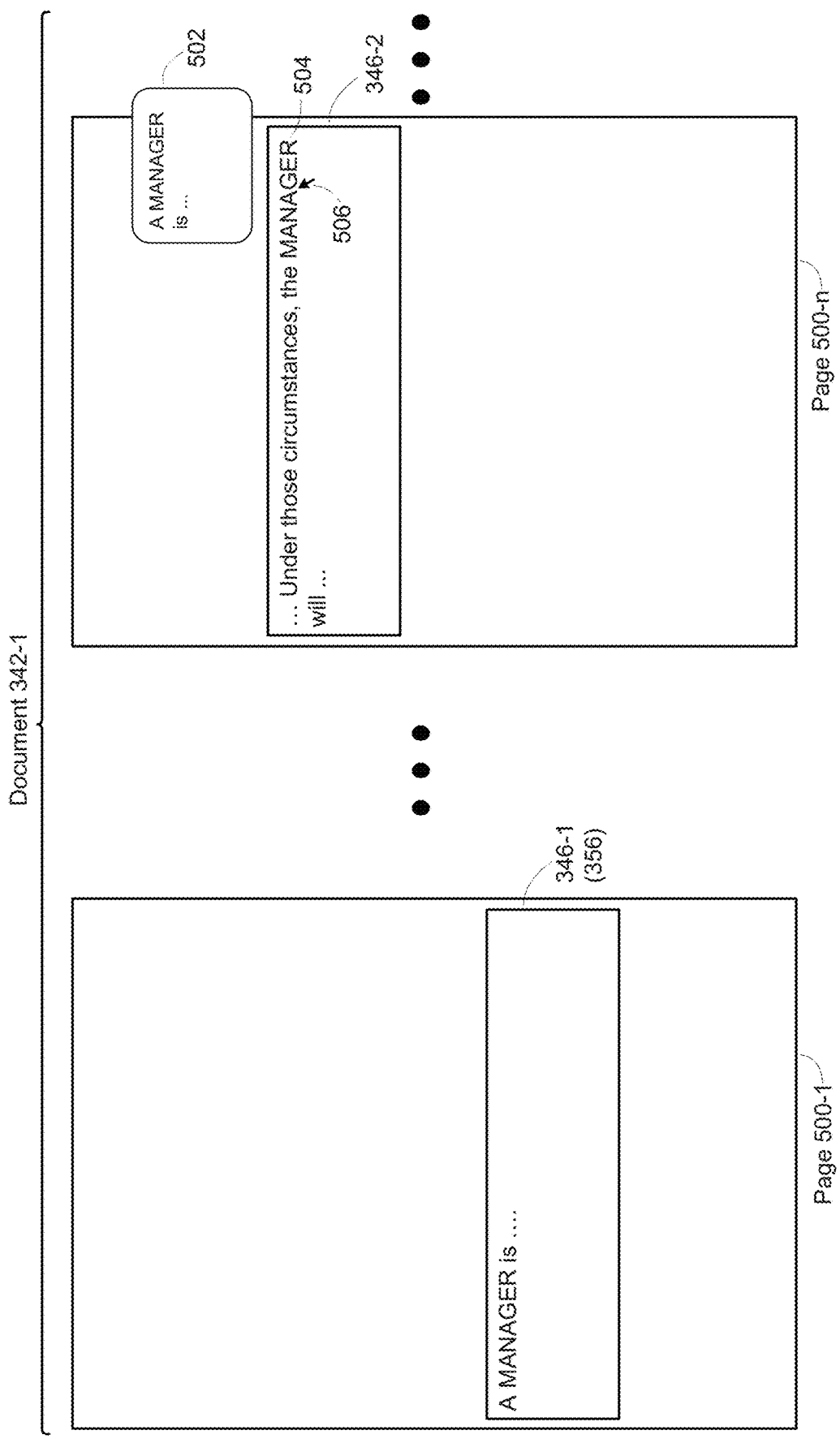
FIG. 5 illustrates dynamic references to term definitions within a document in accordance with some implementations.

FIG. 5 illustrates dynamic references to term definitions within a document in accordance with some implementations. FIG. 5 depicts a single document 342-1 that includes multiple pages, including a page 500-1 and another page 500-n. The first page 500-1 includes a paragraph 346-1 with is a definition 356 of the term "MANAGER." In some implementations, the first page 500-1 or the first paragraph 346-1 is an addendum section of the document 342-1. The definition in the first paragraph 346-1 was inserted when the user designated inserted the defined term ("MANAGER") into another paragraph (e.g., the second paragraph 346-2). In some implementations, the dynamic reference module 332 or the input parser 334 identifies when a term is a likely to be used as a defined term and prompts the user to provide a definition. For example, when a word with all capital letters is entered, some implementations recognize it as a probable term being defined. In some implementations, entering "'the'" followed by a word beginning with a capital letter is identified as a probable start of a term definition. Even after a definition has been created, the definition is dynamic. That is, the definition can be changed. Some implementations also allow the defined term to change. For example, a user could change "MANAGER" to "DIRECTOR," at which point the definition in the first paragraph 346-1 becomes a definition of DIRECTOR. When the name of the defined term is changed, the dynamic reference module 332 finds all references to the defined term. In some implementations, all of the references are automatically updated with the new term. In some implementations, the dynamic reference module goes through the list of references and prompts for user confirmation before updating each reference.

On the nth page 500-n, the term MANAGER 504 is included in another paragraph 346-2, and the term refers back to the definition on the first page 500-1. When the user takes an action at or near the term 504 (e.g., hovering the mouse cursor 506 over the term), the dynamic reference module 332 displays the definition. In some implementations, the definition is displayed in a pop-up 502. When the definition pops up, the current definition as stored in the document is displayed. Even if the paragraph 346-2 has not changed, the definition 356 on the first page 346-1 may have changed, and the updated definition is displayed. In some implementations, definitions are included in addenda at the end of the document or at the beginning of a document in a definitions section.

In some implementations, when a term 504 references an addendum and the user hovers in the vicinity of the term, the user interface displays a smaller image of the attached addendum with the addendum name above it. When a user clicks on the smaller image, the user interface jumps to that addendum in the appendix section.

FIG. 6 illustrates color encoding of phrases in a document to indicate change history in accordance with some implementations. This figure illustrates color encoding based on individual words or groups of words in the first paragraph 346-5, and color encoding based on paragraphs for paragraphs 346-6-346-9. An actual implementation uses only one or the other of these encoding methods. As used herein, the term "phrase" can refer to either an entire paragraph or clause, or to a group of adjacent words within a paragraph. Although FIG. 6 is rendered in black-and-white, the typical implementations use color, so the different shades of gray here are indicative of the different colors. Some implementations use color to encode the text itself instead of, or in addition to, highlighting.

In some implementations, color encoding is used to outline each paragraph or clause box using a single color based on the greatest number of changes to any portion of the paragraph or clause. For example, if a paragraph has been changed twice without agreement, it is displayed outlined in orange. If the paragraph has been amended then approved, it is displayed outlined in green regardless of which specific portions have been modified. Some implementations use color coding both at the paragraph level and at the level of individual terms or phrases within a paragraph. For example, a paragraph that has been amended is displayed outlined in a color that corresponds to the number of times that the paragraph has been changed, and individual amended words or phrase are highlighted in a color that corresponds to the number of times that the word or phrase has been amended. Some implementations use color coding only for individual words or phrases. For paragraph based color coding, it is possible for some portions of a paragraph to have agreement while other portions are still being negotiated. In this case, the outline is displayed with a color based on the maximum number of changes where agreement has not been reached.

In the first paragraph in this example, the phrase 602-1 is colored blue to indicate that it has changed one time, the phrase 602-3 is colored orange to indicate that it has changed twice, and the phrase 602-2 is colored red to indicate that it has changed three or more times. The longer phrase 602-4 is highlighted with green to indicate that it has been agreed to by the parties, regardless of the number of changes it went though before reaching the agreement. The color encoding makes it easy to spot "red" issues.

Color encoding for paragraphs 346-6-346-9 is illustrated here based on entire paragraphs. In an implementation that encodes at the paragraph level, each paragraph has a single color, and that color represents the number of changes to that paragraph, regardless of where the changes occurred in the paragraph. Here, the second paragraph 346-6 is colored red to indicate that it has been changed three or more times without reaching agreement. On the other hand, the third, fourth, and fifth paragraphs 346-7, 346-8, and 346-9 are colored green to indicate that the parties have agreed on the wording. This draws a user's attention to the portions that are the most contentious, helping to resolve the problems more quickly.

Figures 1, 9:
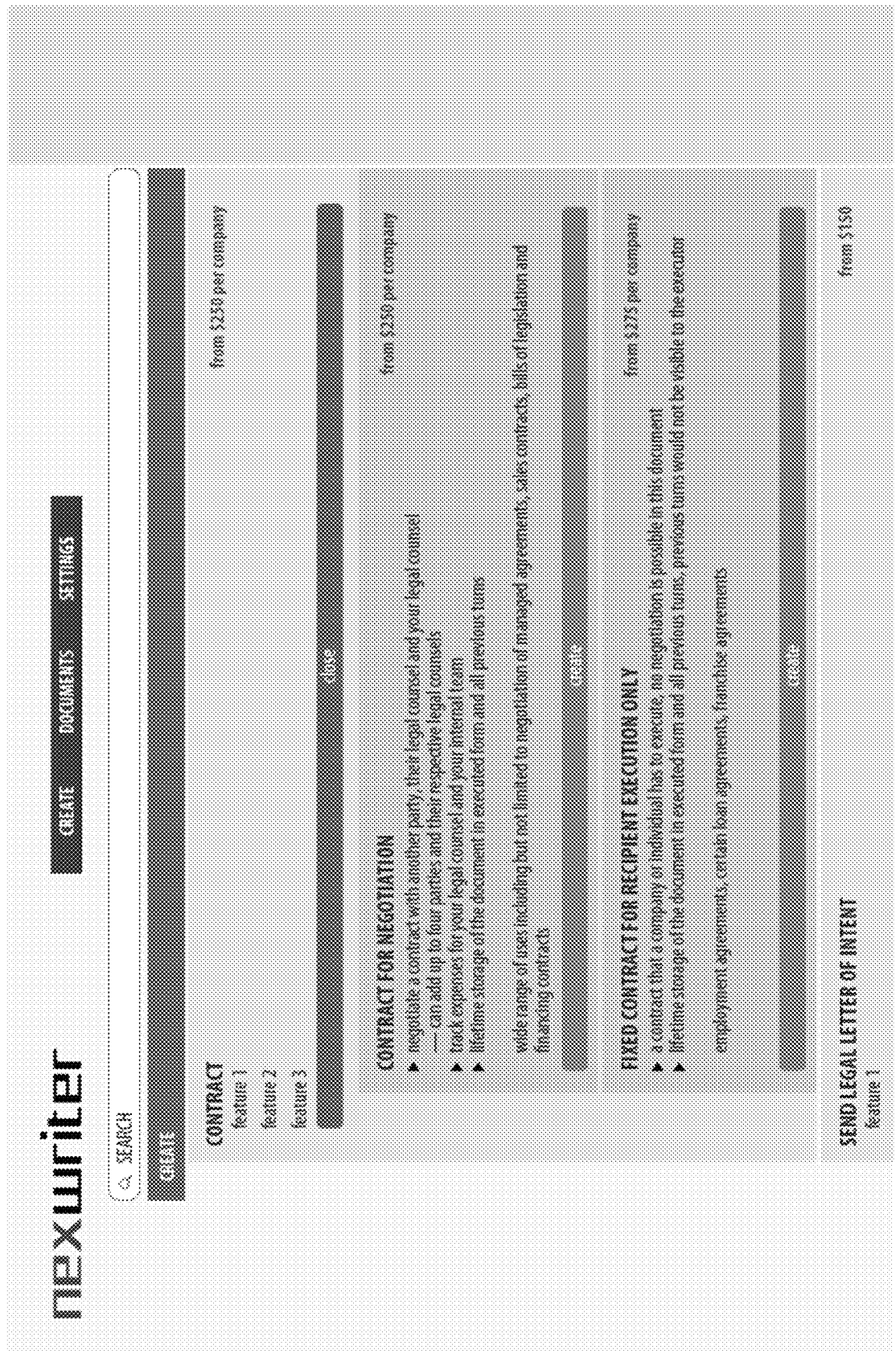
Figures 3, 9:
Figures 4, 9:
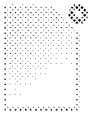
Figures 5, 9:
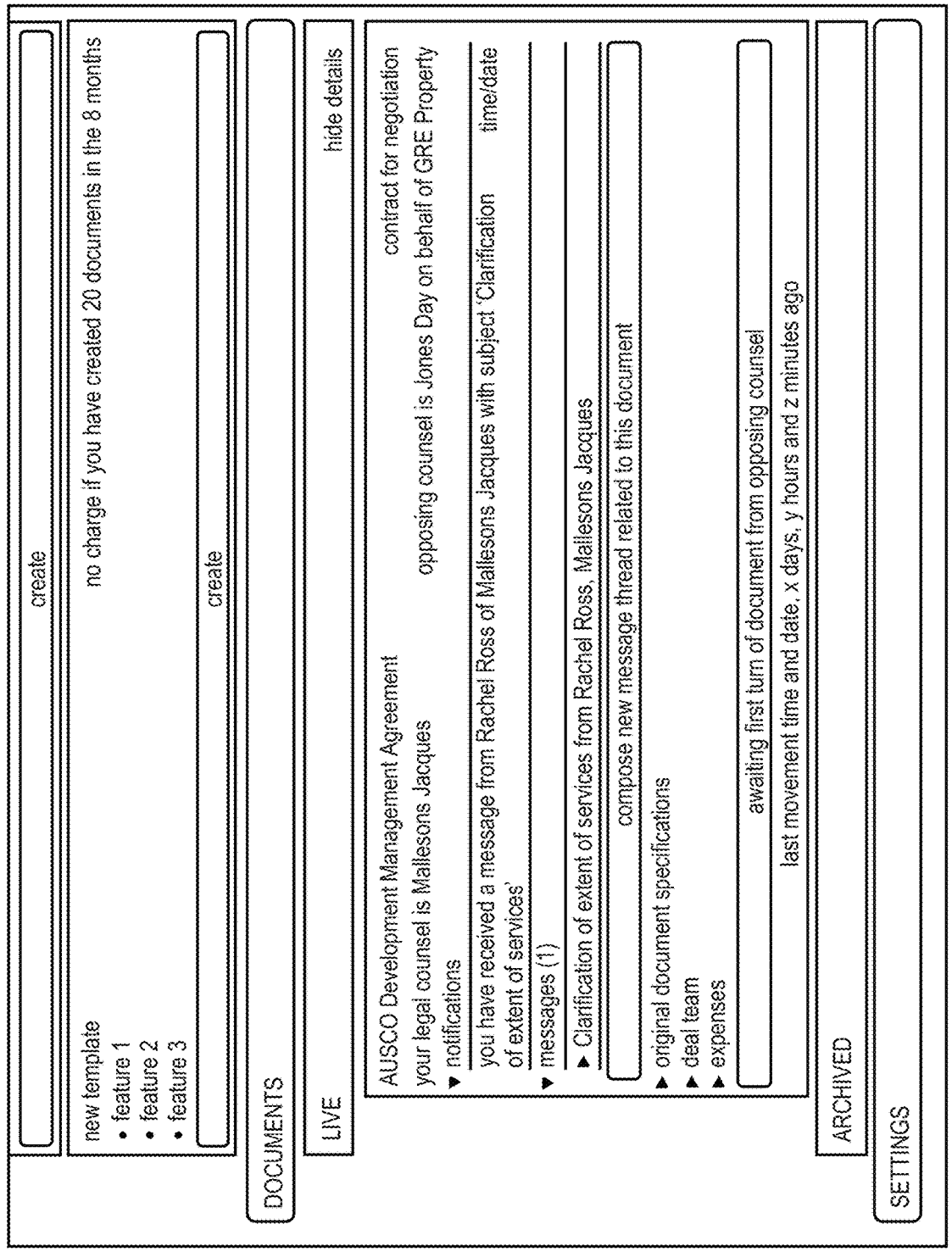
Figures 6, 9:
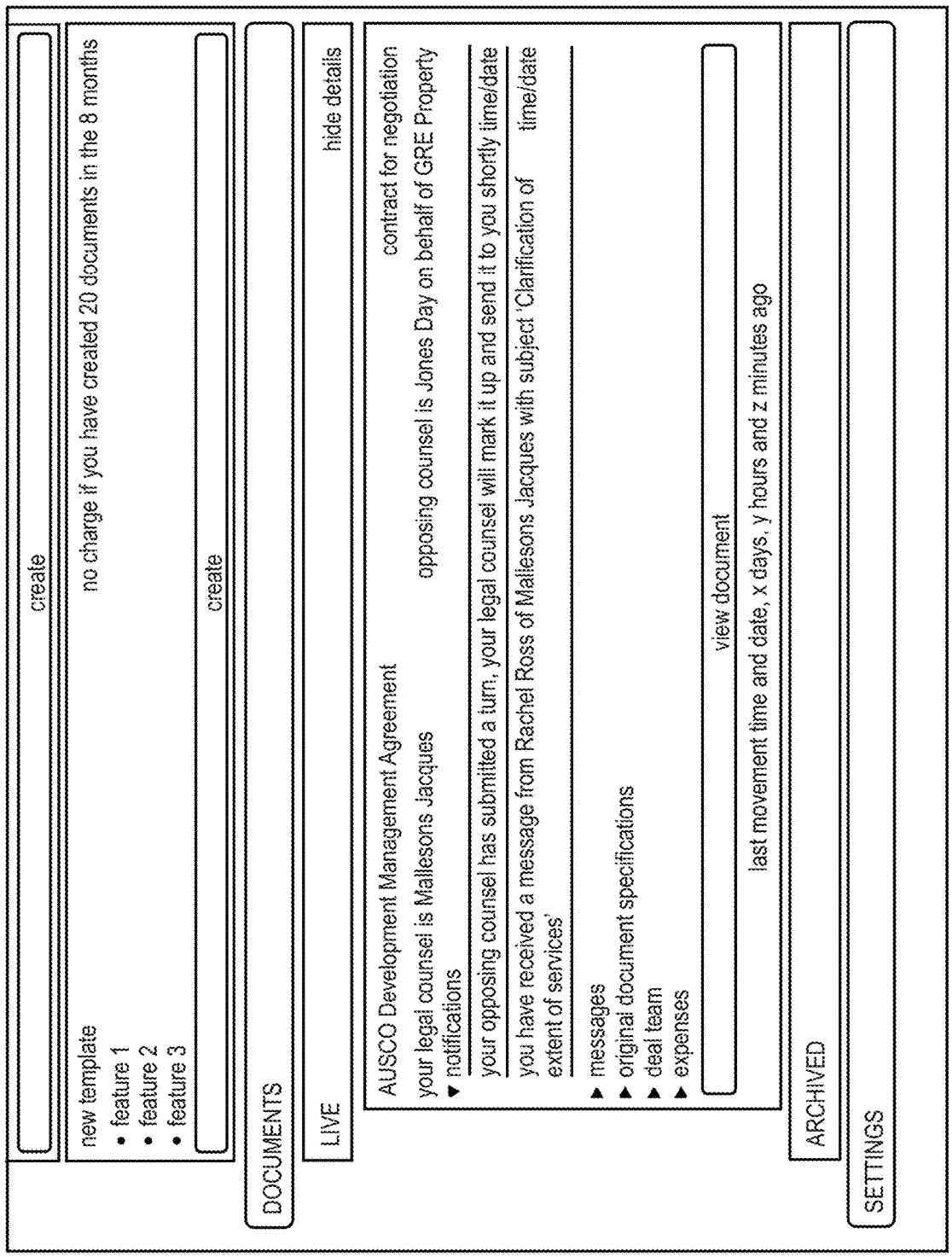

As illustrated by some of the screen shots in FIGS. 9-01-9-67, some implementations use color in alternative ways. For example, some implementations use colored rectangular outlines for each paragraph, thus highlighting an entire paragraph or clause rather than individual words within a paragraph. This can be particularly advantageous for larger paragraphs, where too much color can be distracting.

In some implementations, the color encoding extends outside the depicted page 500 to connect to a box in the margin, such as a comment box, a request clarification box, an issue box, or a purpose box. This is illustrated below in some of the screen shots in FIGS. 9-01-9-67.

FIG. 7 illustrates a process of printing specific clauses within a document in accordance with some implementations. The print module 338 provides printing features that are not available in word processing applications. Some implementations facilitate printing based on clauses or paragraphs within a document rather than by pages. As illustrated here, a user can choose to print the entire document (702), only clauses with a specified number of changes (704), or selected clauses (706) within the document. When a user selects to print based on the number of changes, the user can specify (708) how many changes. When a user chooses to print selected clauses (706), the user can then identify the specific clauses. In some implementations, the selection is hierarchical. In some implementations, the print selection area 710 includes the paragraph headings (or truncated headings) to provide the user more information about the paragraphs. Some implementations enable a user to print clauses based on a previous selection (e.g., reprint the same clauses that were printed an hour ago). Clause-based printing provides users a simple way to print exactly what is needed, and corresponds to the way the user interacts with the document. For example, a user focused on an indemnity clause wants to print that clause, regardless of the position in the document, regardless of what pages it spans, and regardless of whether it is at a different location based on document edits by other users. As another example, selecting the clauses with three of more changes, a user can focus on the "red" contentious issues.

FIGS. 8A-8I are skeletal data structures that are used in some implementations of a document creation platform. The User table 800 stores a record for each user of the document creation platform 106, including a user_id field 801, a name 802, and a password 803 (which is encrypted). In some implementations, the User table also stores a biometric binary code and/or other data.

The Document table 810 stores data for each document 342. Each document 342 has a unique document_id 811, and comprises a set of clauses 812. Each document 342 may include local comments 813 and/or global comments 814, as described above with respect to FIGS. 3 and 4.

The Role table 820 establishes associations between users and documents, and identifies the role of each user with respect to the documents. In this data structure, each record specifies a user_id 821 and a document_id 822, which establishes the association, and further specifies the roles/privileges 823 for the user with respect to the document.

The Clause table 830 identifies the clauses within each document 342. The records in this table specify a document 342 using a document_id 831 and have a unique clause_id 832. Each clause includes a header 833 (e.g., a paragraph title or subject line), although the header can be blank. During the editing process, a clause can go through a sequence of versions, and the content versions field 834 saves each of these versions. The edit_count field 835 is used to track how many times each clause has been modified. In some implementations, when the wording of a clause is agreed upon by the parties, the edit_count 835 is reset to zero. The Clause table 830 also includes a status field 836, which specifies the edit status. In some implementations, there are three status values: a first status value indicating that the paragraph is unmodified, a second status indicating that the paragraph has been modified but agreed upon by the parties, and a third status to indicate that the paragraph has been modified but not yet agreed upon. In some implementations, the edit_count field 835 and the status field 836 are combined. In some cases, a paragraph provides a definition of a term that is used in the document 342. The field defines_term 837 specifies the term that the paragraph defines. In most cases this field is blank (or NULL) because most paragraphs are not used to define terms.

The Local Comment table 840 stores comments by members of one team that are visible only to other members of the same team. In some implementations, each local comment is assigned a unique comment_id 841. In some implementations, each local comment is associated with a specific clause, which is identified by the clause_id 842. When comments are not required to be associated with a specific clause, the clause field can be blank or NULL. The user_id field 843 indicates the author of the comment. The comment content field 844 specifies the actual text of the comment. Typically there is other metadata associated with a comment as well, such as a timestamp when the comment was created or a team identifier to identify which team of users should have visibility of the comment.

Some implementations include a Global Comment table 850, which can be similar to the Local Comment table 840. In some implementations, these two tables are combined at the database level. For example, using a single table, a team_id may specific the appropriate team for local comments and be NULL for global comments. As illustrated here, the Global Comment table 850 includes a unique comment_id 851, a clause_id 852 (which may be blank or NULL for comments not associated with a particular paragraph), a user_id 853, and a comment content field 854. In some implementations, the Global Comment table 850 includes a field 855 that indicates whether the comment has been transmitted to all users associated with the document. In some implementations, global comments are implemented using a messaging interface, and thus the global comments for a document are stored as messages that are transmitted to the users associated with the document.

The Activity Log table 860 tracks each event associated with a document. Each event has a unique event_id 861, a user_id 862 that identifies the user causing the event, and a timestamp 863 that identifies when the event occurred. When the event is associated with a specific clause, the clause_id 864 is used to identify the clause. The action field 865 indicates the type of event, such as identifying an issue, creating a new paragraph, creating a local comment, creating a global comment, approving or rejecting changes, and so on.

Some implementations include a Term Index table 870, which identifies which terms in a document are defined and where the definitions are located. In this skeletal example, the Term Index table has a term field 871 to specify the term and a clause_id field 872 to specify the clause that provides the definition.

Some implementations include a Clause Template table 880, which allows a user to store exemplary clauses from one document and use those clauses later in other documents. Each template clause record includes a template_id 881 and the textual content 882 of the clause (including header when appropriate). In some implementations, the Clause Template table includes a billing_cost field 883, which specifies a cost that will be billed to a client when the template clause is used. This recognizes that using a pre-defined clause provides a benefit to a client, but the cost is typically less than it would have cost to create the clause from scratch. The Clause Template table includes a description field 884, which is generally a short description of what is included in the clause, making it easy to identify useful clauses in the future. In some implementations, access to template clauses is limited. For example, when a specific user saves a template clause, that template clause is available only to that specific user or the firm of that specific user.

FIGS. 9-01-9-67 provide screen shots from one implementation, illustrating a document creation platform 106 with the features described above, including dynamic referencing of term definitions within a document, color coding of phrases within a document to indicate change history (with colors shown in shades of gray), collaborative document creation by a plurality of distinct teams, and clause-based printing of documents.

Figures 9, 10, 11, 12, 13:
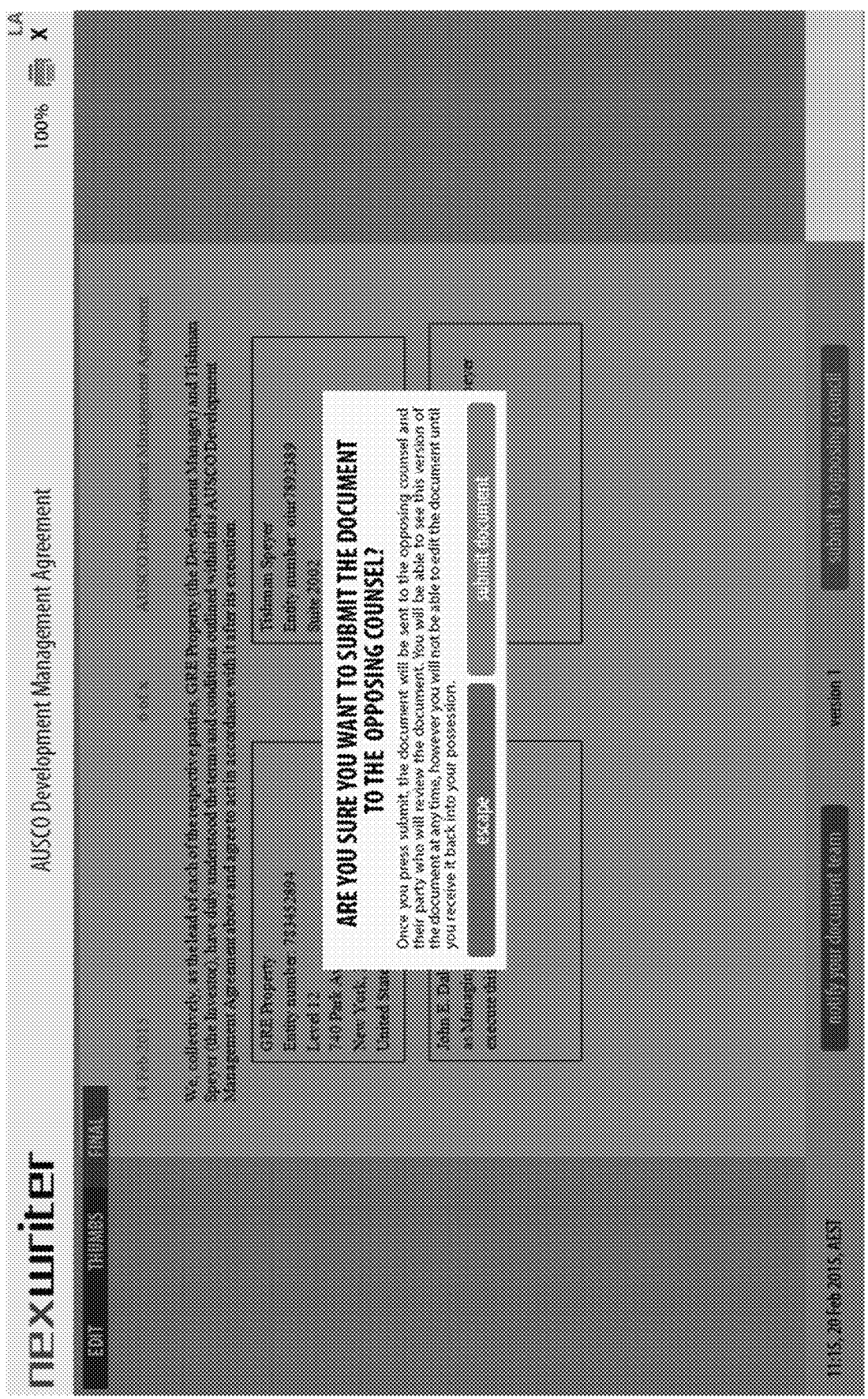
Figures 9, 10, 11, 12, 13, 14:
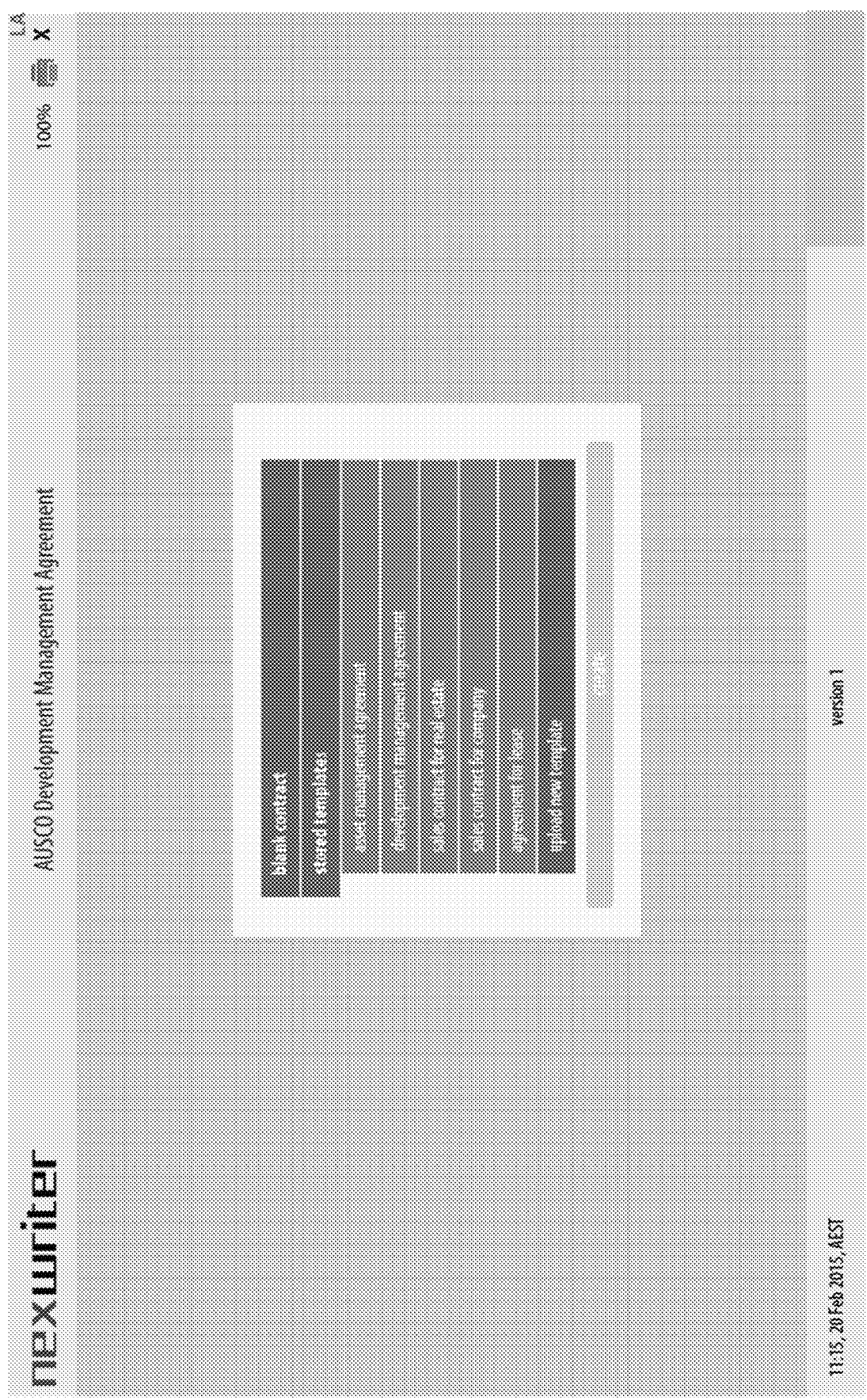
Figures 9, 10, 11, 12, 13, 14, 15:
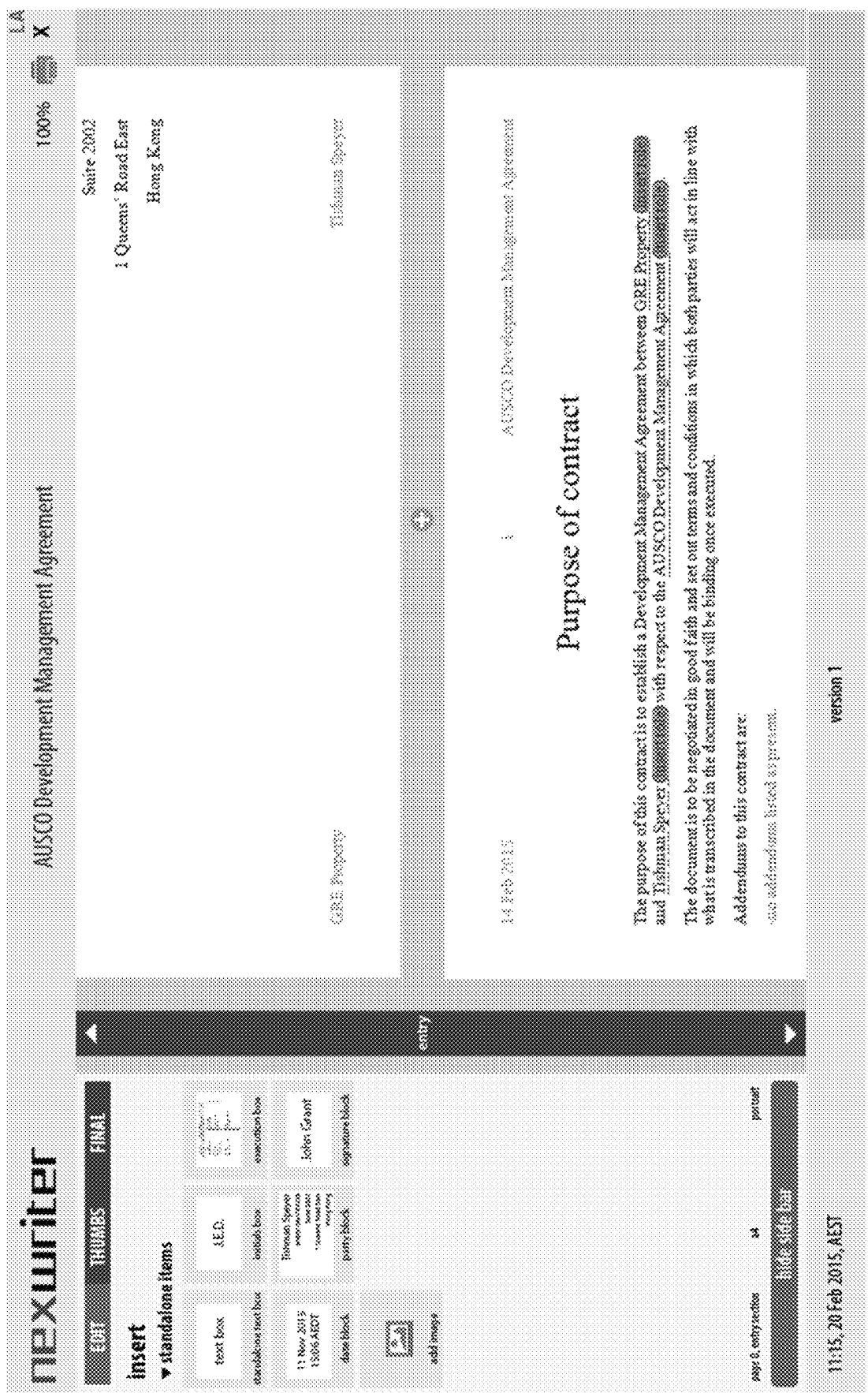
Figures 9, 10, 11, 12, 13, 14, 15, 16, 17, 18:
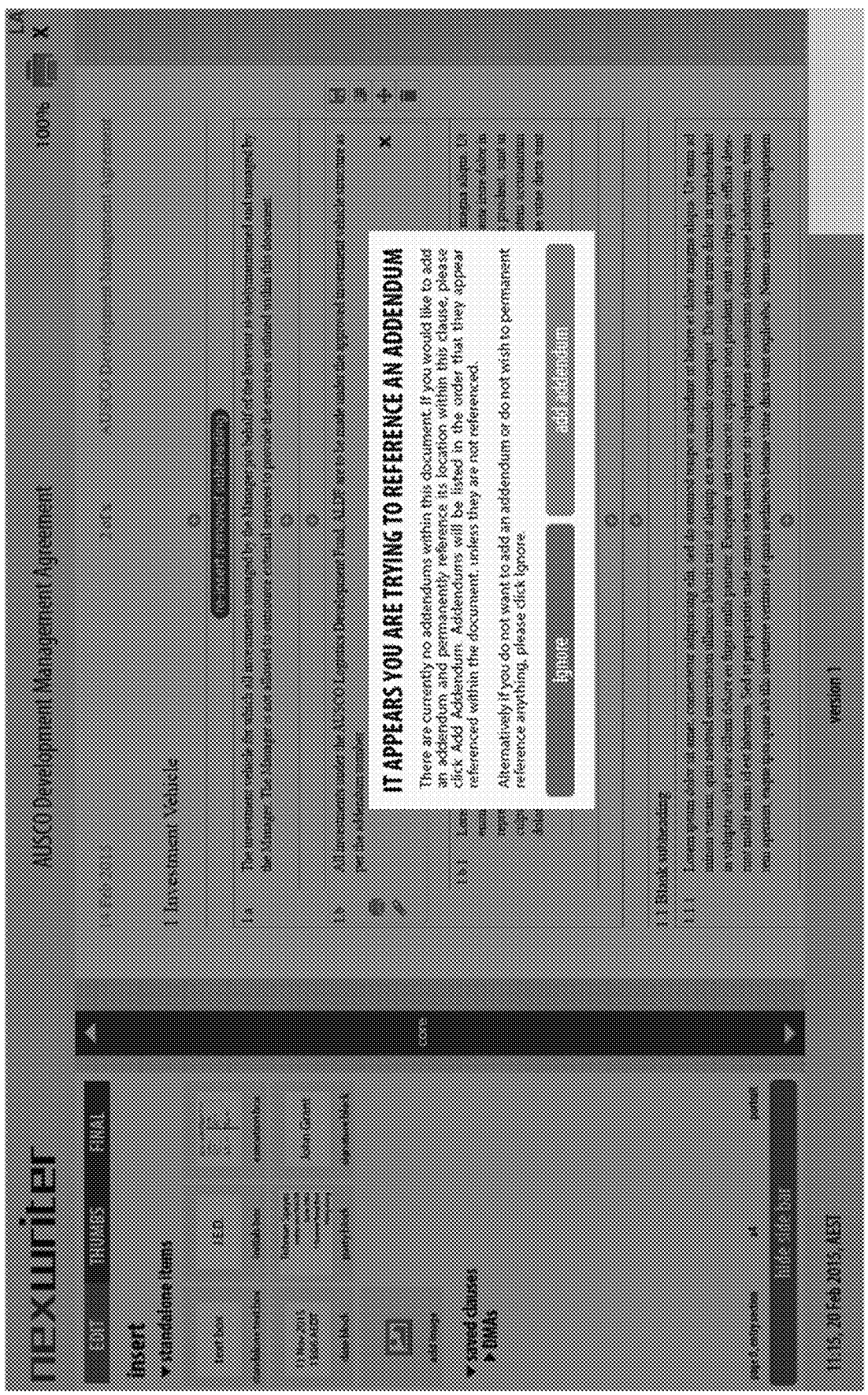
Figures 9, 10, 11, 12, 13, 14, 15, 16, 17, 18, 19:
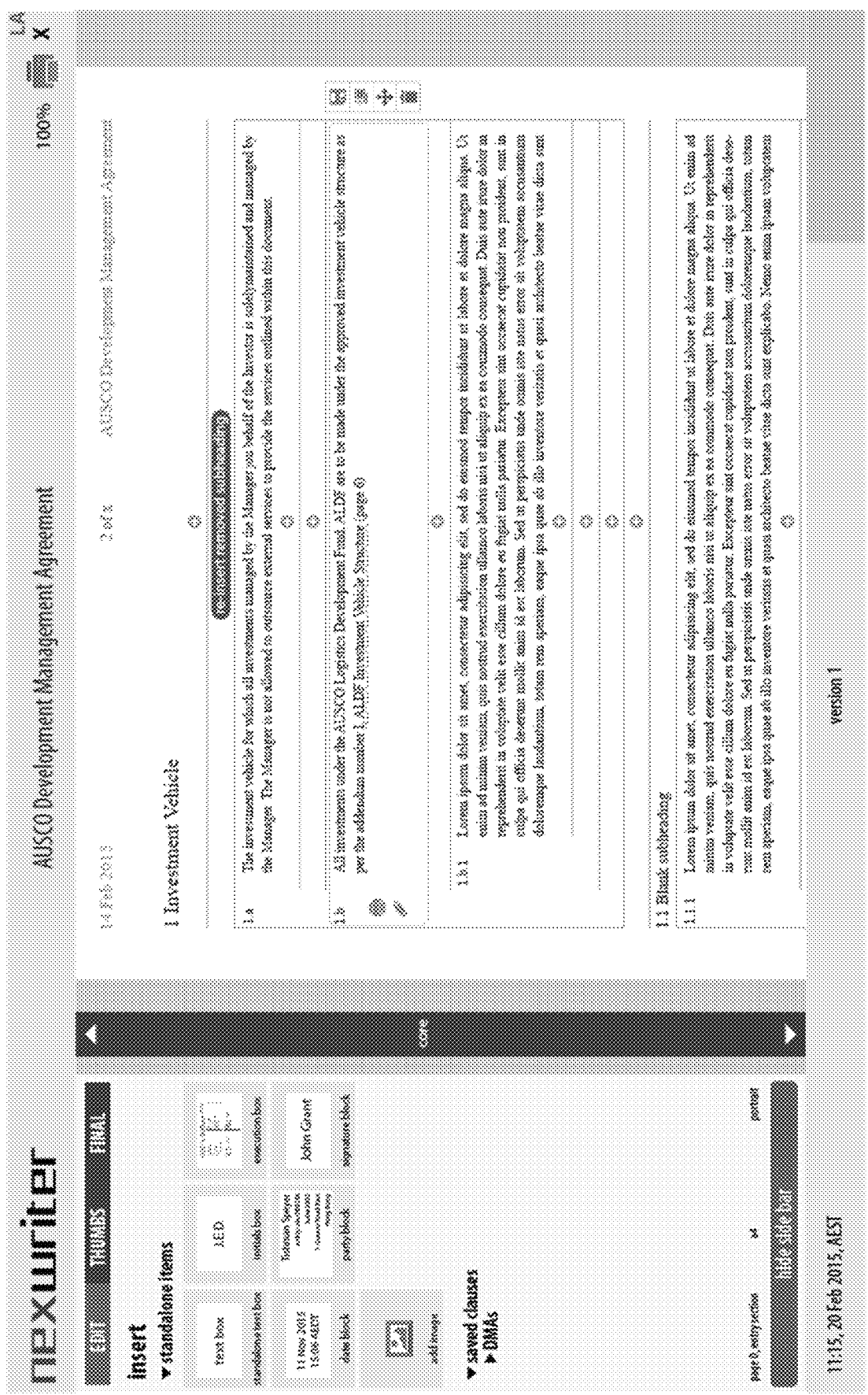
Figures 9, 10, 11, 12, 13, 14, 15, 16, 17, 18, 19, 20, 21, 22, 23:
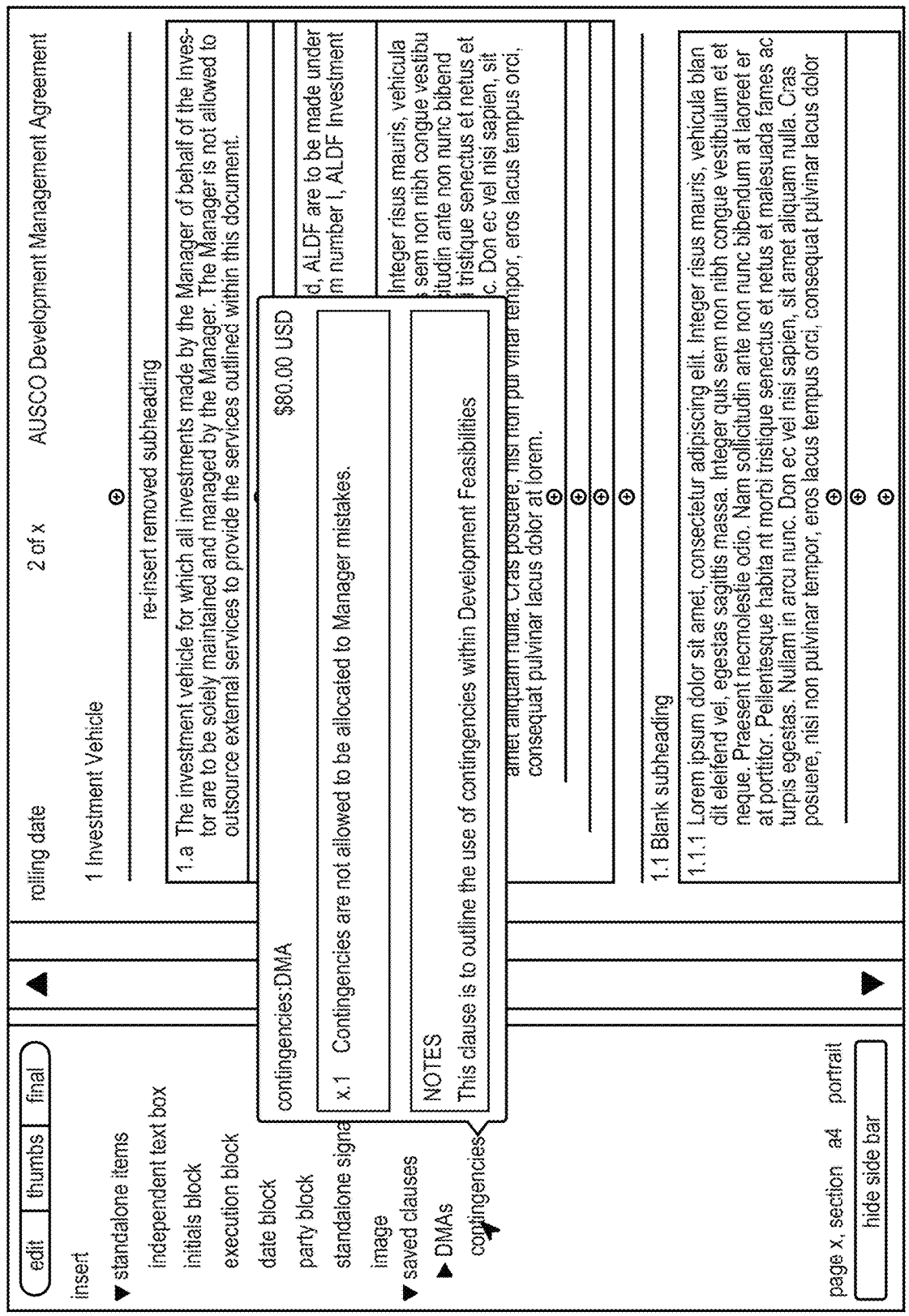
Figures 9, 10, 11, 12, 13, 14, 15, 16, 17, 18, 19, 20, 21, 22, 23, 24:
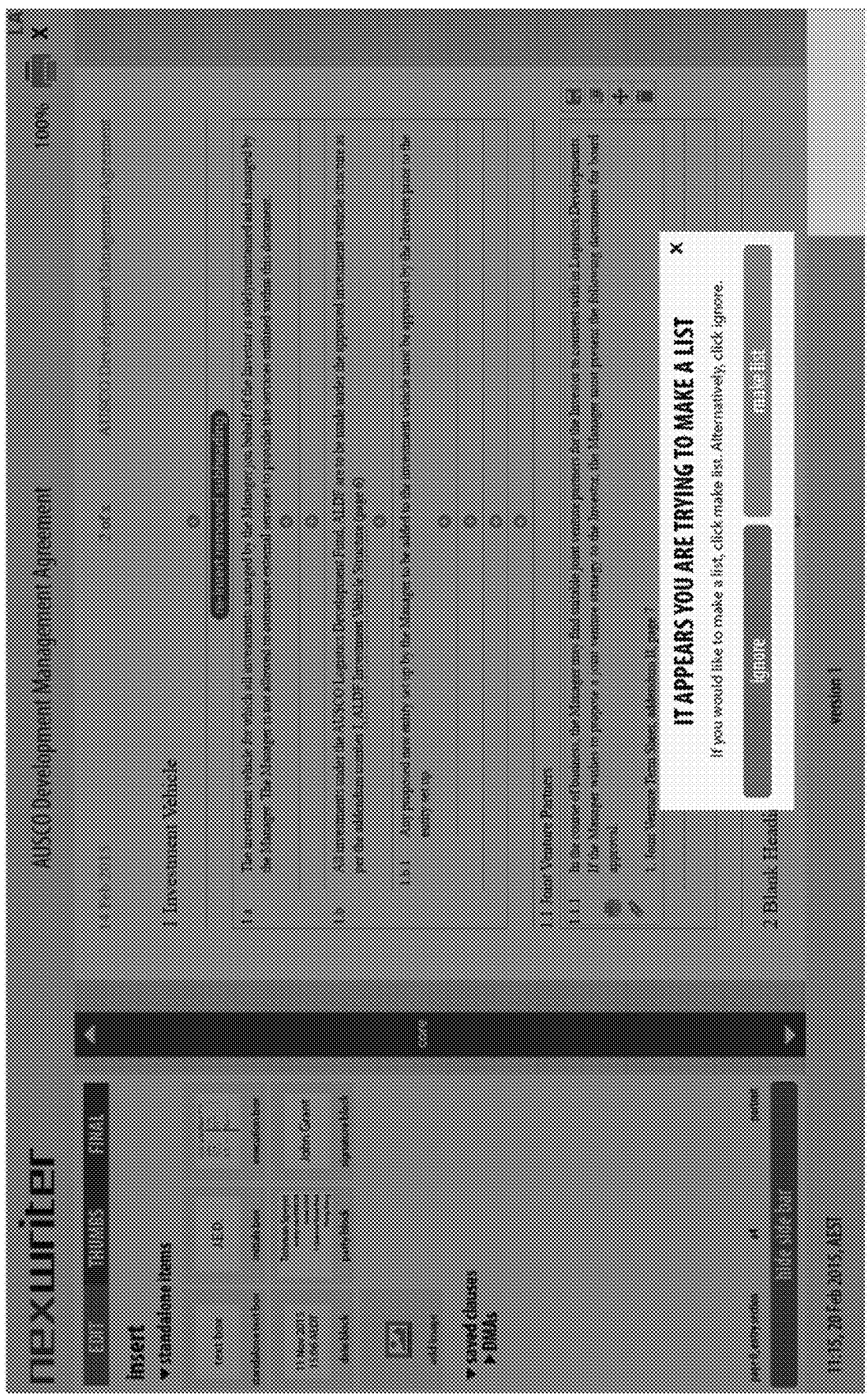
Figures 9, 10, 11, 12, 13, 14, 15, 16, 17, 18, 19, 20, 21, 22, 23, 24, 25, 26:
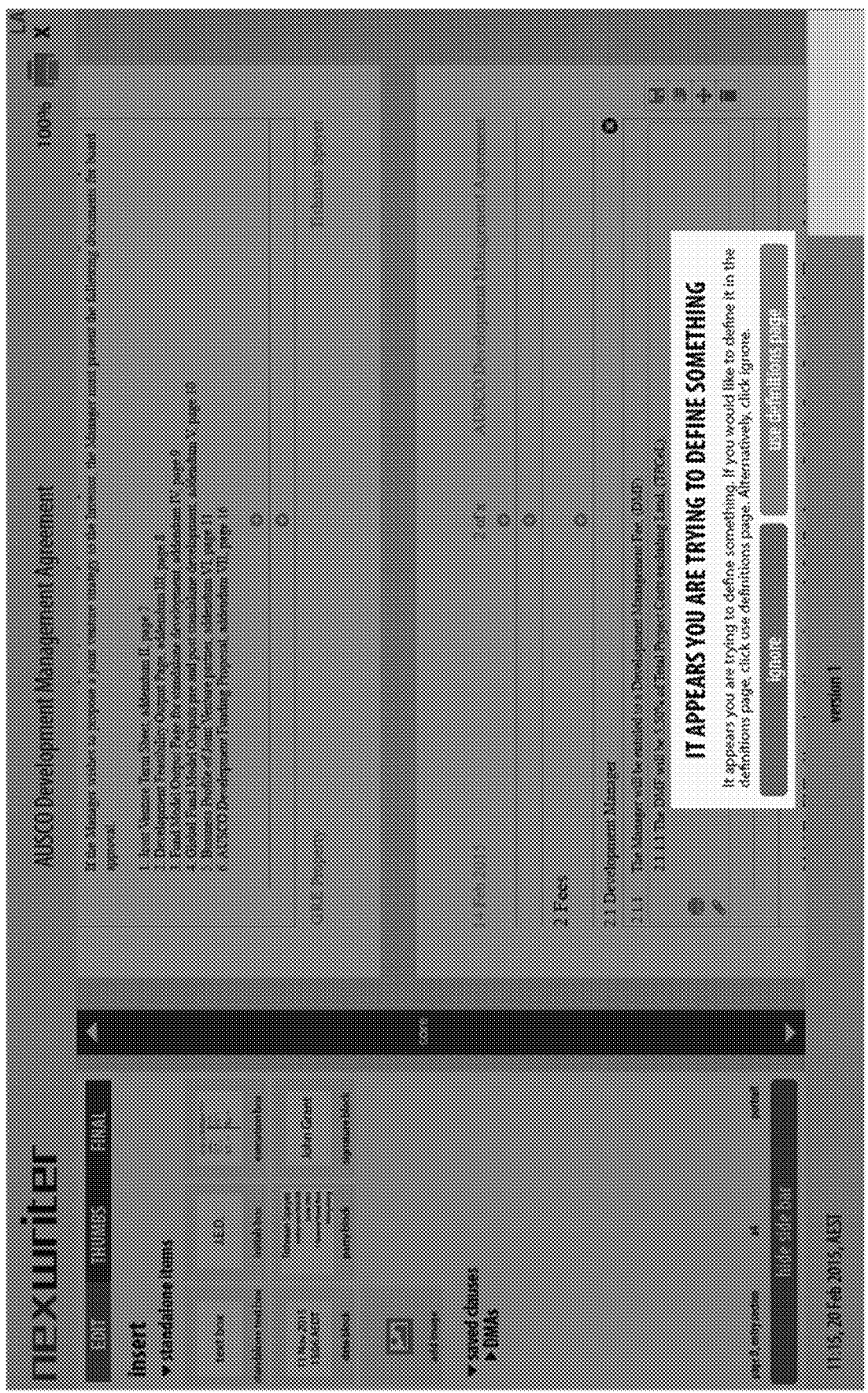
Figures 9, 10, 11, 12, 13, 14, 15, 16, 17, 18, 19, 20, 21, 22, 23, 24, 25, 26, 27:
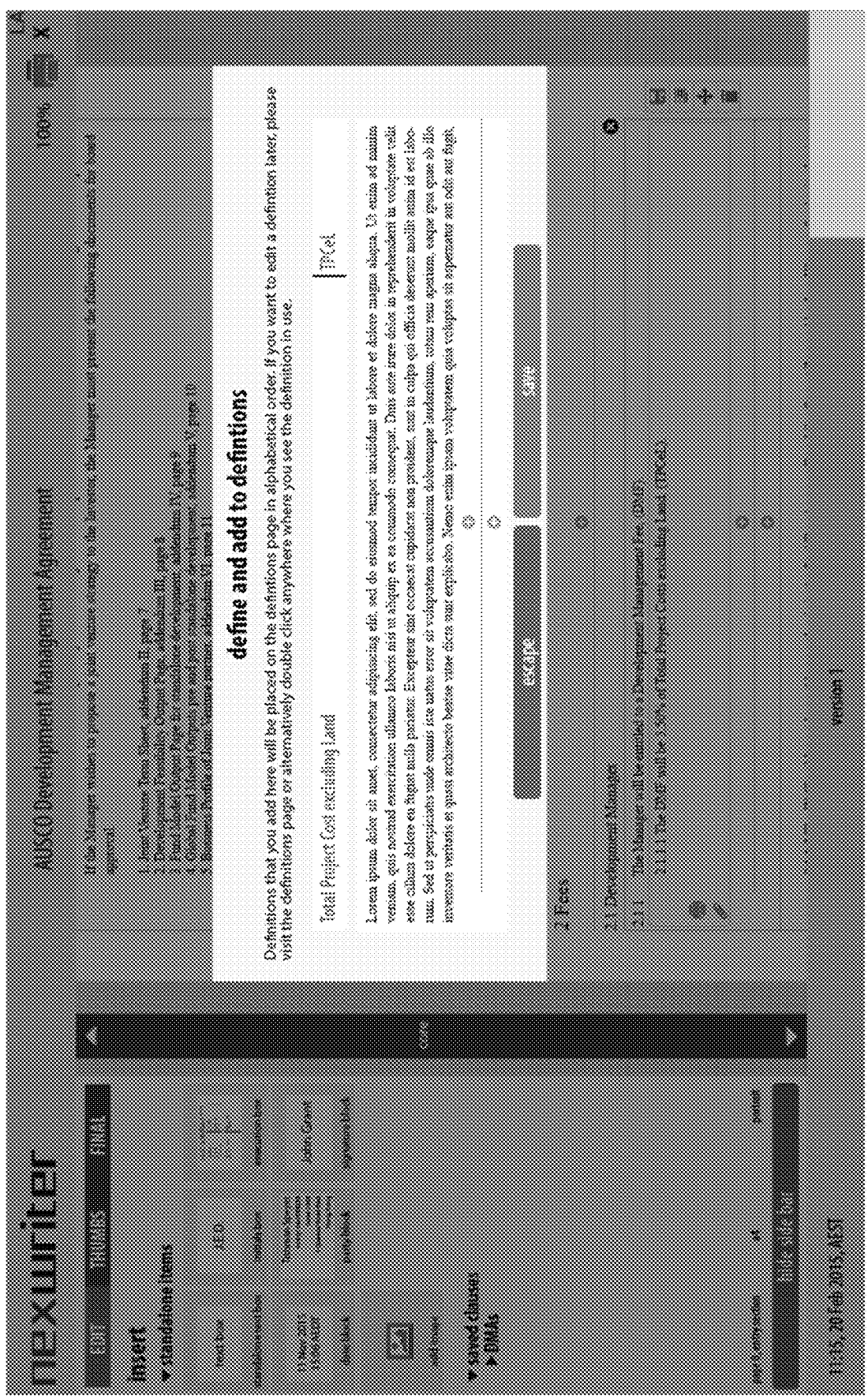
Figures 9, 10, 11, 12, 13, 14, 15, 16, 17, 18, 19, 20, 21, 22, 23, 24, 25, 26, 27, 28, 29, 30, 31, 32, 33, 34, 35, 36, 37, 38:
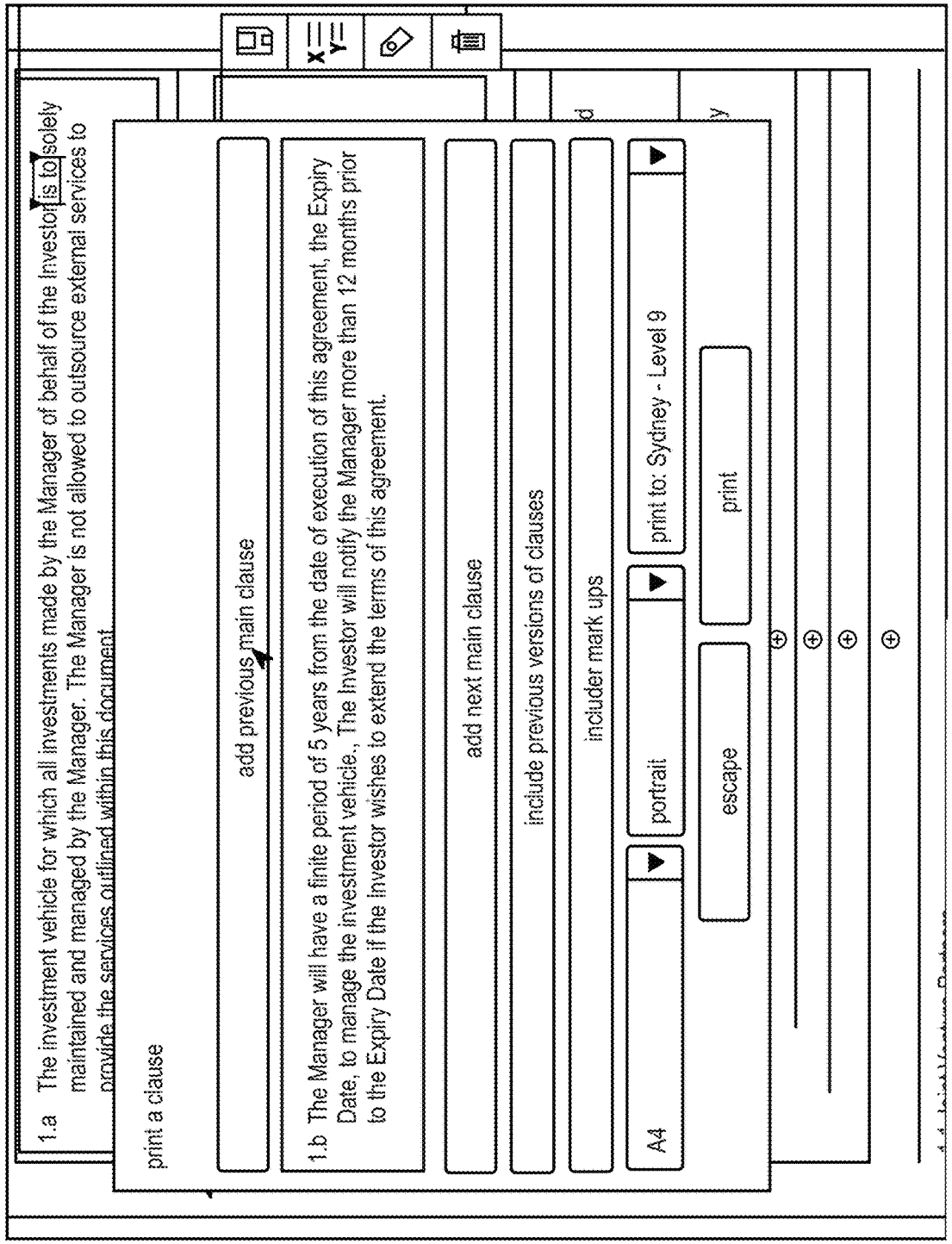
Figures 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40:
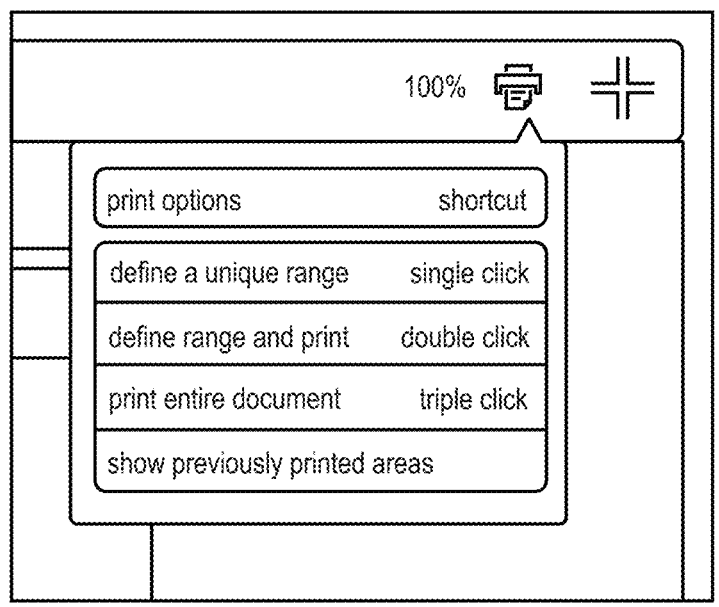
Figures 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44:
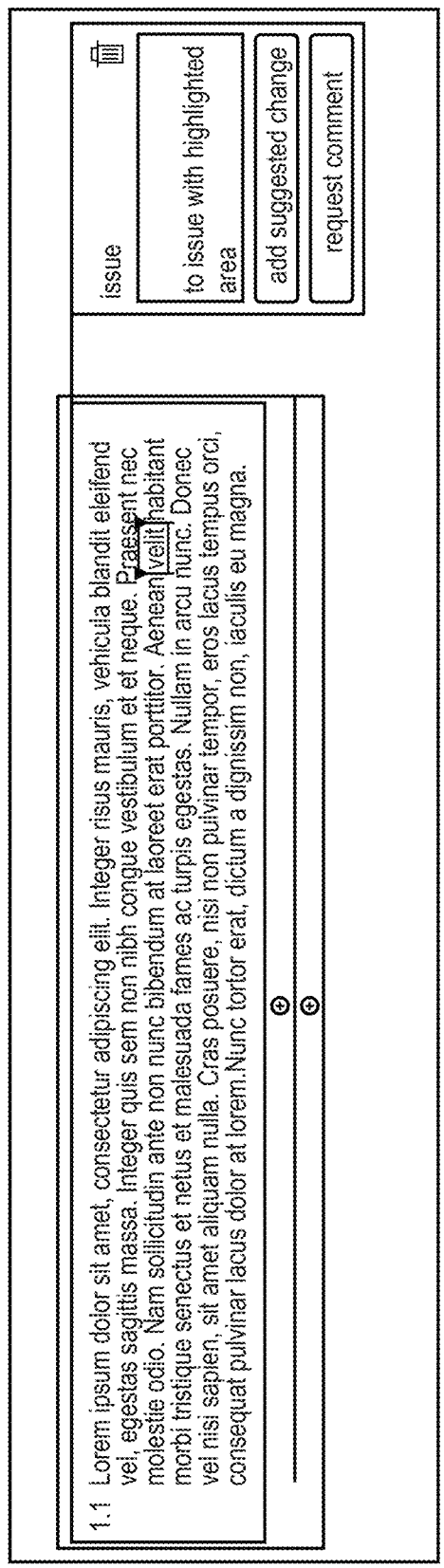
Figures 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45:
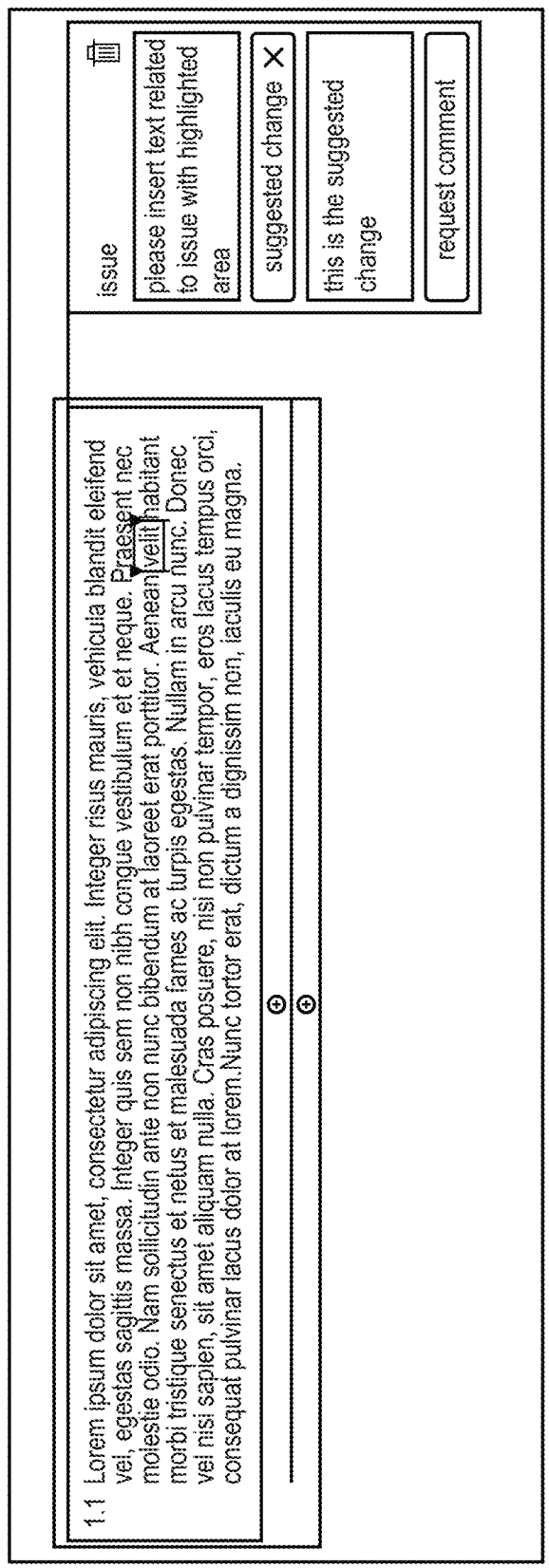
Figures 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46:
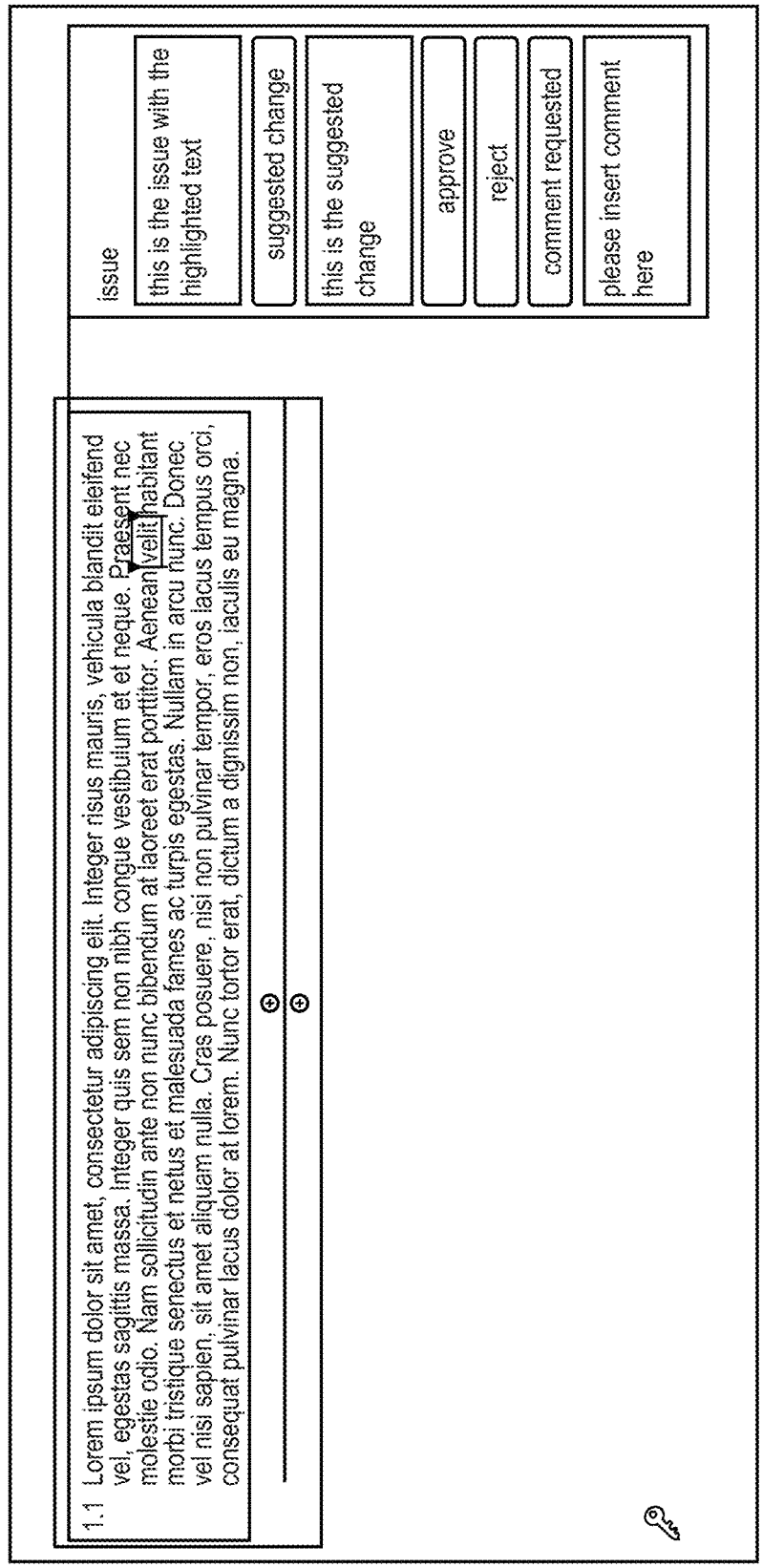
Figures 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47:
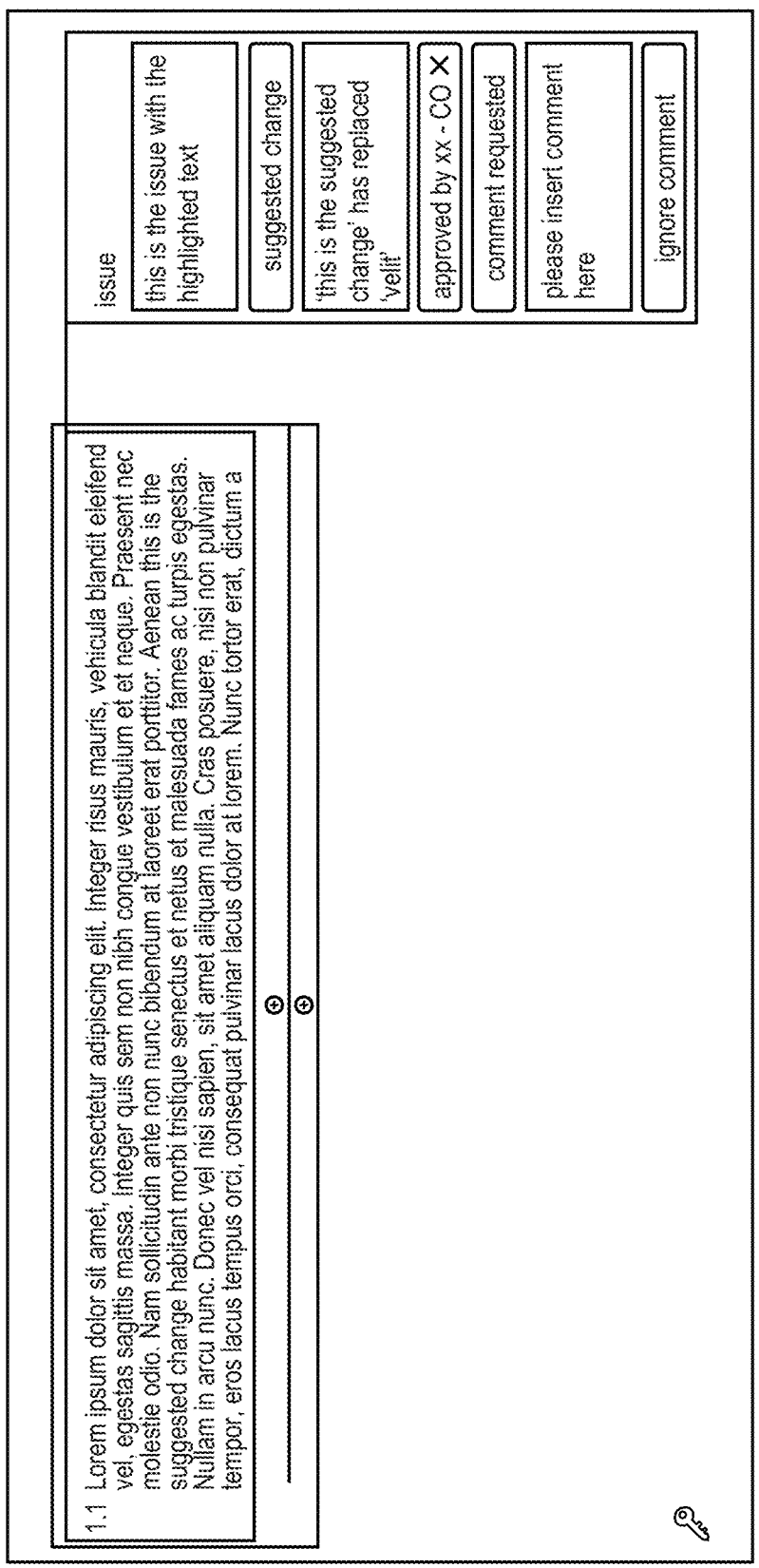
Figures 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48:
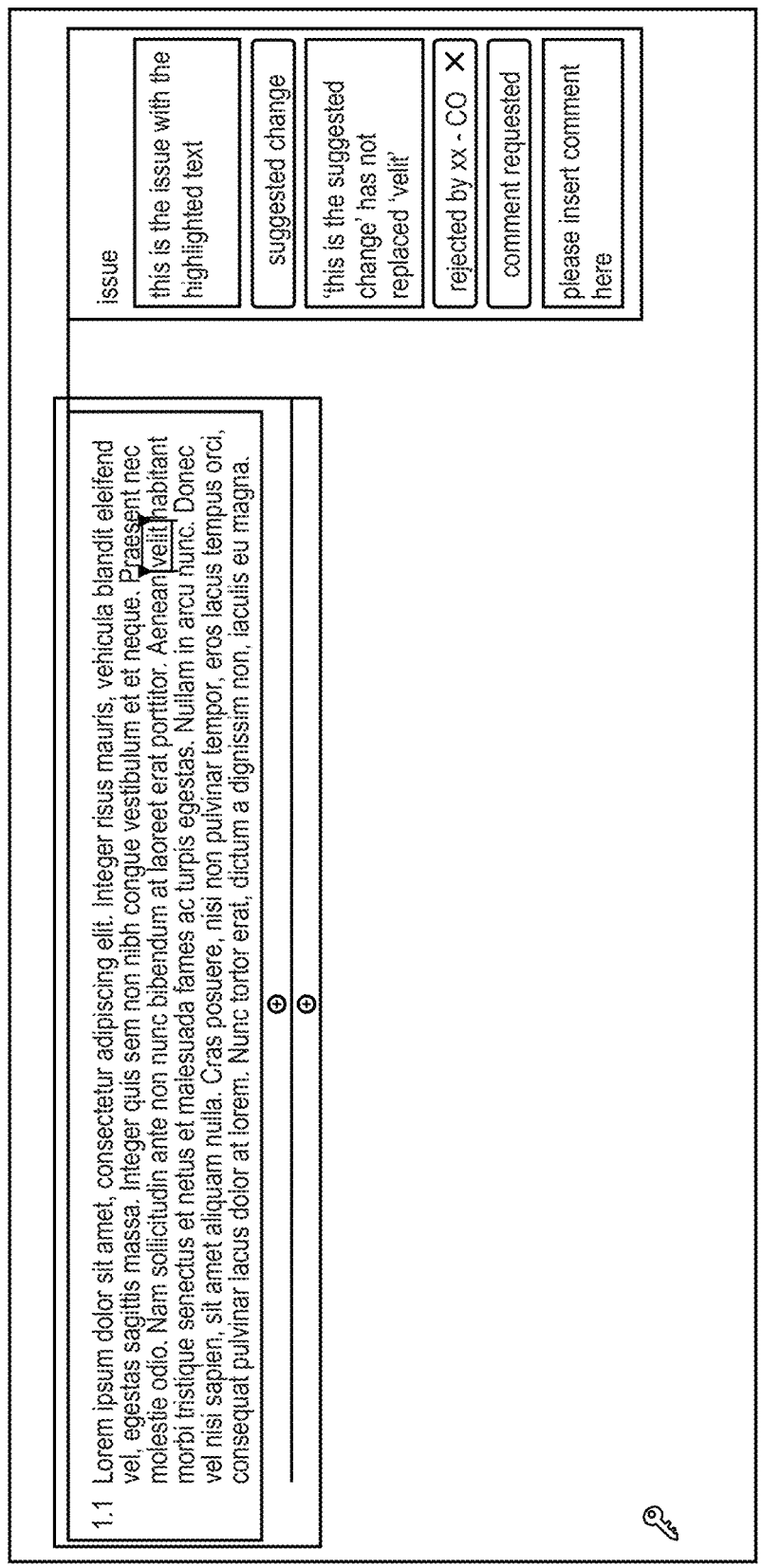
Figures 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49:
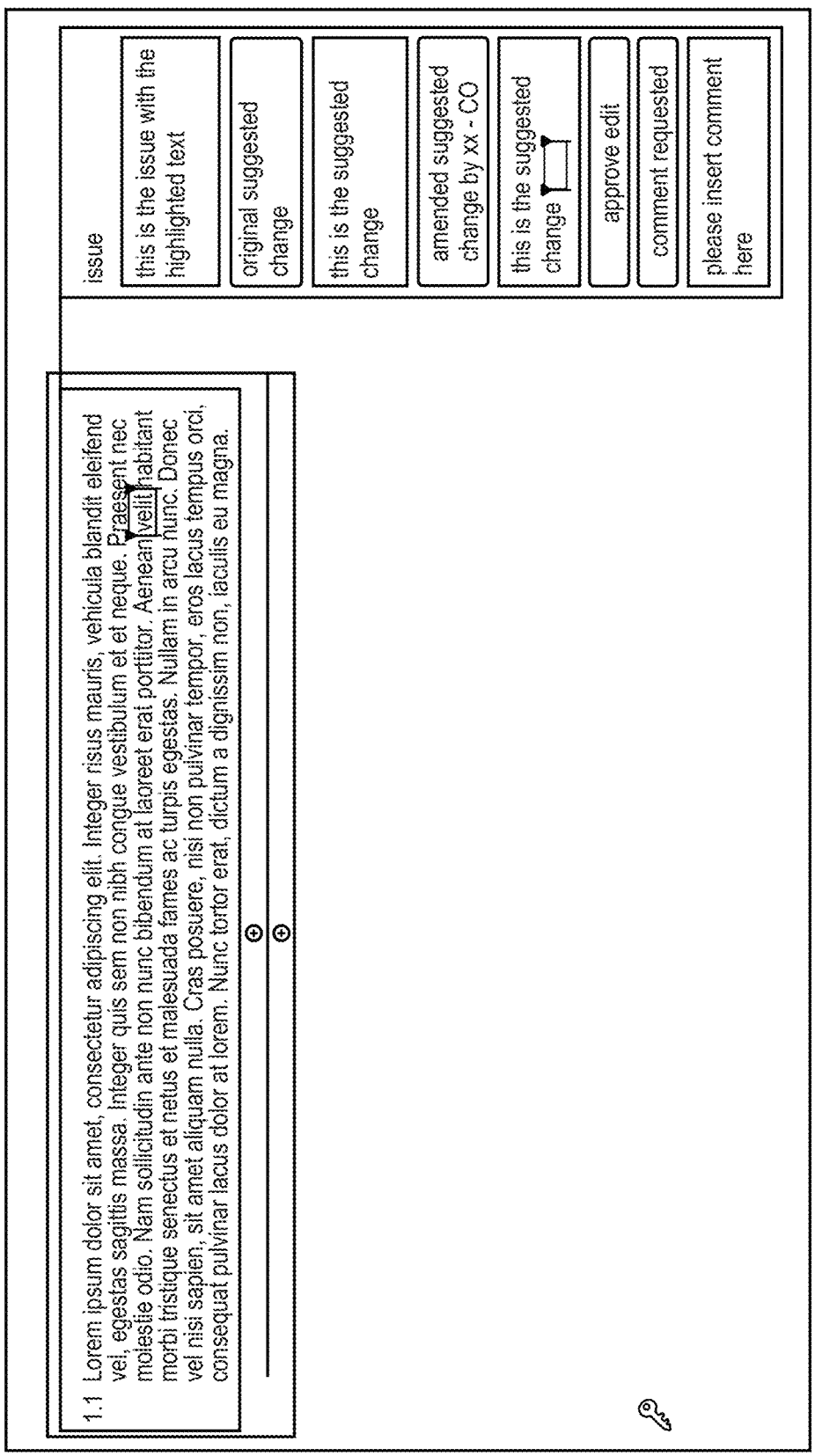
Figures 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55:
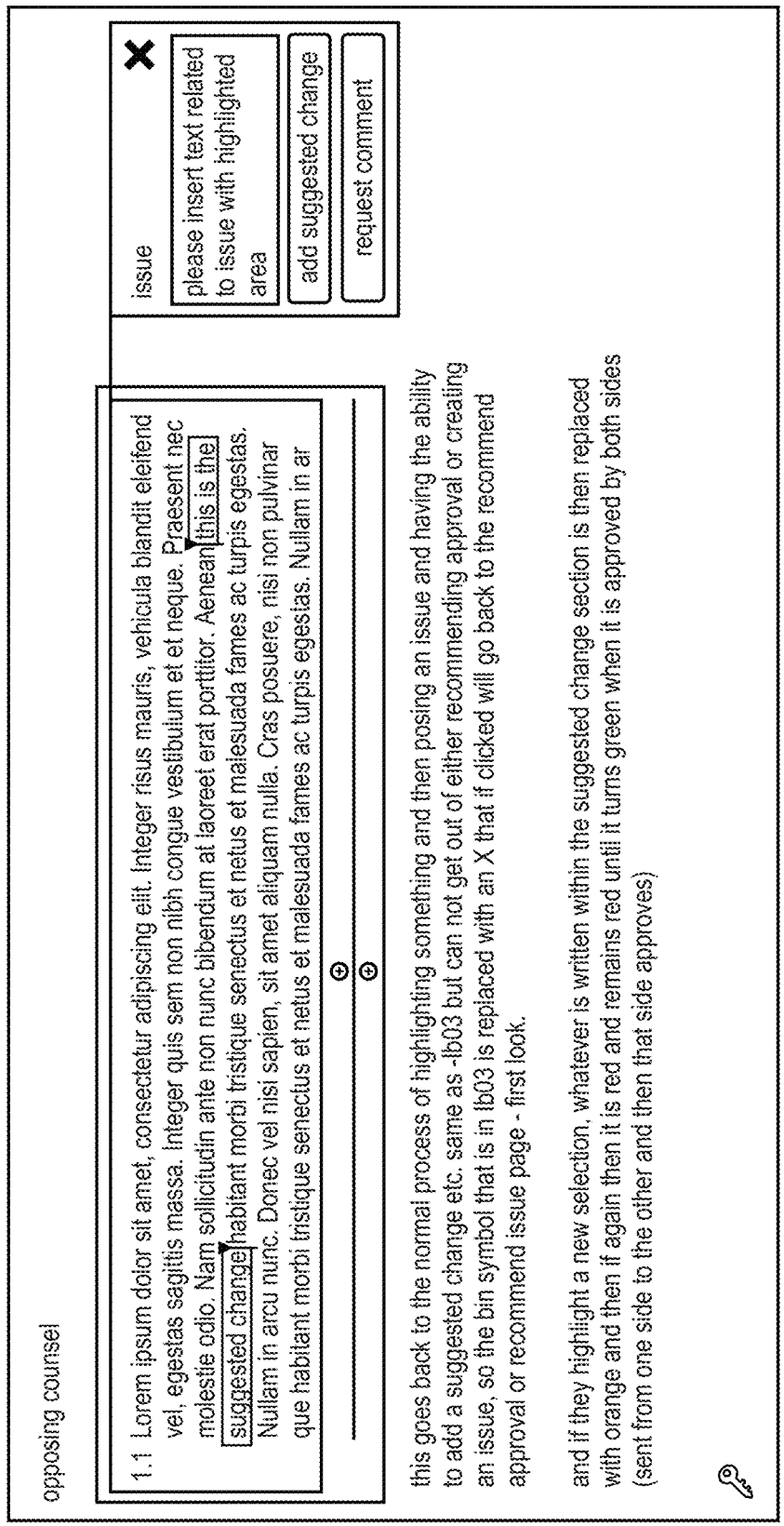
Figures 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56:
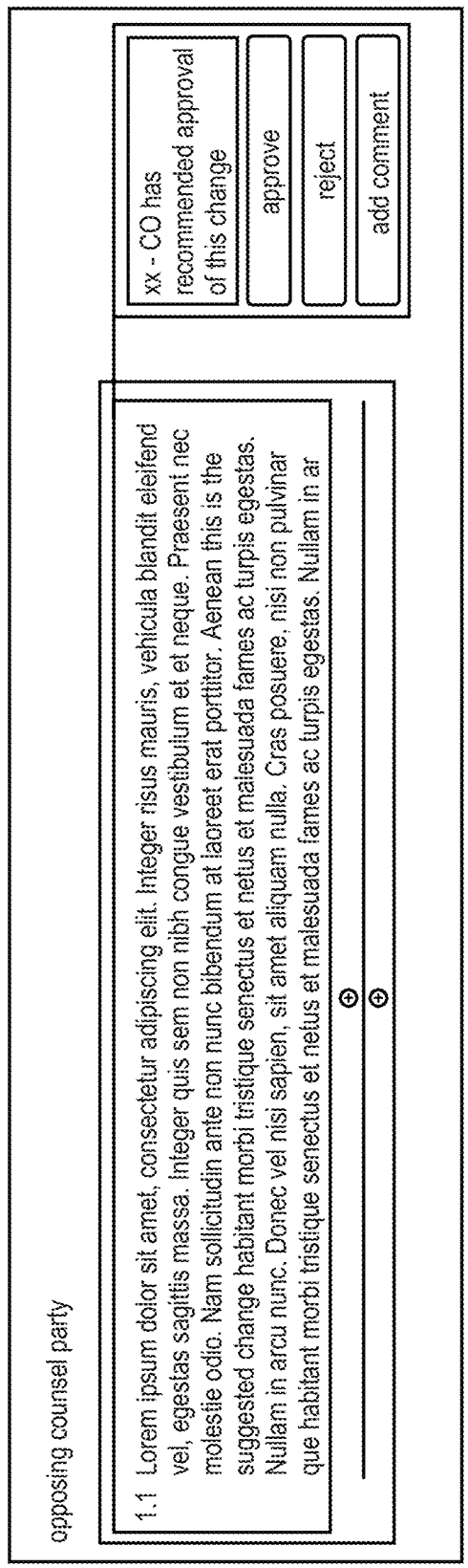
Figures 9, 60:
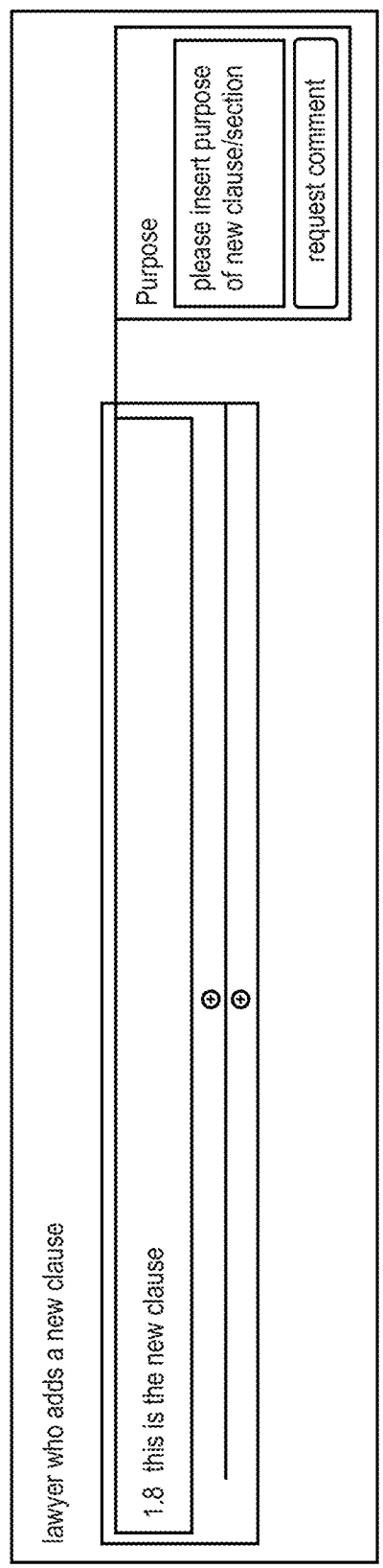
Figures 9, 61:
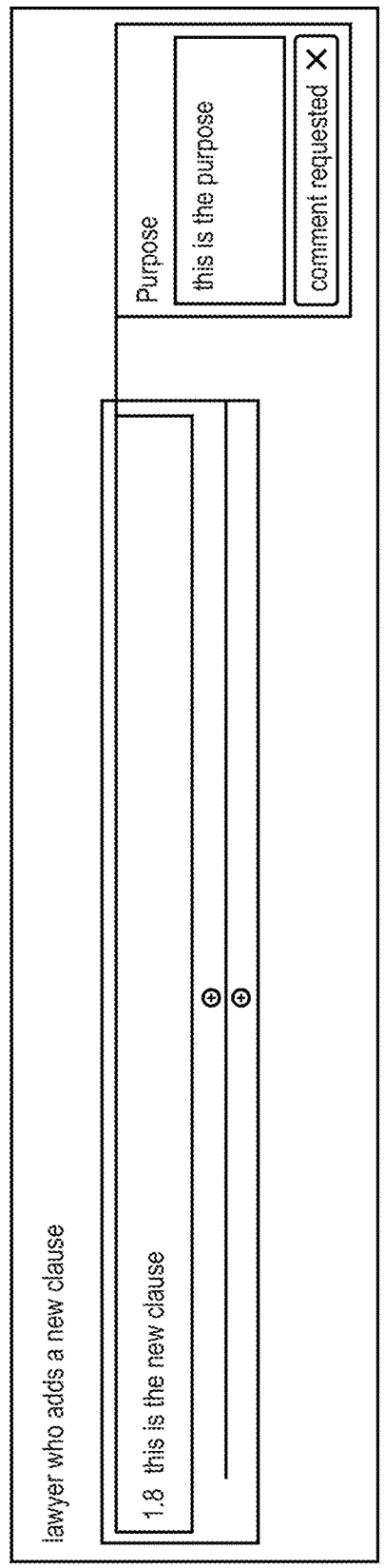
Figures 9, 62:
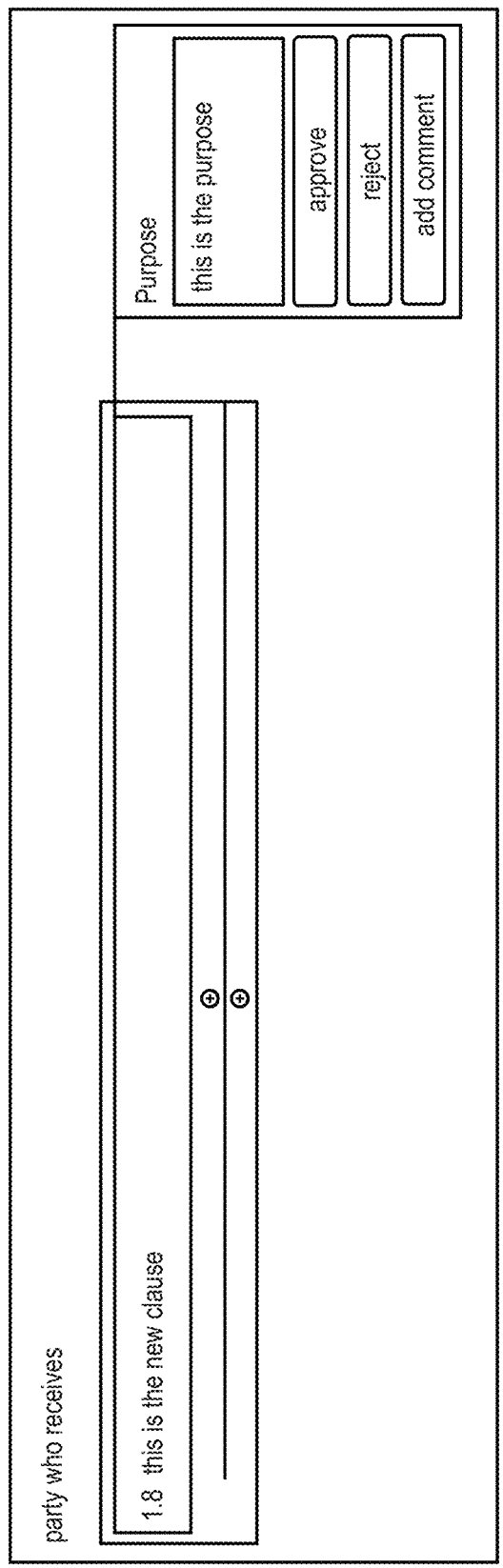
Figures 9, 63:
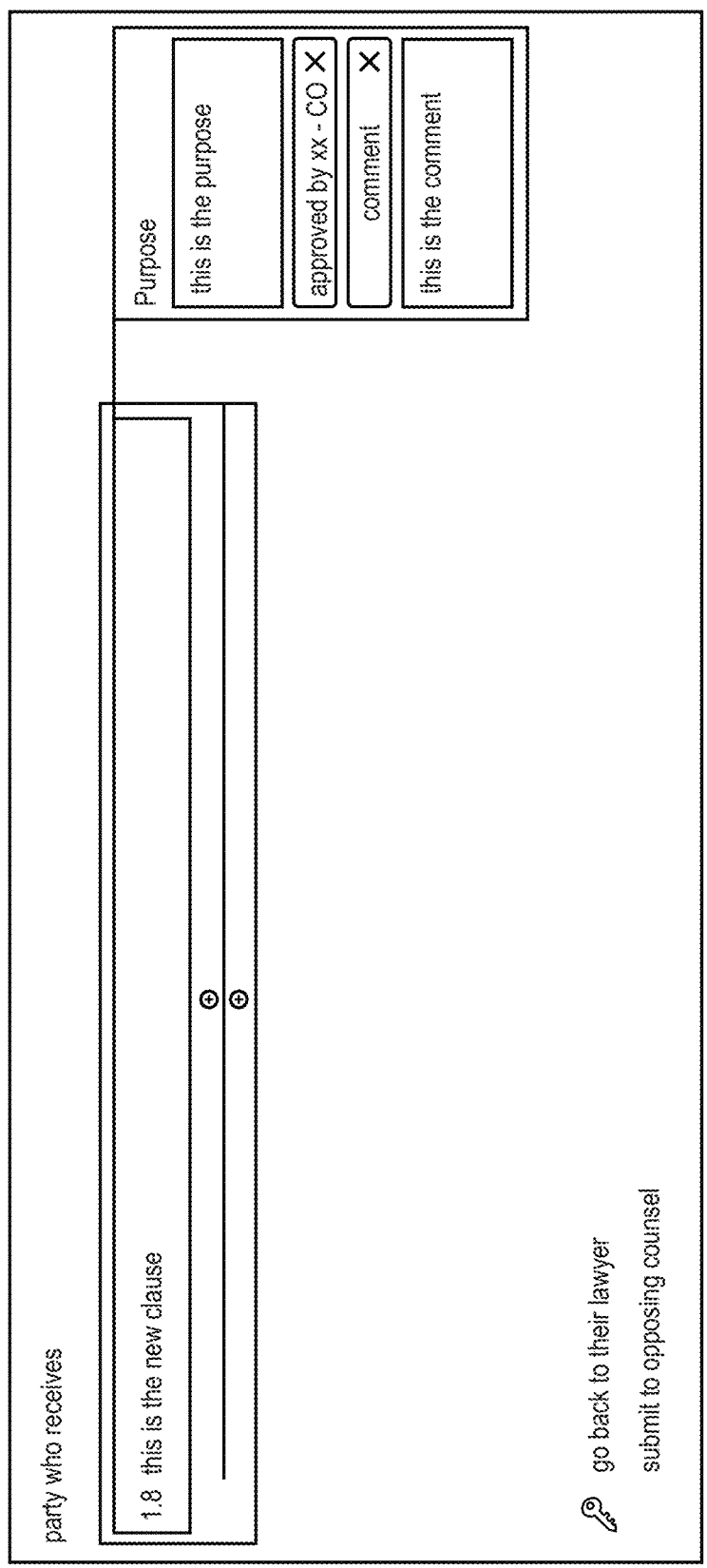
Figures 9, 64:
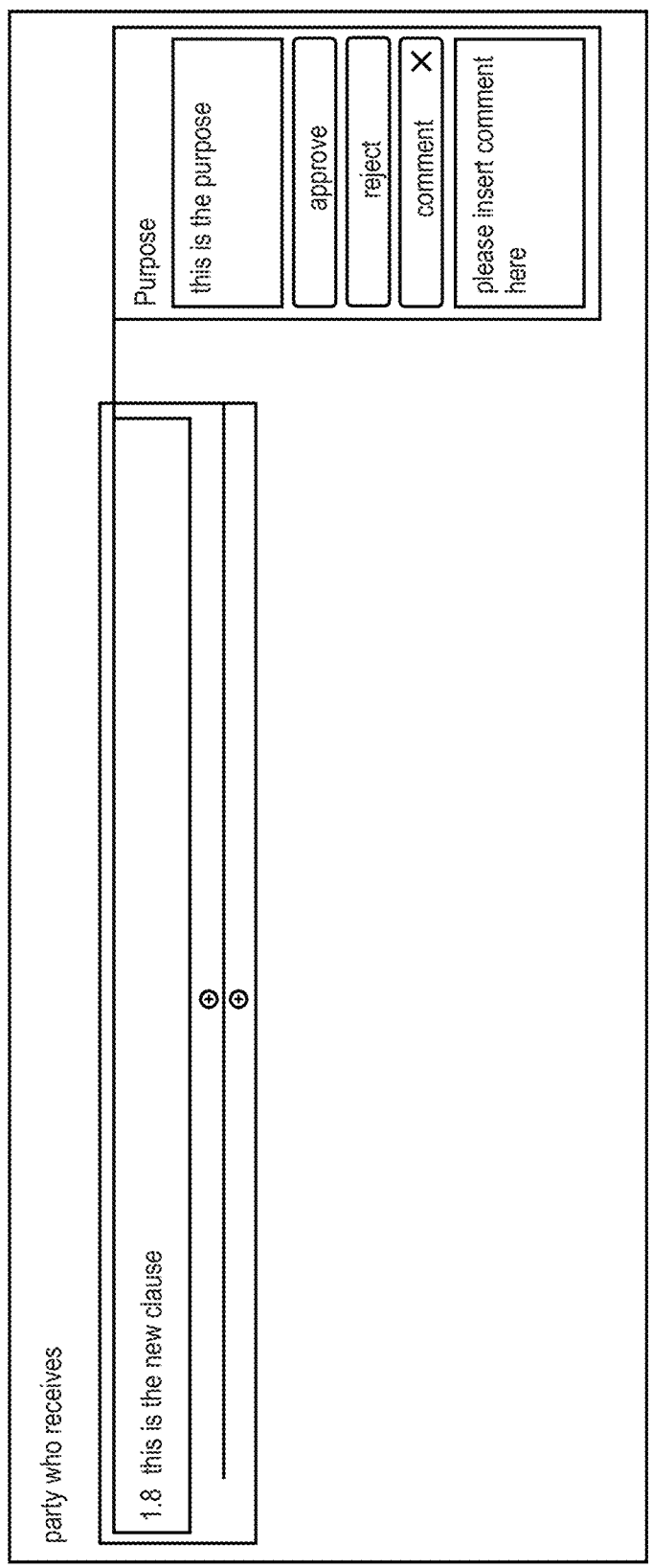
Figures 9, 65:
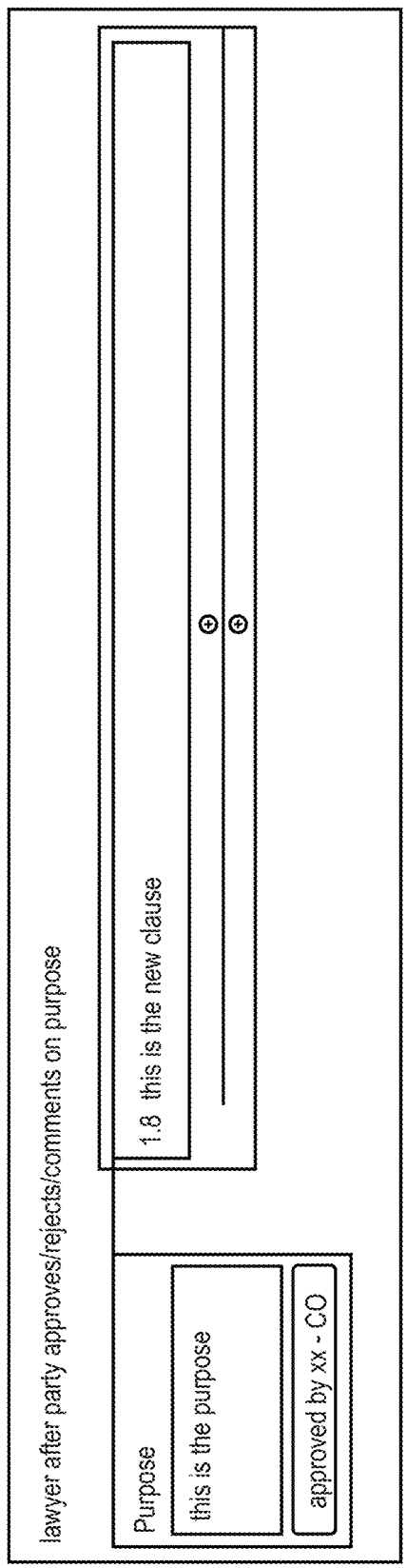
Figures 9, 66:
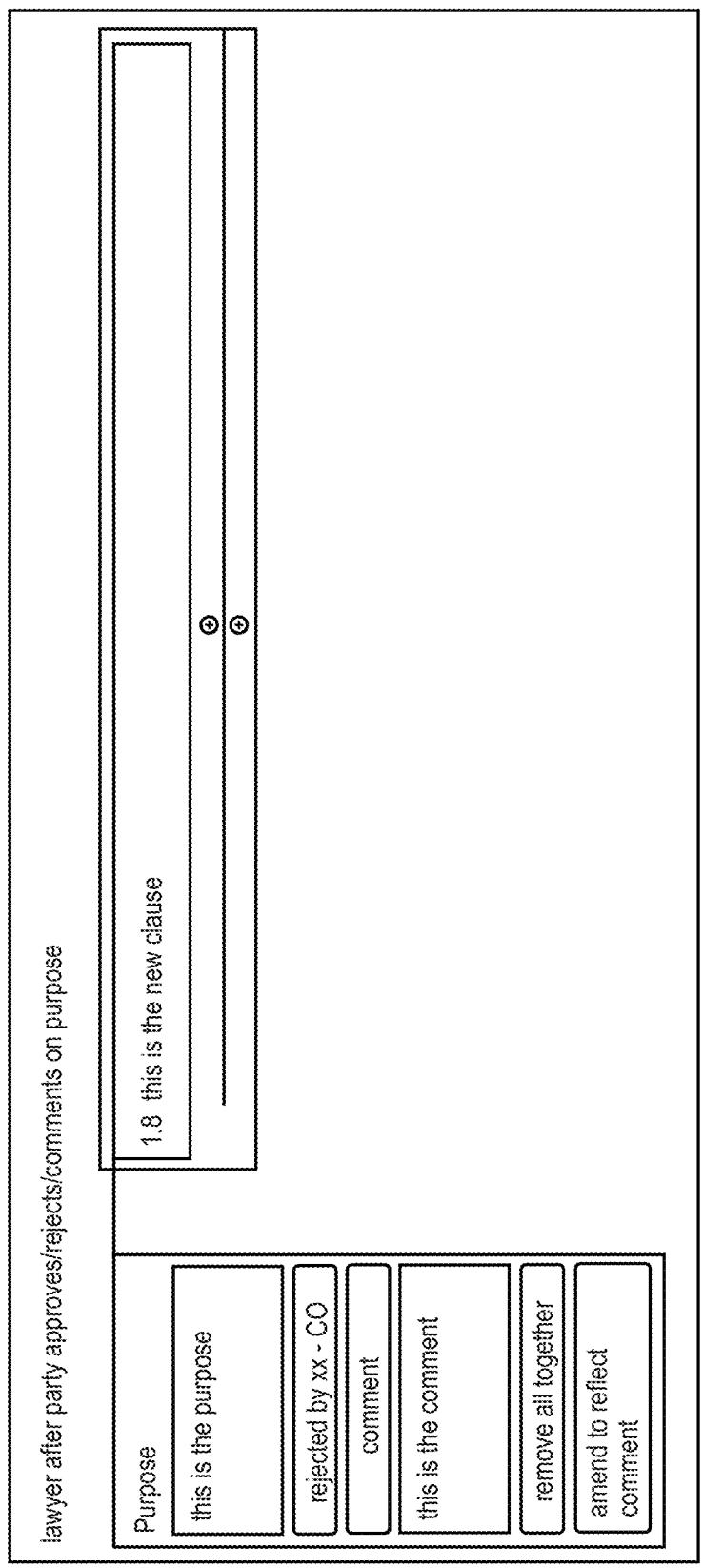
Figure 10A:
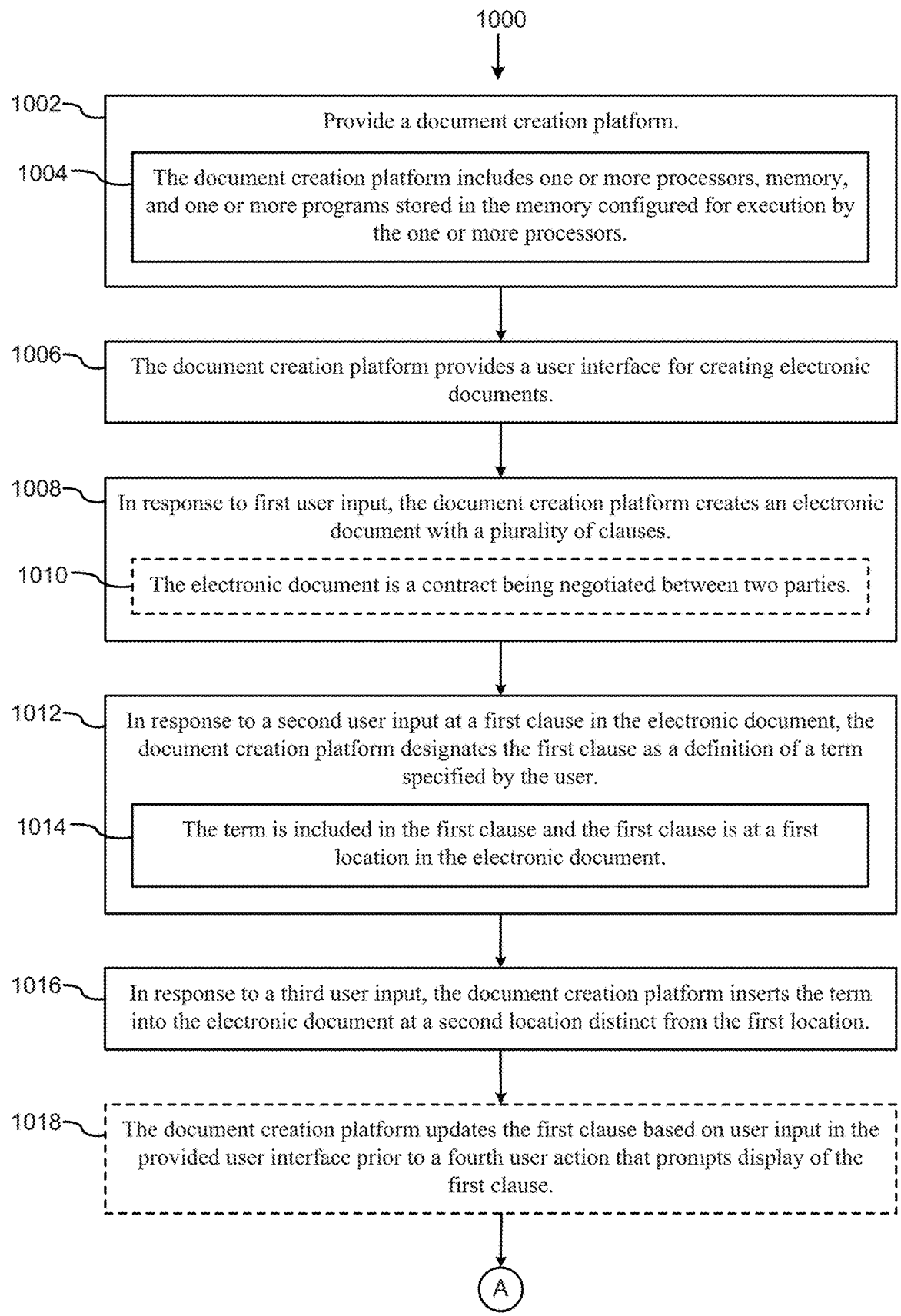

FIGS. 10A and 10B provide a flow diagram 1000 for a document creation platform 106. A document creation platform 106 is used to collaboratively create (1002) new documents that include dynamic referencing of term definitions. The document creation platform 106 includes (1004) one or more processors, memory, and one or more programs stored in the memory configured for execution by the one or more processors.

The document creation platform 106 provides (1006) a user interface 112 for creating electronic documents 342. In response to first user input, the document creation platform 106 creates (1008) an electronic document 342 with a plurality of clauses 346. In some instances, the electronic document 342 is (1010) a contract being negotiated between two parties.

While creating a document, a user may create a definition of a term. In some cases the user uses a user interface control to specify that a definition is being created (or has been created). In some instances, the document creation platform 106 recognizes the creation or presence of a definition, and alerts the user. In response to a second user input at a first clause in the electronic document 342, the document creation platform 106 designates (1012) the first clause as a definition of a term specified by the user. In some cases, the user action is clicking a button, selecting a menu item from a drop down menu, selecting an item from a context sensitive menu, or selecting a toolbar icon. The term is included (1014) in the first clause and the first clause is (1014) at a first location in the electronic document. At this point, the definition 356 has been created.

In response to a third user input, the document creation platform 106 inserts (1016) the term into the electronic document at a second location distinct from the first location. In some instances, the third action includes a simple set of keystrokes, such as a special symbol (e.g., "[") followed by one or more capital letters corresponding to the term to be inserted. In some instances, the third action includes using a user interface control to display a list of available definitions and selecting from the list.

In some instances, after the term is inserted (1016), the document creation platform 106 updates (1018) the first clause based on user input in the provided user interface prior to a fourth user action that prompts display of the first clause. That is, the definition of the term changes.

Subsequently, the document creation platform identifies (1020) a fourth user action at the second location in the electronic document. In some instances, the fourth user action is (1022) a hover event in proximity to the second location. In some instances, the fourth user action is (1024) a click event on the term at the second location.

In response to identifying the fourth user action, the document creation platform 106 performs (1026) several operations automatically, without human interaction. First, the document creation platform 106 determines (1028) that the second location includes the term and that the term is associated with the first clause. Second, the document creation platform 106 retrieves (1030) a current version of the first clause from the electronic document. In some instances, the retrieved current version of the first clause includes (1032) updates to the first clause based on user input (not necessarily the same user), and the current version of the first clause is different from a version of the first clause at a time corresponding to the second user input. Third, the document creation platform 106 displays (1034) the retrieved current version of the first clause in a separate window in the user interface proximate to the term at the second location, as illustrated in FIG. 5 above. In some implementations, the separate window is (1036) a popup window.

In some cases, a user wants to change the name of a defined term. For example, a contract in negotiation may have a defined term for "Patent Assets." Later the scope expands to include other intellectual property assets in addition to patents, so the user wants to change the defined term to "IP Assets." In this case, the user takes a fifth action to change the name of the defined term. In response to (1038) receiving a fifth user input at the first location, the document creation platform 106 modifies (1040) the term in the first clause and for each instance of the term at a respective location in the electronic document outside of the first clause, the document creation platform 106 updates (1042) the respective instance of the term to match the modified term in the first clause. The change to the name is thus propagated to each location where it is used.

Figure 11A:
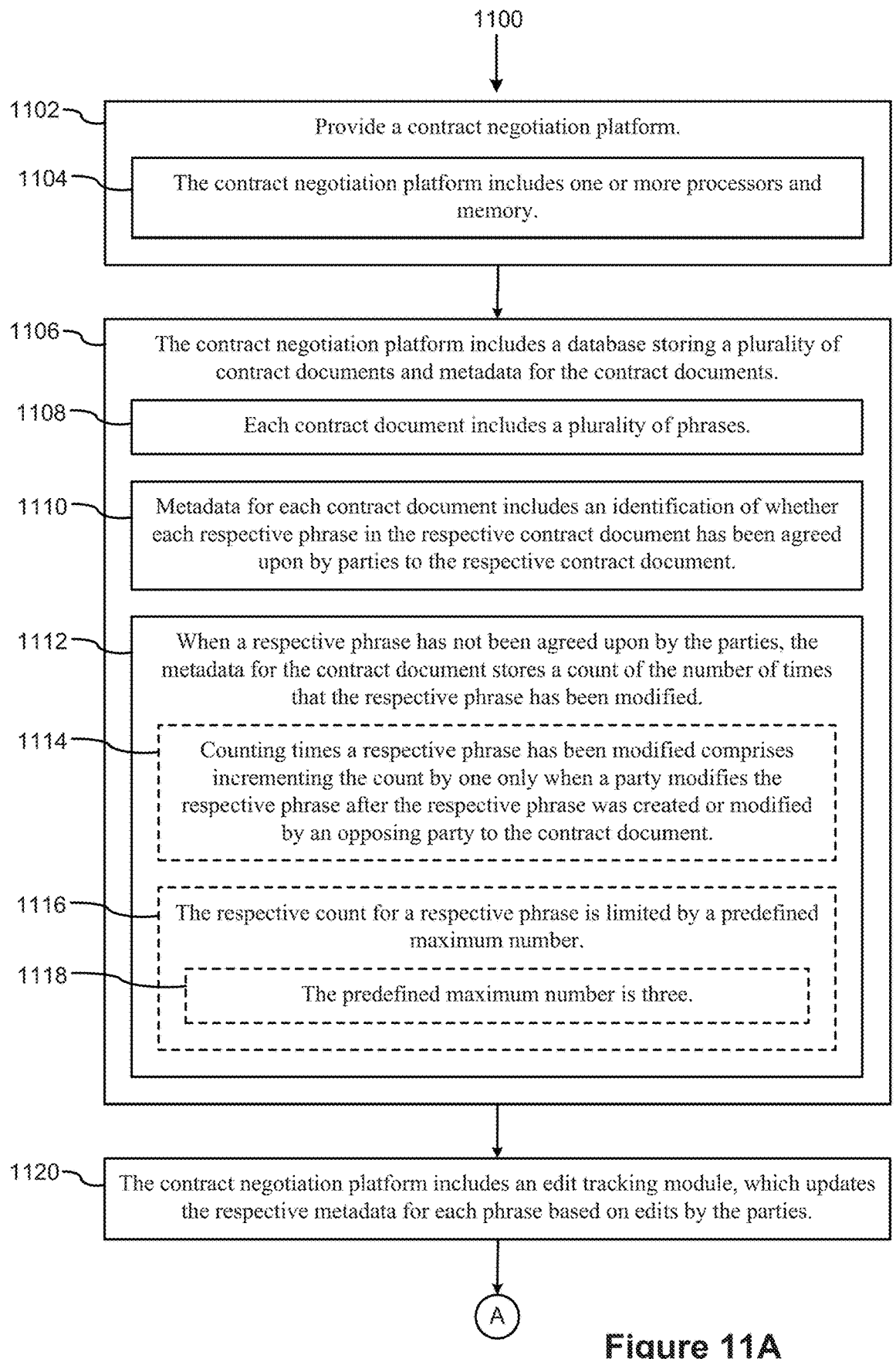
FIGS. 11A and 11B provide a flowchart for color coding of phrases within a document to indicate change history according to some implementations.
Figure 11B:
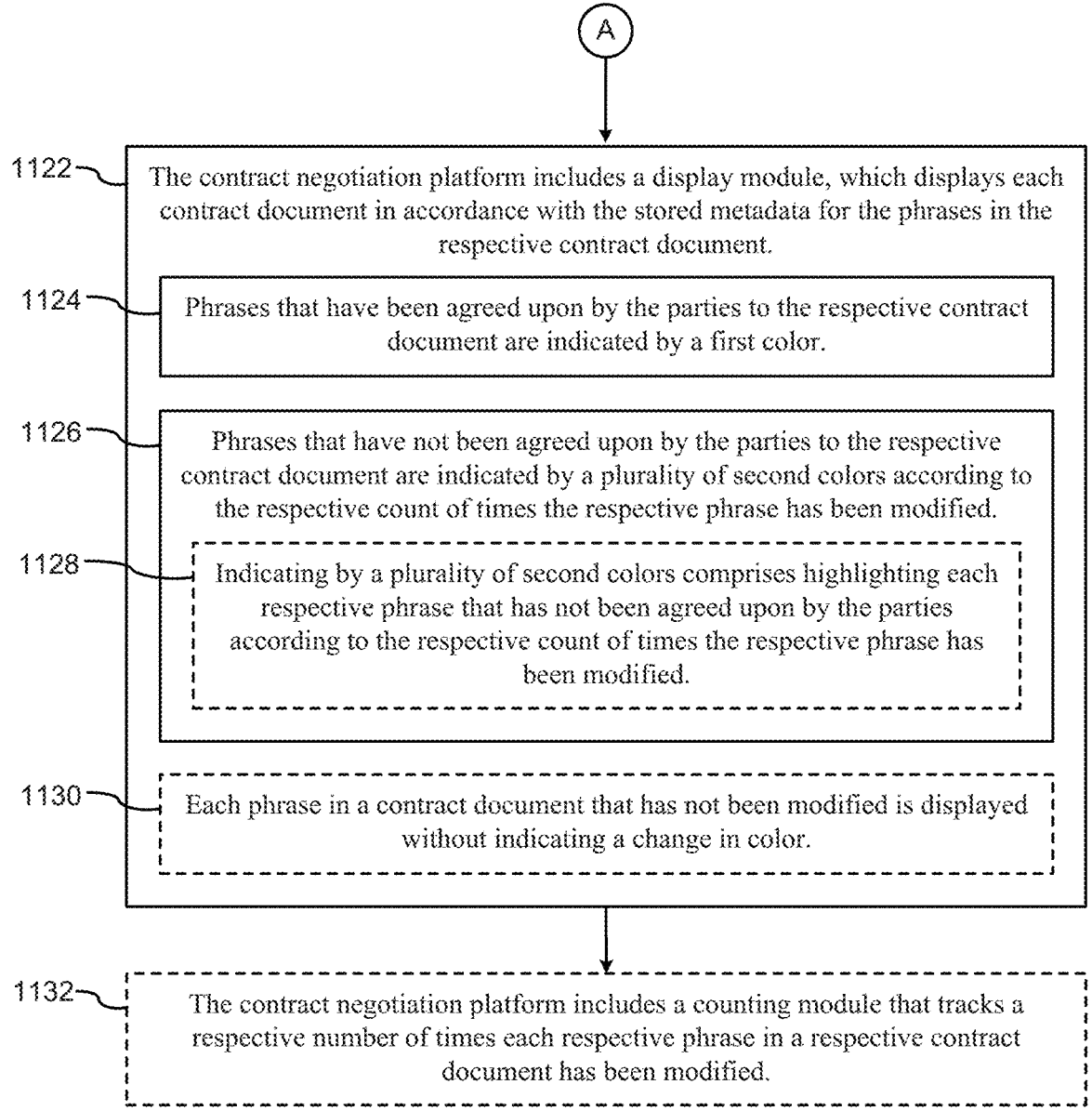

FIGS. 11A and 11B provide a flow diagram 1100 for a contract negotiation platform 106. A contract negotiation platform 106 is used to collaboratively create (1102) new documents that use color coding to identify the number of changes. The contract negotiation platform 106 includes (1104) one or more processors, memory, and one or more programs stored in the memory configured for execution by the one or more processors.

The contract negotiation platform 106 includes (1106) a database storing a plurality of contract documents and metadata for the contract documents. Each contract document includes (1108) a plurality of phrases, as illustrated above in FIG. 6. Metadata for each contract document includes (1110) an identification of whether each respective phrase in the respective contract document has been agreed upon by parties to the respective contract document. When a respective phrase has not been agreed upon by the parties, the metadata for the contract document stores (1112) a count of the number of times that the respective phrase has been modified. In some implementations, counting times a respective phrase has been modified comprises (1114) incrementing the count by one only when a team modifies the respective phrase after the respective phrase was created or modified by an opposing team to the contract document. In some implementations, the respective count for a respective phrase is limited (1116) by a predefined maximum number. In some implementations, the predefined maximum number is (1118) three. In many cases, distinguishing between 3 or more is not important. In some implementations, the counts are grouped into ranges, such as 1-2, 3-4, and 5 or more.

The contract negotiation platform 106 includes (1120) an edit tracking module 328, which updates the respective metadata for each phrase based on edits by the parties.

The contract negotiation platform 106 also includes (1122) a display module 330, which displays each contract document in accordance with the stored metadata for the phrases in the respective contract document. In particular, phrases that have been agreed upon by the parties to the respective contract document are indicated (1124) by a first color (e.g., green). Phrases that have not been agreed upon by the parties to the respective contract document are indicated (1126) by a plurality of second colors according to the respective count of times the respective phrase has been modified (e.g., blue, orange, and red). Indicating by a plurality of second colors comprises (1128) highlighting each respective phrase that has not been agreed upon by the parties according to the respective count of times the respective phrase has been modified. Highlighting can be performed in various ways, as illustrated in FIG. 6 and FIG. 9-30. As illustrated in FIG. 9-30, the paragraphs are highlighted by outlining with different colors and connecting the outlines to relevant boxes in the margin.

In some implementations, each phrase in a contract document that has not been modified is displayed (1130) without indicating a change in color (e.g., no color outlining).

In some implementations, the contract negotiation platform 106 includes a counting module 328 that tracks a respective number of times each respective phrase in a respective contract document has been modified.

Figure 12A:
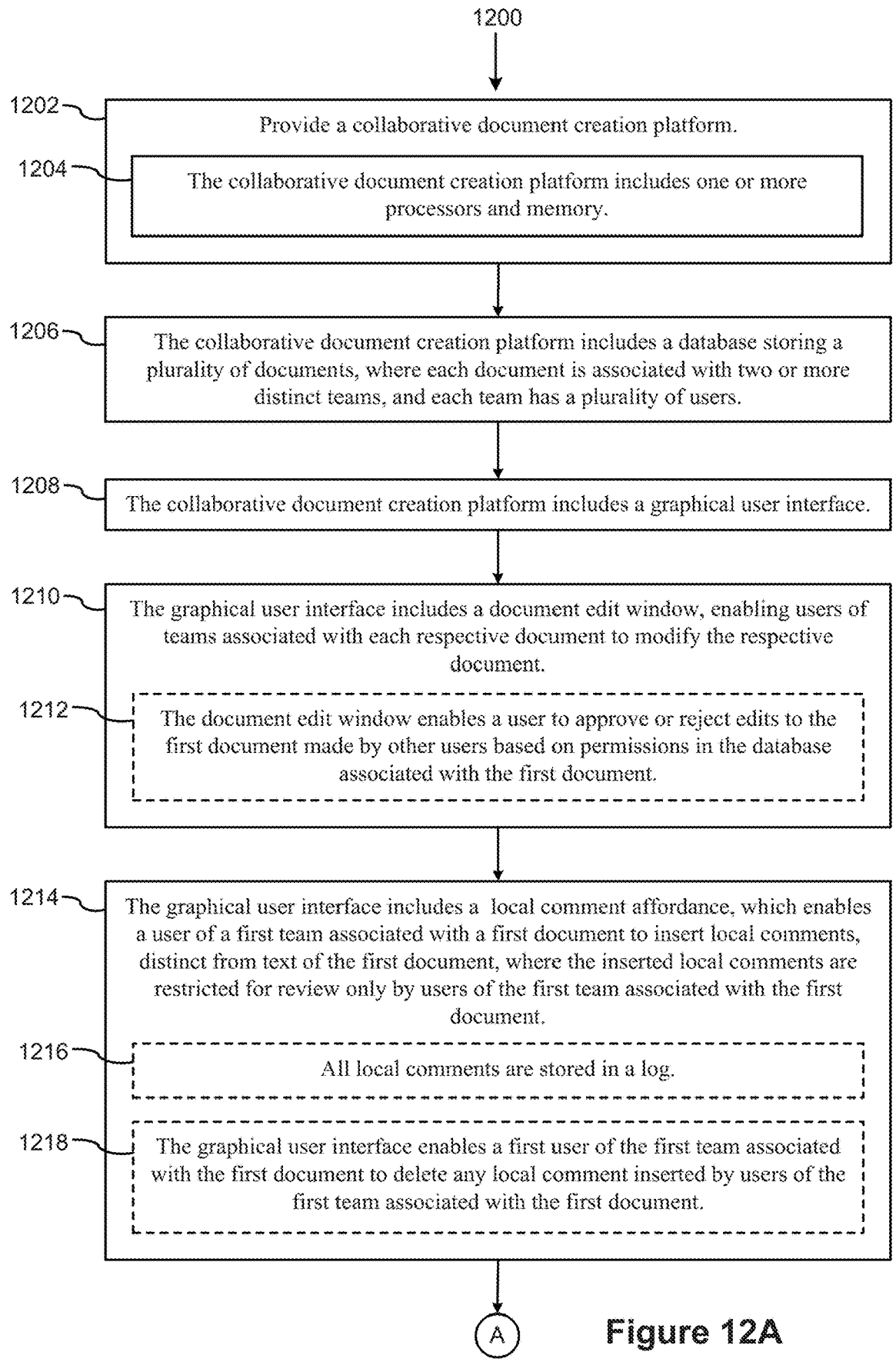
FIGS. 12A and 12B provide a flowchart for collaborative document creation by a plurality of distinct teams according to some implementations.
Figure 12B:
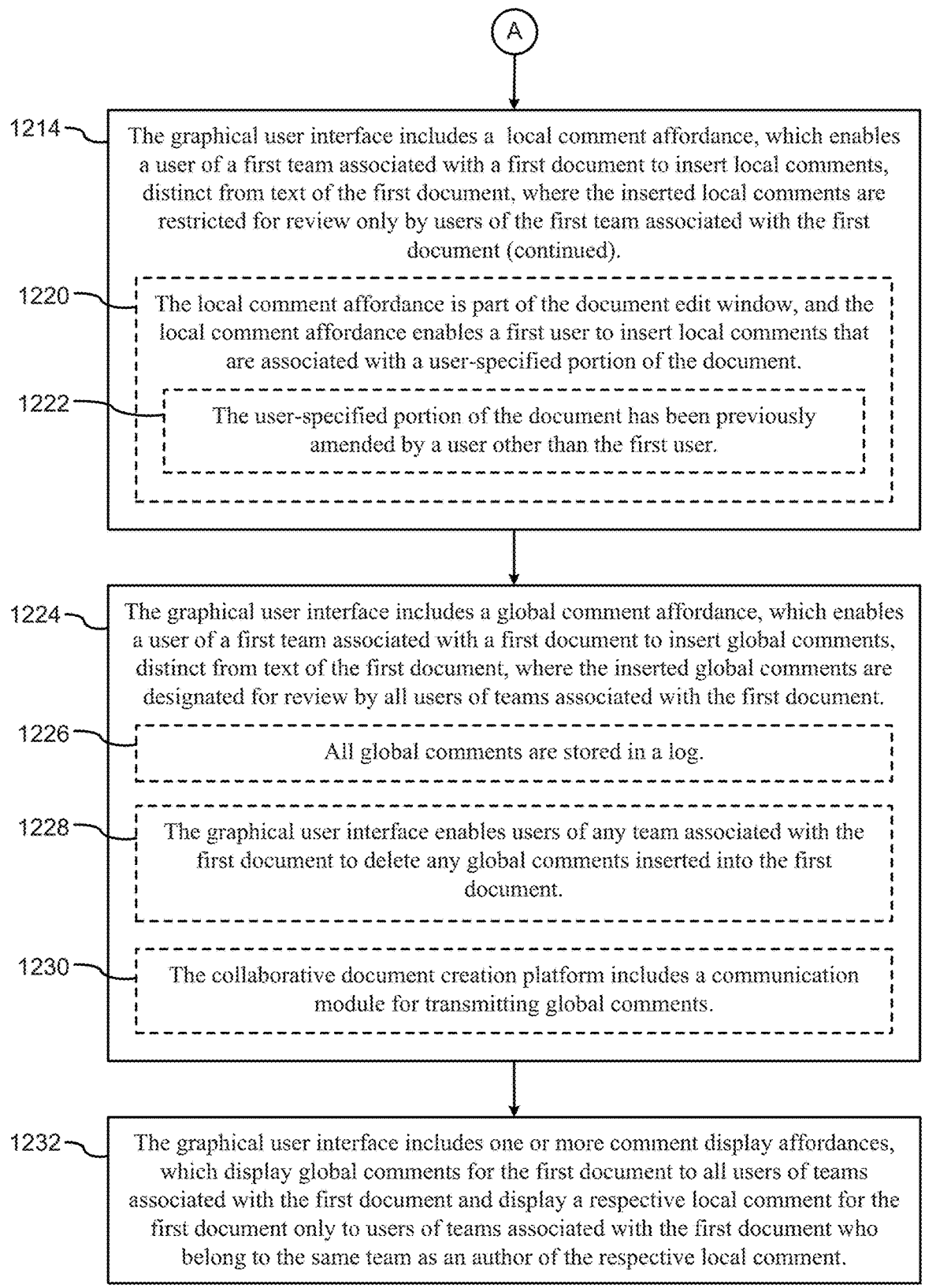

FIGS. 12A and 12B provide a flow diagram 1200 for a collaborative document creation platform 106. A collaborative document creation platform 106 is used to collaboratively create (1202) new documents based on the input of two or more teams. The collaborative document creation platform 106 includes (1204) one or more processors, memory, and one or more programs stored in the memory configured for execution by the one or more processors.

The collaborative document creation platform 106 includes (1206) a database 114 storing a plurality of documents 342, where each document 342 is associated with two or more distinct teams, and each team has a plurality of users. The collaborative document creation platform 106 includes (1208) a graphical user interface.

The graphical user interface includes (1210) a document edit window, enabling users of teams associated with each respective document to modify the respective document. In some implementations, the document edit window enables (1212) a user to approve or reject edits to the document made by other users based on permissions in the database associated with the document.

Collaboration is facilitated by appropriate embedding of local and global comments in the document.

The graphical user interface includes (1214) a local comment affordance, which enables a user of a first team associated with a document to insert local comments 348, distinct from text of the document, where the inserted local comments 348 are restricted for review only by users of the first team associated with the document. Local comments are embedded in the document itself. In some implementations, all local comments 348 are stored (1216) in a log 362. The graphical user interface enables (1218) a user of the first team associated with the document to delete any local comment inserted by users of the first team associated with the document. Users associated with other teams have no visibility of the local comments by the counterpart first team and cannot delete or modify the comments of the first team.

In some implementations, the local comment affordance is (1220) part of the document edit window, and the local comment affordance enables (1220) a first user to insert local comments that are associated with a user-specified portion of the document. In some instances, the user-specified portion of the document has been previously amended (1222) by a user other than the first user.

The graphical user interface includes (1224) a global comment affordance, which enables a user of a first team associated with a document to insert global comments, distinct from text of the document, where the inserted global comments are designated for review by all users of teams associated with the document. In some implementations, all global comments are stored (1226) in a log 362. The graphical user interface enables (1228) users of any team associated with the document to delete any global comments inserted into the document. In some implementations, the collaborative document creation platform 106 includes (1230) a communication module for transmitting global comments to the other collaborators for the document.

In some implementations, the graphical user interface includes (1232) one or more comment display affordances, which display global comments for the document to all users of teams associated with the document and display a respective local comment for the document only to users of teams associated with the document who belong to the same team as an author of the respective local comment.

In some implementations, global comments are implemented using messaging, and apply to a document as a whole. In some of these implementations, the global comments are not stored as metadata for the document. On the other hand, each local comment is associated with a specific portion of the document (e.g., a specific paragraph) and saved as metadata for the document. Some implementations provide alternative comment mechanisms that combine these features differently. For example, some implementations store all types of comments in a single table as metadata corresponding to a document, and each comment has properties that specify the visibility of the comment (e.g., the author's team only versus everyone) and the relationship of the comment to the document (e.g., an individual paragraph, a set of paragraphs, or the entire document).

The terminology used in the description of the invention herein is for the purpose of describing particular implementations only and is not intended to be limiting of the invention. As used in the description of the invention and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

The foregoing description, for purpose of explanation, has been described with reference to specific implementations. However, the illustrative discussions above are not intended to be exhaustive or to limit the invention to the precise forms disclosed. Many modifications and variations are possible in view of the above teachings. The implementations described herein were chosen and described in order to best explain the principles of the invention and its practical applications, to thereby enable others skilled in the art to best utilize the invention and various implementations with various modifications as are suited to the particular use contemplated.

What is claimed is:

1. A collaborative document creation platform, comprising:
   one or more processors;
   memory;
   a database storing a plurality of documents, wherein:
      each document is associated with two or more distinct teams, and each team comprises a plurality of users; and
      each document has a respective document edit flow state that (i) specifies which one of the teams is permitted to edit a current version of the document and (ii) specifies a default comment type of "local" or "global"; and
   a graphical user interface for modifying a document of the plurality of documents, including:
      a document edit window, enabling users of teams associated with the document to modify the document, restricting edit access to users of one of the teams according to the document edit flow state of the document;
      a local comment affordance, configured to respond to user modification and/or selection of a specific portion in the document when the document edit flow state specifies a default comment type of "local", enabling a user of a team associated with the document to insert a local comment, distinct from text of the document, directed to the specific portion;
      a global comment affordance, configured to respond to user modification and/or selection of the specific portion in the document when the document edit flow state specifies a default comment type of "global", enabling the user to insert a global comment, distinct from text of the document, directed to the specific portion; and
      one or more comment display affordances, which display each global comment for the document to all users of teams associated with the document and display each local comment for the document only to users of teams associated with the document who belong to the same team as an author of the respective local comment.

2. The collaborative document creation platform of claim 1, wherein all local comments, all global comments, and all document modifications are stored in a log.

3. The collaborative document creation platform of claim 1, wherein the graphical user interface enables a user of a team associated with the document to delete any local comment or global comment inserted by users of the team, in accordance with edit permissions of the document edit flow state.

4. The collaborative document creation platform of claim 1, further comprising a communication module for transmitting messages about the document among users of teams associated with the document.

5. The collaborative document creation platform of claim 1, wherein the document edit window enables a user to approve, amend, or reject edits to the document made by other users based on permissions in the database associated with the document edit flow state of the document.

6. The collaborative document creation platform of claim 1, wherein the local comment affordance is part of the document edit window.

7. The collaborative document creation platform of claim 1, wherein creation of a new version of the document disables modification to earlier versions of the document.

8. The collaborative document creation platform of claim 7, wherein access to earlier versions of the document is determined by access permissions in the database.

9. The collaborative document creation platform of claim 1, wherein the portion is a phrase.

10. The collaborative document creation platform of claim 1, wherein the database stores all metadata about the document, including, but not limited to, all edits, all versions, all local and global comments, document status, and document notifications, and one or more of:
    document creation expenses, document fee splits, and specifications that indicate team goals or criteria for the document.

11. The collaborative document creation platform of claim 10, wherein access to the metadata for the document is based on access permissions for each team.

12. The collaborative document creation platform of claim 1, wherein at least one of the teams for the document comprises two or more sub-teams.

13. The collaborative document creation platform of claim 1, wherein a first local comment, by a first user of a first team, is associated with a modification of a first portion of the document, and the method further comprises, when the document is submitted to a second team distinct from the first team:
    displaying, in the graphical user interface for the second team, the first portion of the document as modified by the first user, but not displaying the first local comment.

14. A non-transitory computer readable storage medium storing one or more programs configured for execution by a computing device having one or more processors and memory, the one or more programs comprising instructions for:
    a database storing a plurality of documents, wherein:
        each document is associated with two or more distinct teams, and each team comprises a plurality of users; and
        each document has a respective document edit flow state that (i) specifies which one of the teams is permitted to edit a current version of the document and (ii) specifies a default comment type of "local" or "global"; and
    a graphical user interface, including:
        a document edit window, enabling users of teams associated with each respective document to modify the respective document, restricting edit access to users of one of the teams according to the document edit flow state;
        a local comment affordance, configured to respond to user modification and/or selection of a specific portion in the document when the document edit flow state specifies a default comment type of "local", enabling a user of a team associated with a document to insert a local comment, distinct from text of the document, directed to the specific portion;
        a global comment affordance, configured to respond to user modification and/or selection of the specific portion in the document when the document edit flow state specifies a default comment type of "global", enabling the user to insert a global comment, distinct from text of the document, directed to the specific portion; and
        one or more comment display affordances, which display each global comment for the document to all users of teams associated with the document and display each local comment for the document only to users of teams associated with the document who belong to the same team as an author of the respective local comment.

15. The computer readable storage medium of claim 14, wherein all local comments are stored in a log.

16. The computer readable storage medium of claim 14, wherein the graphical user interface enables a user of a team to delete any local comment inserted by users of the team.

17. The computer readable storage medium of claim 14, wherein the one or more programs further comprise instructions for transmitting messages about the document among users of teams associated with the document.

18. The computer readable storage medium of claim 14, wherein the document edit window enables a user to approve, amend, or reject edits to the document made by other users based on permissions in the database associated with the document edit flow state of the document.

19. The computer readable storage medium of claim 14, wherein the local comment affordance is part of the document edit window.

* * * * *